US012603600B2

(12) United States Patent
Fong et al.

(10) Patent No.: US 12,603,600 B2
(45) Date of Patent: Apr. 14, 2026

(54) APPARATUS AND METHODS FOR EFFICIENT CONVERSION OF HEAT TO ELECTRICITY VIA EMISSION OF CHARACTERISTIC RADIATION

(71) Applicant: LightCell Inc., San Francisco, CA (US)

(72) Inventors: Danielle A. Fong, Dartmouth (CA); Stephen E. Crane, San Francisco, CA (US); Gregory Fong, Dartmouth (CA); Jonathan Mapel, San Francisco, CA (US)

(73) Assignee: LightCell Inc., San Francisco, CA (US)

( * ) Notice: Subject to any disclaimer, the term of this patent is extended or adjusted under 35 U.S.C. 154(b) by 0 days.

(21) Appl. No.: 19/277,050

(22) Filed: Jul. 22, 2025

(65) Prior Publication Data

US 2025/0350231 A1 Nov. 13, 2025

Related U.S. Application Data

(63) Continuation of application No. 18/932,288, filed on Oct. 30, 2024, which is a continuation of application No. 18/511,838, filed on Nov. 16, 2023, now Pat. No. 12,136,898.

(60) Provisional application No. 63/425,789, filed on Nov. 16, 2022.

(51) Int. Cl.
| | |
|---|---|
| *H02S 10/30* | (2014.01) |
| *F23K 5/00* | (2006.01) |
| *F23K 5/14* | (2006.01) |

(52) U.S. Cl.
CPC .............. *H02S 10/30* (2014.12); *F23K 5/007* (2013.01); *F23K 5/14* (2013.01)

(58) Field of Classification Search
CPC ............ H02S 10/30; F23K 5/007; F23K 5/14
See application file for complete search history.

(56) References Cited

U.S. PATENT DOCUMENTS 6,065,418 A * 5/2000 Goldstein ............... H02S 10/30
136/253
6,128,325 A * 10/2000 Goldstein ............. H01S 3/0915
372/78
2020/0403555 A1* 12/2020 Mills ....................... H02S 10/30

FOREIGN PATENT DOCUMENTS

JP 2017044462 A * 3/2017

OTHER PUBLICATIONS

Betsuyaku, JP201704462A_Machine Translation (Year: 2017).*

* cited by examiner

*Primary Examiner* — Devina Pillay

(57) ABSTRACT

An apparatus for generating electricity via thermophotovoltaic (TPV) energy conversion is described. High efficiency is obtained by introducing a material into a combustion chamber that emits bright near-monochromatic visible light upon heating. This light is then directed to fall on an array of photovoltaic (PV) cells which convert the light to electricity. Heat and infrared radiation that is not absorbed by the PV cells is returned to the combustion chamber to further improve conversion efficiency.

20 Claims, 58 Drawing Sheets

3001

3002

3003

3004

3001

3003

3004

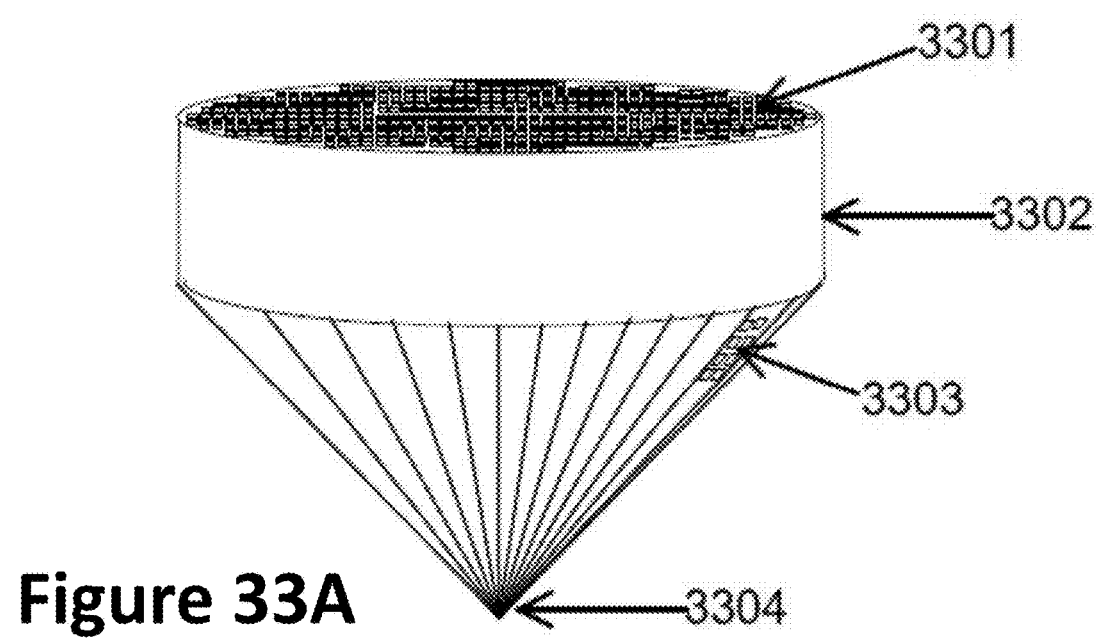
Figure 33A
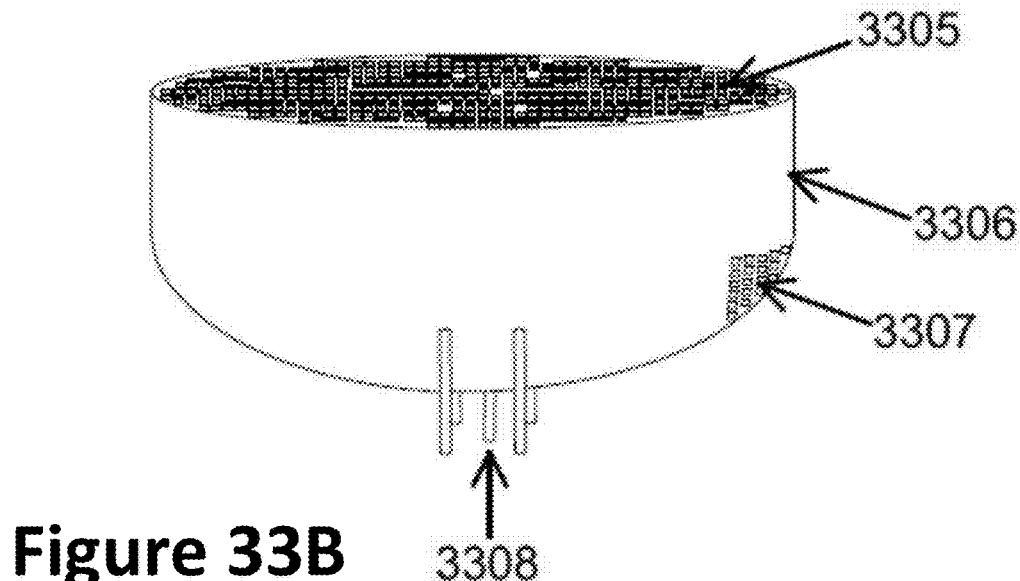
Figure 33B
Figure 33C
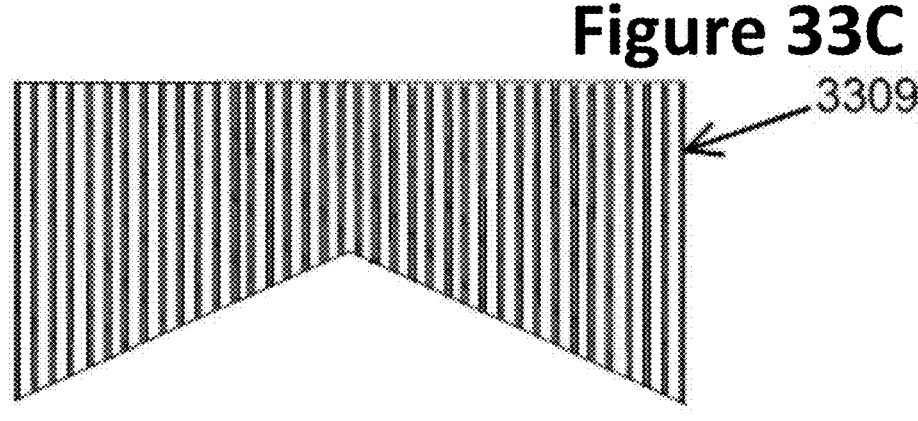

Figure 47

| Emitting atoms | Selected Intense Emission line wavelengths (nm) |
|---|---|
| | |
| *Alkali metals* | |
| Lithium | 670.77 (I), 670.79 (I), 812.6 (I), 610.4 (I) |
| Sodium | 589.0 (I), 589.6 (I), 819.48 (I), 568.3 (I), 568.8 (I) |
| Potassium | 766.5 (I), 769.9 (I), 1169 (I), 1177 (I) |
| Rubidium | 780.0 (I), 794.8 (I) |
| Cesium | 852.1 (I), 894.4 (I) |
| | |
| *Alkali earth metals* | |
| Magnesium | 285.2 (I), 383.8 (I) |
| Calcium | 646.3 (I), 649.4 (I), 616.3 (I), 616.2 (I), 558.8 (I), 422.7 (I) |
| Strontium | 640.8 (I), 650.4 (I), 707 (I), 687.8 (I), 460.7 (I), 548 (I), 496.2 (I) |
| | |
| *Transition metals* | |
| Scandium | 327.4 (I), 335.4 (II), 337.2 (II), 355.9 (II), 356.8 (II), 357.3 (II), 357.6 (II), 358.1 (II), 424.7 (II) |
| Yttrium | 437.5 (II), 410.2 (I), 407.7 (I), 412.8 (I), 417.8 (II), 414.3 (I), 510.3 (III), 523.8 (III), 755.9 (III), 786.4 (III), 791.7 (III), 799.1 (III) 817.1 (III), 879.6 (III), 911.7 (III), 1790.3 (I), 1804.9 (I) |
| Lutetium | 513.5 (I), 600.4 (I) |
| | |
| *Rare earths* | |
| Lanthanum | 625 (I), 639.4 (I), 550.1 (I), 394.9 (II), 408.7 (II) |
| Cerium | 570 (I), 571.9 (I), 594.1 (I), 560.1 (II), 606.1 (III), 603.3 (III) |
| Praseodymium | 1014 (Pr³⁺), 851 (Pr³⁺), 798 (Pr³⁺), 684 (Pr³⁺), 495.1 (I), 513 (I), 508 (I) |
| Neodymium | 562 (I), 492 (I) |
| Promethium | 659.8 (I), 514.6 (I) 512.7 (I), 505.8 (I), 499.7 (I) |
| Samarium | 429.6 (I), 484.1 (I), 517 (I) |
| Europium | 459.4 (I), 462.7 (I), 466.2 (I), 583 (I) |
| Gadolinium | 422.6 (I), 515.9 (I), 376.8 (II), 342.2 (II), 364.6 (II), 335.0 (II), 336.2 (II), 358.5 (II), 379.6 (II), 385.1 (II) |
| Terbium | 432.6 (I), 535.5 (I) |
| Dysprosium | 421.2 (I), 422.5 (I), 404.6 (I) |
| Holmium | 410.4 (I), 405.4 (I), 416.3 (I), 660.5 (I) |
| Erbium | 400.8 (I), 415.1 (I), 582.7 (I), 622.1 (I) |
| Thulium | 409.4 (I), 410.5 (I), 418.8 (I), 371.8 (I), 388.3 (I), 420.4 (I), 388.7 (I), 374.4 (I), 530.7 (I), 567.5 (I) |
| Ytterbium | 398.8 (I), 555.6 (I), 680 (I), 770 (I), 980 (Yb³⁺) |

| Lithium | Lithium nitrate | Lithium hydride | Lithium bromide | Lithium aluminum hydride |
| | Lithium carbonate | Lithium chloride | Lithium stearate | Lithium hydroxide |
| Sodium | Sodium acetate | Sodium benzoate | Sodium thiosulfate | Sodium citrate |
| | Sodium bicarbonate | Sodium bromide | Sodium peroxide | Sodium ferrocyanide |
| | Sodium bisulfate | Sodium carbonate | Sodium phosphate | Sodium fluoride |
| | Sodium bisulfite | Sodium chloride | Sodium sulfate | Sodium formate |
| | Sodium borate | Sodium chromate | Sodium sulfite | Sodium hydroxide |
| | Sodium bromate | Sodium nitrate | Sodium sulfide | Sodium iodide |
| | Sodium hypochlorite | Sodium nitrite | Sodium persulfate | Sodium iodate |
| Potassium | Potassium nitrate | Potassium metabisulfite | Potassium oxalate | Potassium chromate |
| | Potassium nitrite | Potassium dichromate | Potassium persulfate | Potassium ferrocyanide |
| | Potassium sulfite | Potassium bromide | Potassium nitrate | Potassium citrate |
| | Potassium bicarbonate | Potassium iodide | Potassium thiocyanate | Potassium sulfite |
| | Potassium bitartrate | Potassium phosphate | Potassium chromate | Potassium bicarbonate |
| | Potassium carbonate | Potassium thiocyanate | Potassium ferrocyanide | Potassium bitartrate |
| | Potassium chlorate | Potassium sulfate | Potassium dichromate | Potassium carbonate |
| | Potassium chloride | Potassium oxalate | Potassium permanganate | Potassium chlorate |
| | Potassium bromate | Potassium persulfate | Potassium iodide | Potassium bromate |
| | Potassium chloride | Potassium nitrate | Potassium hydroxide | Potassium chloride |
| | Potassium iodate | | Potassium bisulfate | Potassium iodate |
| | Potassium sorbate | | Potassium hydroxide | Potassium sorbate |
| | Potassium permanganate | | | |

Figure 48A

| | | | | |
|---|---|---|---|---|
| Rubidium | Rubidium chloride<br>Rubidium bromide<br>Rubidium iodide<br>Rubidium oxide | Rubidium sulfate<br>Rubidium hydroxide<br>Rubidium nitrate<br>Rubidium fluoride | Rubidium nitrite<br>Rubidium sulfide<br>Rubidium hydride<br>Rubidium chlorate | Rubidium Permanganate<br>Rubidium chloride |
| Cesium | Cesium sulfide<br>Cesium sulfate<br>Cesium hydride | Cesium chloride<br>Cesium monoxide<br>Cesium bicarbonate | Cesium fluoride<br>Cesium hydroxide<br>Cesium nitrate | Cesium bromide<br>Cesium iodide |
| Magnesium | Magnesium oxide<br>Magnesium carbonate<br>Magnesium hydroxide | Magnesium chloride<br>Magnesium citrate<br>Magnesium sulfide | Magnesium hydride<br>Magnesium bromide<br>Magnesium iodide | Magnesium nitrate<br>Magnesium bicarbonate |
| Calcium | Calcium carbonate<br>Calcium phosphate<br>Calcium oxide | Calcium chlorate<br>Calcium bromide<br>Calcium iodide | Calcium fluoride<br>Calcium citrate<br>Calcium nitrate | Calcium hydroxide<br>Calcium sulfate<br>Calcium chloride |
| Strontium | Strontium carbonate<br>Strontium oxide<br>Strontium bromide<br>Strontium sulfate | Strontium chromate<br>Strontium hydroxide<br>Strontium iodide | Strontium chlorate<br>Strontium nitrate<br>Strontium fluoride | Strontium sulfide<br>Strontium hydride<br>Strontium iodide |
| Yttrium | Yttrium oxide<br>Yttrium hydroxide<br>Yttrium bromide | Yttrium nitrate<br>Yttrium iodide<br>Yttrium phosphate | Yttrium sulfate<br>Yttrium fluoride | Yttrium chloride<br>Yttrium bromide |
| Cerium | Cerium sulfate<br>Cerium oxide | Cerium sulfide<br>Cerium iodide | Cerium fluoride<br>Cerium carbonate | Cesium chloride<br>Cerium hydroxide |
| Ytterbium | Ytterbium oxide<br>Ytterbium iodide | Ytterbium bromide<br>Ytterbium sulfate | Ytterbium sulfide<br>Ytterbium hydride | Ytterbium chloride<br>Ytterbium fluoride |

APPARATUS AND METHODS FOR EFFICIENT CONVERSION OF HEAT TO ELECTRICITY VIA EMISSION OF CHARACTERISTIC RADIATION

CROSS-REFERENCE TO RELATED APPLICATION

The instant nonprovisional patent application is a continuation of and claims priority to U.S. patent application Ser. No. 18/932,288 filed Oct. 30, 2024, which is a continuation of U.S. patent application Ser. No. 18/511,838 filed Nov. 16, 2023, issues as U.S. Pat. No. 12,136,898 on Nov. 5, 2024, which claims priority to U.S. Provisional Patent Application No. 63/425,789 filed Nov. 16, 2022, both of which are incorporated by reference herein for all purposes.

BACKGROUND

In Thermophotovoltaic (TPV) generators, combustion heats an emitter (typically a block of metal or graphite) to generate visible and infrared light via blackbody radiation. That light is then incident on one or more photovoltaic cells which, in turn, generate electricity.

Some recent research in TPV design has focused on improving the performance of the emitter, for example by the use of a photonic crystal which is engineered to emit bright light in a narrow wavelength band compatible with the bandgap of a particular PV cell formulation.

SUMMARY

Embodiments of the present invention relate to a novel thermophotovoltaic generator (TPV) design that converts heat energy to electricity by first using the heat of combustion to cause a material to emit characteristic radiation—that is, radiation caused by electronic transitions between discrete atomic energy levels—and then directing that radiation to fall on an array of photovoltaic cells. To further improve conversion efficiency, heat and light (principally infrared radiation) that is not absorbed by the PV cells is returned to the combustion chamber by one or more techniques: 1) mirrors that selectively reflect light wavelengths that are poorly absorbed by the PV cells, and 2) a counterflow heat exchanger that extracts heat from the outflowing combustion products and uses it to preheat the reactants.

Certain embodiments of the invention may comprise one or more of the following subsystems:

1. A combustion chamber with transparent walls (in one embodiment, this chamber is a transparent sapphire cylinder).
2. A fuel delivery system to introduce fuel, oxidizer, and an emitting material into the combustion chamber and to regulate their flow rates
3. An ignition system to initiate combustion
4. Selective infrared (IR) or bandpass mirrors located outside of the combustion chamber that reflect the infrared radiation generated by combustion back into the combustion chamber while allowing light of the desired wavelengths pass through
5. An array of photovoltaic (PV) cells outside of the combustion chamber and behind the IR mirrors, positioned so as to capture the light that passes through the selective mirrors and so convert it to electricity.
6. An exhaust system that directs the combustion products out of the combustion chamber and through a counterflow heat exchanger. Within the heat exchanger, the combustion products flow in one direction and the reactants flow in the other direction so as to be preheated before they enter the combustion chamber.

The use of a material that emits characteristic radiation is one novel element of an embodiment of the invention (in an embodiment that material is sodium, but many alternatives exist, for example potassium, lithium, strontium, calcium, rubidium or mixtures of these elements). The use of such a material substantially improves the efficiency of the device. By converting much of the heat energy of combustion into light in a narrow wavelength band and matching that band to the bandgap of a PV cell, a far greater percentage of the heat energy can be captured and converted to electricity by the PV cell than if the device were receiving broad-band radiation.

In fact, academic research has shown that, if sodium is introduced into a high temperature flame, the pair of sodium D emission lines ("D-lines") at approximately 589 nm wavelength comprise as much as 25% of the radiant energy emitted by the flame. These lines are emitted when an electron in a sodium atom which had been excited from the 3s orbital to the 3p orbital (the excitation having been effected by the heat of combustion), relaxes back into its ground state.

A second novel aspect to the invention is the use of a combination of infrared mirrors and a counterflow heat exchanger to capture nearly all of the IR radiation and to return it into the combustion chamber. This further improves efficiency by giving the same heat energy multiple opportunities to excite a 3s to 3p electron transition.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features in the drawings. Certain other features, for example control knobs or electrical wires, are omitted from the drawings for the sake of clarity.

FIG. 33A shows a simplified view of one embodiment of a wicking structure.

FIG. 33B shows a simplified view of another embodiment of a wicking structure.

FIG. 33C shows a simplified view of still another embodiment of a wicking structure.

FIG. 47 shows a table listing emitting atoms.

FIGS. 48A-B show tables listing compounds that may serve as emitting materials.

DESCRIPTION

Figure 7:
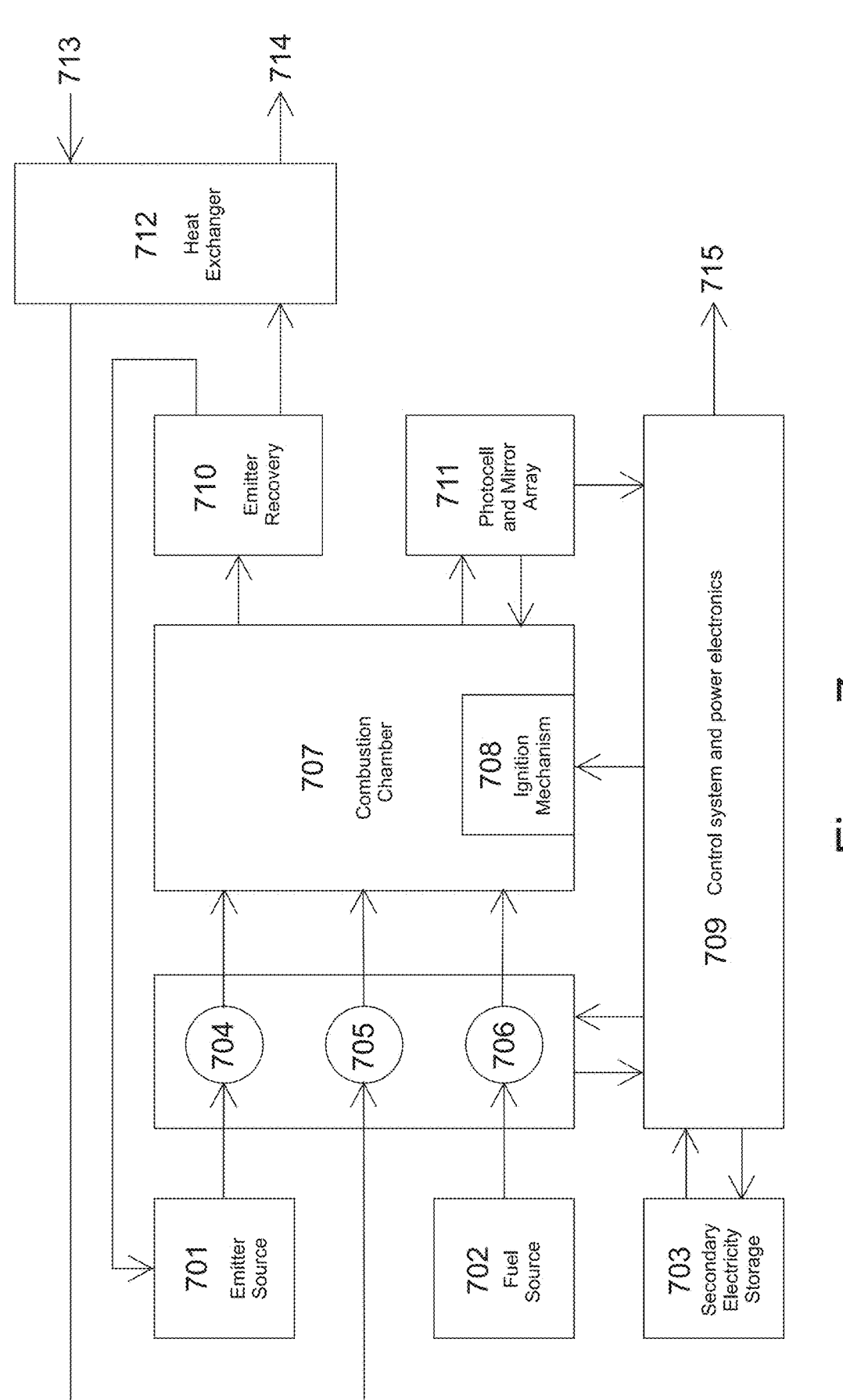
FIG. 7 is a block diagram of an embodiment of a TPV generator

Referring now to FIG. 7, a block diagram of an embodiment of a TPV generator is shown.

Fuel, which may be a combustible liquid (for example, gasoline, diesel fuel, methanol, ethanol, or mixtures of these) and/or a combustible gas (for example, methane, propane, natural gas, ammonia, hydrogen, or a synfuel) is introduced into a combustion chamber 707 from a fuel source 702.

The process of introducing the fuel is controlled by a mechanism 706. Many such mechanisms may be suitable depending on the fuel used and the combustion chamber design. Examples include a valve and a nozzle (e.g., if the fuel is a pressurized gas) or a pump and an atomizing nozzle (e.g., if the fuel is a liquid).

Air or some other oxidizer (for example, oxygen gas) is introduced via an inlet 713. In some embodiments, such as the one shown in FIG. 7, the oxidizer passes first through a heat exchanger 712 where it receives heat transferred from the exhaust gasses.

A second mechanism 705 manages the introduction of the oxidizer into the combustion chamber 707. This mechanism may be, e.g., a valve and nozzle if the oxidizer is pressurized, or a fan that draws in ambient air, or some other suitable mechanism.

A material that emits characteristic radiation upon heating is also introduced into the combustion chamber. In certain embodiments this material includes sodium (and is introduced, for example, as sodium chloride).

However, alternatives exist. Examples can include but are not limited to: potassium, lithium, strontium, calcium, rubidium or combinations of these.

In certain embodiments, the emitting material is a solid (for example, powdered NaCl). In other embodiments the emitting material is dissolved in a liquid (for example, NaCl dissolved in methanol).

In FIG. 7, the emitting material is introduced into the combustion chamber separately from the fuel and the oxidizer by mechanism 704. In other embodiments (see FIGS. 36 through 39) the emitter is mixed with the fuel or mixed with the oxidizer before being introduced into the combustion chamber.

In certain embodiments, 704 may be a pump and spray nozzle (e.g., if the emitter is in liquid form), a wicking device (e.g., if the emitter is a solid—see FIG. 30), or some other mechanism.

Combustion can be initiated via an ignition mechanism 708. Examples can include but are not limited to a glow plug or a spark plug.

It is noted that an ignition mechanism is not required for all embodiments. For example, if reactants are at a high enough temperature, auto-ignition may result.

A control system 709 manages the flow of fuel, oxidizer, and emitter. The control system may perform one or more other functions, including but not limited to:

initiating ignition, receiving and responding to user input, displaying performance data, controlling flow rates, responding to variations in electrical load, and/or receiving sensor input (for example, measurement of flow rates, power output, or temperature).

For example, according to some embodiments a photovoltaic cell may have a thermal sensor (such as thermistor) mounted on it. In this manner, an active cooling system may be informed of a desirability to cool a photovoltaic cell.

Certain embodiments may include a secondary electricity storage system (for example, batteries or capacitors) 703. Such a system may confer upon the TPV generator one or more of the abilit(ies) to:

respond rapidly to changes in electrical demand, supply power for ignition, and/or supply power during a startup period.

In certain embodiments, an emitter recovery system 710 receives the exhaust gasses exiting the combustion chamber and separates out some fraction of the emitting material that is intermixed with those gasses. This separated emitting material is returned to the emitter source container. The remaining exhaust gasses continue on to the heat exchanger 712.

The heat exchanger 712 (which may be a counterflow heat exchanger) preheats the incoming air or other oxidizer before it is introduced into the combustion chamber. Doing so improves the system efficiency by recovering some of the heat of combustion that would otherwise be lost to the system.

The cooled exhaust leaves the system via outlet 714.

The near-monochromatic light emitted by the emitting material when heated by combustion, leaves the combustion chamber and falls upon the photocell and mirror array 711. The combustion chamber may comprise transparent wall(s). In some embodiments, the combustion chamber may comprise sapphire, crystalline alumina, quartz, and/or spinel. In particular embodiments, the combustion chamber may comprise tubing.

In certain embodiments, frequency-selective mirrors reflect a fraction of light wavelengths poorly absorbed by the photocells back into the combustion chamber. Doing so may offer one or more benefits.

First, this reflected light helps to maintain a high temperature in the combustion chamber. Second, infrared light that would otherwise heat the photocells and reduce their efficiency, is blocked at least in part from reaching these cells.

In certain embodiments, the frequency-selective mirrors in 711 reflect light longer than a specific wavelength. For example, in some embodiments the mirrors may reflect infrared and near-infrared light.

In some embodiments, these mirrors operate as band-pass devices. This allows wavelengths of the emitting material's characteristic radiation to pass.

In particular embodiments, the photocells are formulated to have band gaps of slightly less energy than the characteristic photons of the emitting element. For example, (Al) InGaP photovoltaic cells can be formulated to have band gaps of around 2 eV.

The output of the photocells is sent to the power electronics and control system 709. This system, in addition to its other functions, supplies power output to meet demand via output 715.

Figure 8:
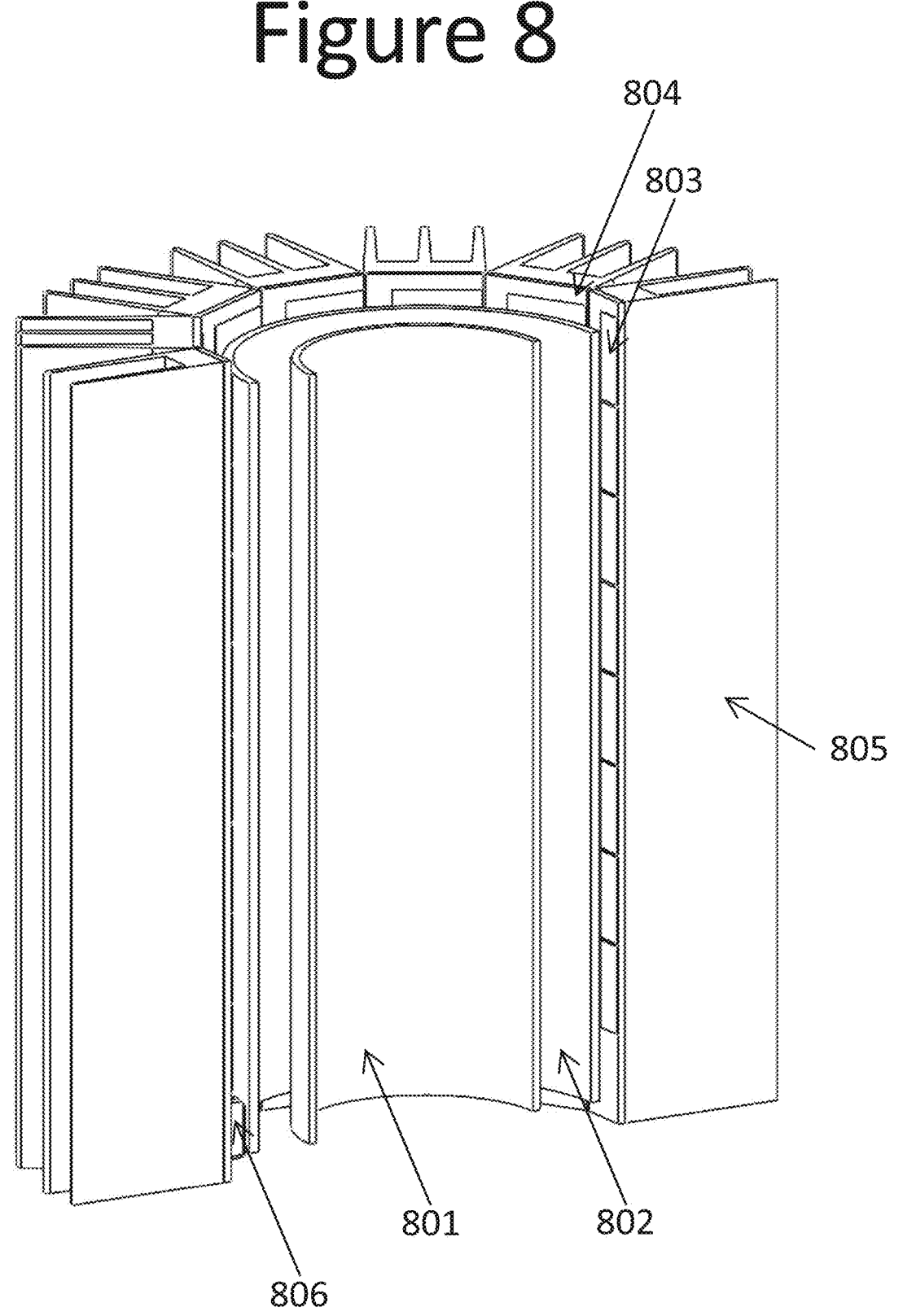
FIGS. 8 and 9 show cutaway views of parts of a TPV generator.
Figure 9:
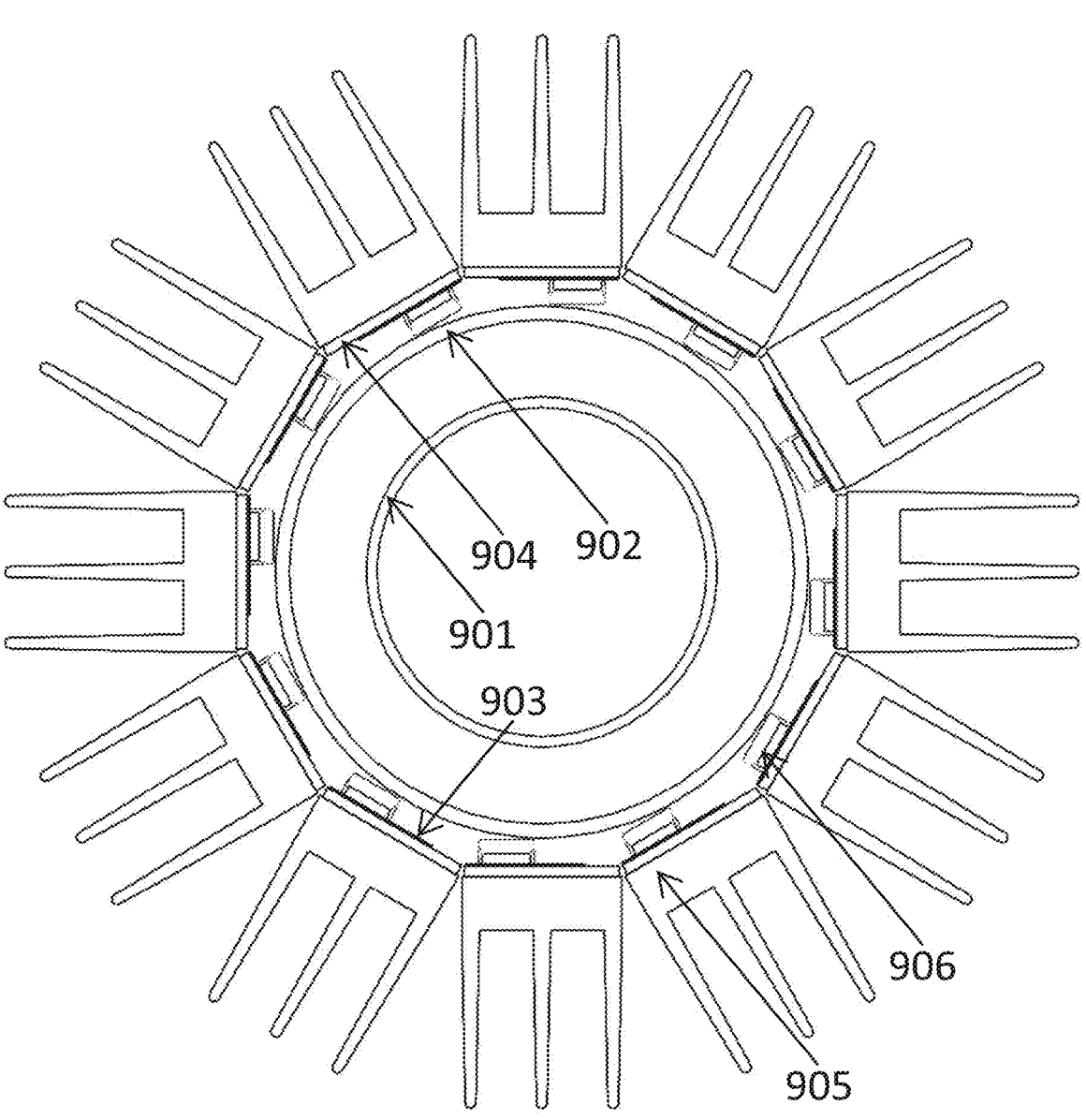

Details of the combustion chamber, photocell, and mirror assembly according to some embodiments, are now described. Referring now to FIGS. 8 and 9, an embodiment of a part of a TPV generator is shown in a cutaway view (FIG. 8) and from above (FIG. 9).

At the center is a transparent tube 801/901. This tube may be fabricated from a high-temperature material. Examples of such materials can include but are not limited to:

sapphire, polycrystalline alumina, spinel, quartz glass.

Light exiting this cylinder first encounters a surrounding cylinder fabricated from coated glass 802/902. Photons that are not convertible at the PV cell are desirably reflected back into the chamber by this coating. Multiple coatings may be used to form a cylindrical short-pass dichroic mirror. In some embodiments this reflecting structure is polygonal rather than cylindrical.

In particular, some photons will have energy less than the PV cell band gap. Such photons are not converted into current. The coating is formulated to reflect a large fraction of such photons and allow shorter wavelengths to pass through.

In particular embodiments, the cylinder 802/902 may be replaced with multiple flat frequency-selective mirrors. These are arranged to surround the combustion tube and perform the same function.

Light passing through the coated glass tube or mirror arrangement next encounters an array of photocells 803/903. In certain embodiments the photocells may surround the combustion chamber in a polygonal arrangement.

The composition and design of photocells according to certain embodiments, is now described. The semiconductor material from which the PV cells are fabricated should be selected to desirably convert photon energy.

In general, the semiconductor bandgap may be selected such that the rather narrow energetic distribution of photons emitted by the emitting material, has an average value not substantially higher than the energetic difference between the valence and conduction bands of the semiconductor. The selection criterion of the PV cell material is thus related to the emission wavelength of the emitter.

For example, if the emitting material is sodium (emitting a high percentage of light photons with an energy of 2.1 eV), a band gap in the range 1.7 to 2.0 eV may be desirable to absorb the greater part of the light reaching the cells.

Factors other than bandgap may also influence the selection of the PV cell material. Such factors can include but are not limited to:
- production availability,
- price,
- thermal performance,
- mechanical performance,
- stability against thermal cycling, and
- long-term durability.

For these and other reasons, the PV cell semiconductor or semiconductors may be comprised of one or more of:
- monocrystalline silicon,
- polycrystalline silicon,
- amorphous silicon,
- gallium arsenide,
- aluminum gallium arsenide,
- gallium indium phosphide,
- aluminum gallium indium phosphide,
- cadmium telluride,
- copper indium gallium diselenide,
- copper indium selenide,
- a perovskite material, or
- other materials or alloys of more than one material in this list.

Reducing current losses according to certain embodiments is now described. Each photocell has an electrical connection 806/906 to conduct electrical current out of the cell.

Losses due to current resistance may be desirably reduced to increase total conversion efficiency. Reducing device resistance may utilize PV cell device architectures that avoid losses by reducing transit distances within high resistance device regions.

In some embodiments, Interdigitated Back Contact (IBC) PV cells are utilized. These avoid losses typical of front contact PV cells, such as resistive losses through contacts—such as (silver) contacts formed by screen printing or other techniques.

Some embodiments may utilize multi-junction photocells. That is, in some embodiments, the PV cell may be comprised of two or more junctions.

These multiple junctions may have materials of identical or dissimilar bandgaps. The bandgaps and device structures may be selected such that devices are capable of absorbing photons originating from the emitter. Such multijunction devices can exhibit increased device voltage and reduced current.

By way of example, a two-junction PV cell comprised of substantially similar junction materials, may be utilized. Approximately half of all photons are absorbed in each junction, resulting in approximately half of the photocurrent and approximately twice the device voltage. The reduction in photocurrent reduces resistive losses and can generate greater overall power conversion efficiency from light to electricity.

The elimination of reflections by particular embodiments is now described. For photons incident upon the PV cell, it is desirable that few or none be reflected.

Although reflected photons may stay within the system and undergo additional opportunities for energy conversion, in general there are additional loss mechanisms in the combustion chamber. It is therefore desirable that photons traveling with an energy compatible with energy conversion at the PV cell should not be reflected.

Certain PV cell design elements according to embodiments may be included to reduce the proportion of reflected yet convertible photons. In some embodiments, the PV cell may include front surface features that reduce back reflection, such as texturing.

In some embodiments, the PV cell may include device structures, such as anti-reflection coatings, comprised of one or more substantially transparent but refractive materials that exhibit increased optical transmission.

In the TPV generator described here, the light produced by the emitter is substantially narrower in wavelength bandwidth than is typical for solar cells. Accordingly, anti-reflection coatings may be optimized for the wavelength band to further reduce reflective losses compared to conventional anti-reflection coatings.

Photons incident on front contacts may reflect back into the combustion chamber. In some embodiments, the PV cells may include an IBC device structure lacking front electrode features to avoid such losses.

In some embodiments, the PV cells have rear reflectors or rear mirrors integrated into their device structure. This allows photons not absorbed by the semiconductor layers to pass through them twice to return to the combustion chamber.

In some embodiments, PV cell rear reflectors are present and frequency-selective mirrors or coatings (802/902) are absent.

Photocells in the array may be mounted on a backing material 804/904. This backing provides structural support and also conducts heat away.

Thermal management is now discussed. It may be desirable to minimize energy conversion losses that may arise in the PV cells. Such losses in general may arise from multiple pathways.

For example, the conversion efficiency of light to electricity at the PV cell is negatively correlated with temperature. This can be due to reductions in PV cell voltage at higher temperatures.

Thus, it may be desirable to have the PV cells operate close to ambient temperature. This is true despite the cells being located physically proximate to the combustion chamber.

TPV generator designs may desirably facilitate high radiative energy transfer between the emitter and PV cells, with frustrated conductive and convective thermal energy transfer between the chamber and PV cells.

Without regard to non-radiative heat transfer, some thermal losses occur in the PV cell due to imperfect conversion of light to heat energy. Even under conditions of unity internal quantum efficiency, output voltages from the PV cells are lower than the energetic content of the photons. Typically, this may be primarily due to partial thermalization of photon energy in the semiconductor energy level differences in the device junction.

Thermalization processes may increase PV cell operating temperature, especially under conditions of high photon illumination, such that occurs in TPV cells. It may therefore be desirable to dissipate the buildup of thermal energy in the PV cells by transferring it to the ambient air surrounding the external envelope of the TPV generator.

Thermal energy may be transferred in various ways. In some embodiments, an individual heat sink 805/905 is attached to each PV cell using a thermally conductive grease or adhesive. In other embodiments, multiple PV cells are attached to a lesser number of heat sinks.

In some embodiments, the heat sinks passively dissipate heat. One example is as gravity induced air flows.

Multiple PV cells may be connected in various ways. To collect current from PV cells, they can be connected in an electronic circuit, with the generated current available for other uses.

PV cells may be connected in a manner to maximize current. Otherwise, constraints may limit otherwise harvestable currents.

In general, the emitter may produce light that is unequal along an axis and may depend upon combustion geometry.

In some embodiments, a multiplicity of PV cells is connected such that similarly dimensioned PV cells are connected in series surrounding the chamber for a given axial position. When the cells are connected in series, the current is matched in the string and little current is suppressed.

At other axial positions, a multiplicity of similar solar cells may be connected in series in a string, but with a generated current dissimilar to the first string. In this manner, current loss is reduced compared to strings that are connected along the axis, given that emitter light tends to vary in intensity along the chamber axis.

Figure 10:
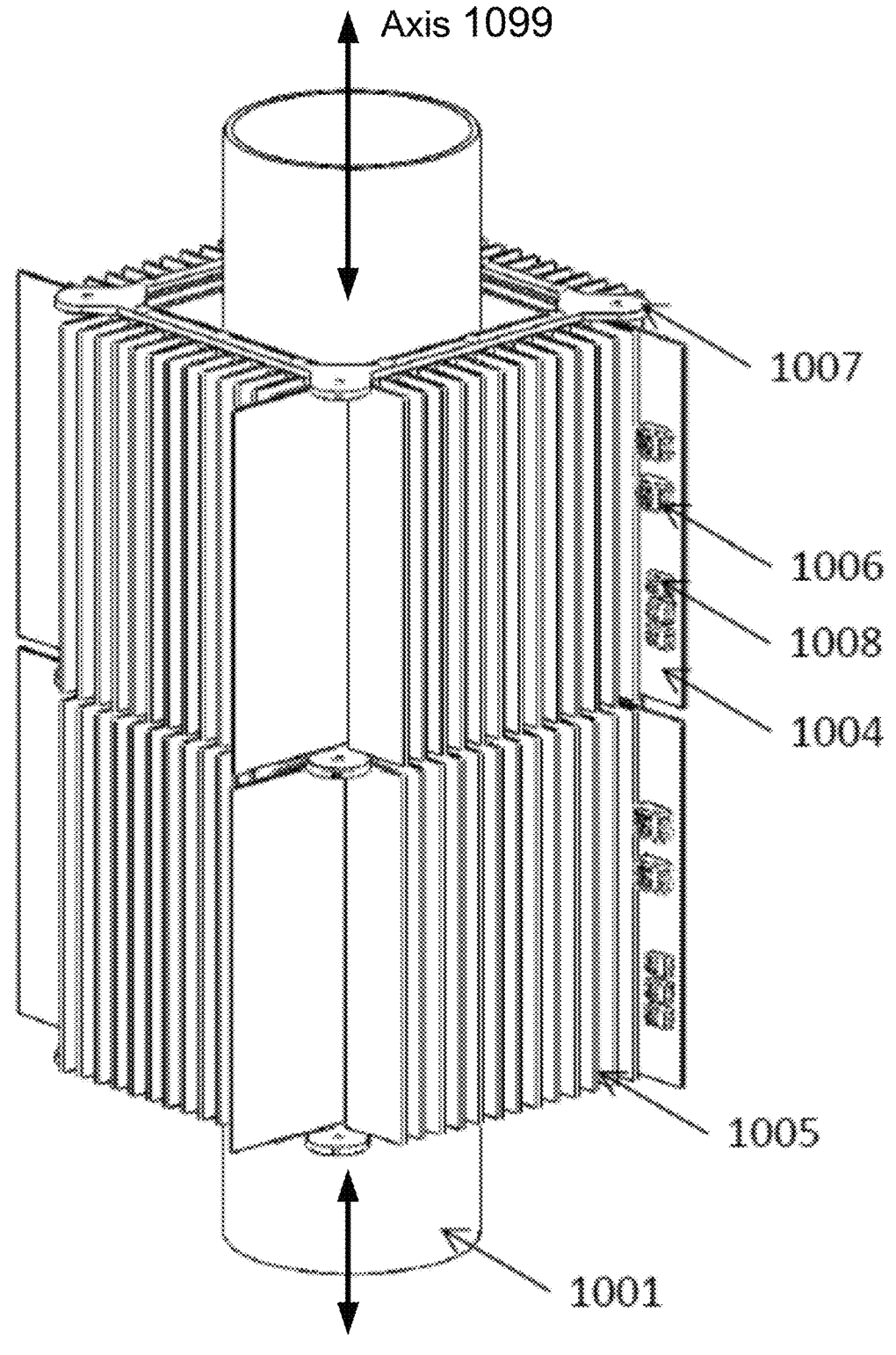
FIGS. 10 and 11 show views of arrays of photocells at different positions along an axis of the combustion chamber.
Figure 11:
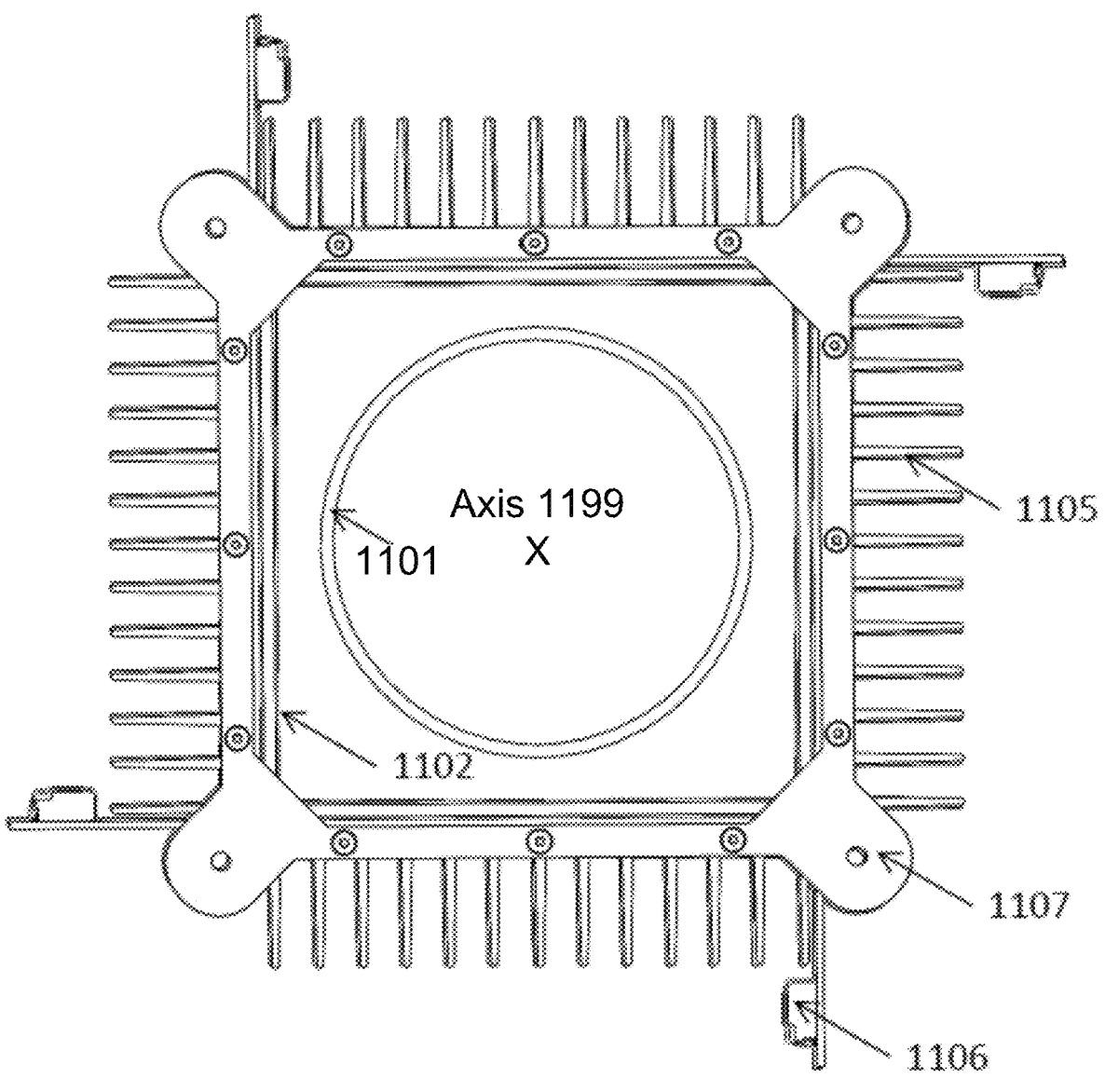

Referring now to FIGS. 10 and 11, two arrays of photocells 1102 are shown at different positions along the axis 1099/1199 of the combustion chamber 1001/1101. The cells at a given axial position are connected in series as described above so as to reduce current loss.

Active cooling of photocells according to certain embodiments, is now discussed. In some embodiments, the heat sinks attached to the photocells actively dissipate heat. This can comprise thermal transfer fluids, such as water or air.

Figure 12:
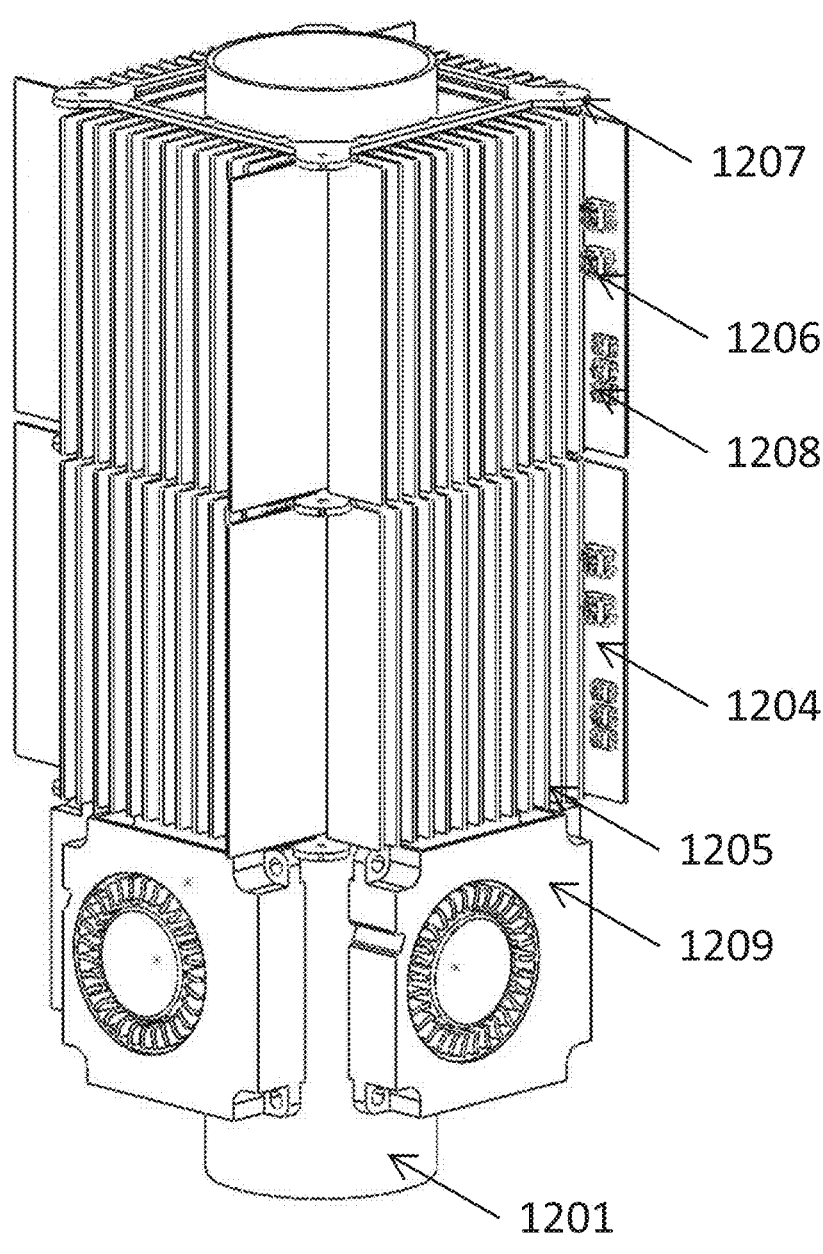
FIGS. 12 and 13 show fans that force air over cooling fins of heatsinks.
Figure 13:
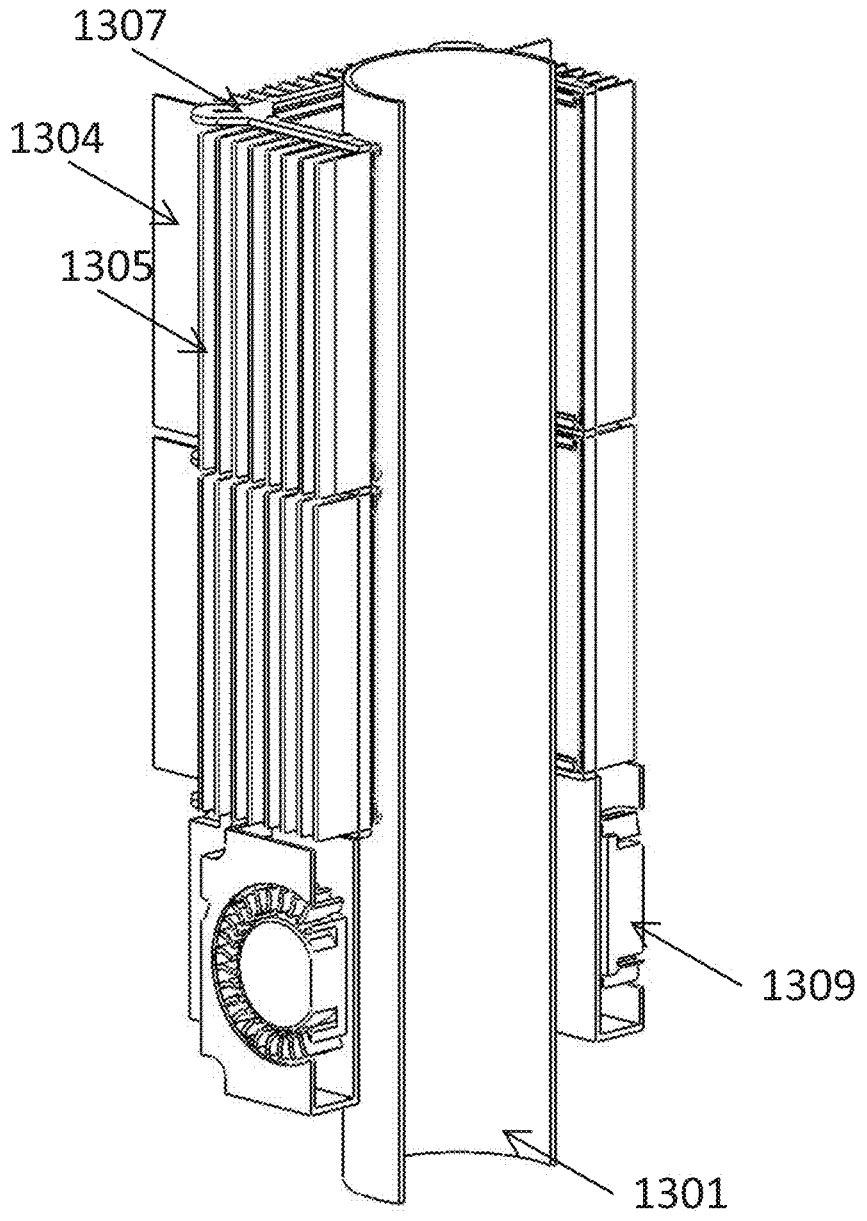

Referring now to FIGS. 12 and 13, fans 1209/1309 (which may be radial or axial) are shown that force air over the cooling fins of the heatsinks 1205/1305.

Sensors, such as thermistors, 1208, may be used to determine when the use of active cooling devices is desirable.

Light reflection according to certain embodiments is now described. It may be advantageous, for the purpose of lowering system cost or reducing current mismatch at PV cells, to surround certain parts of the chamber with broadband reflectors. This may be especially true in corners or irregular faces of the chamber where PV cells cannot be readily affixed.

In some embodiments, certain regions of the combustion chamber are coated with broadband reflective mirrors, either by coating the chamber directly or by arranging mirrors in positions where PV cells could otherwise be placed.

Figure 14:
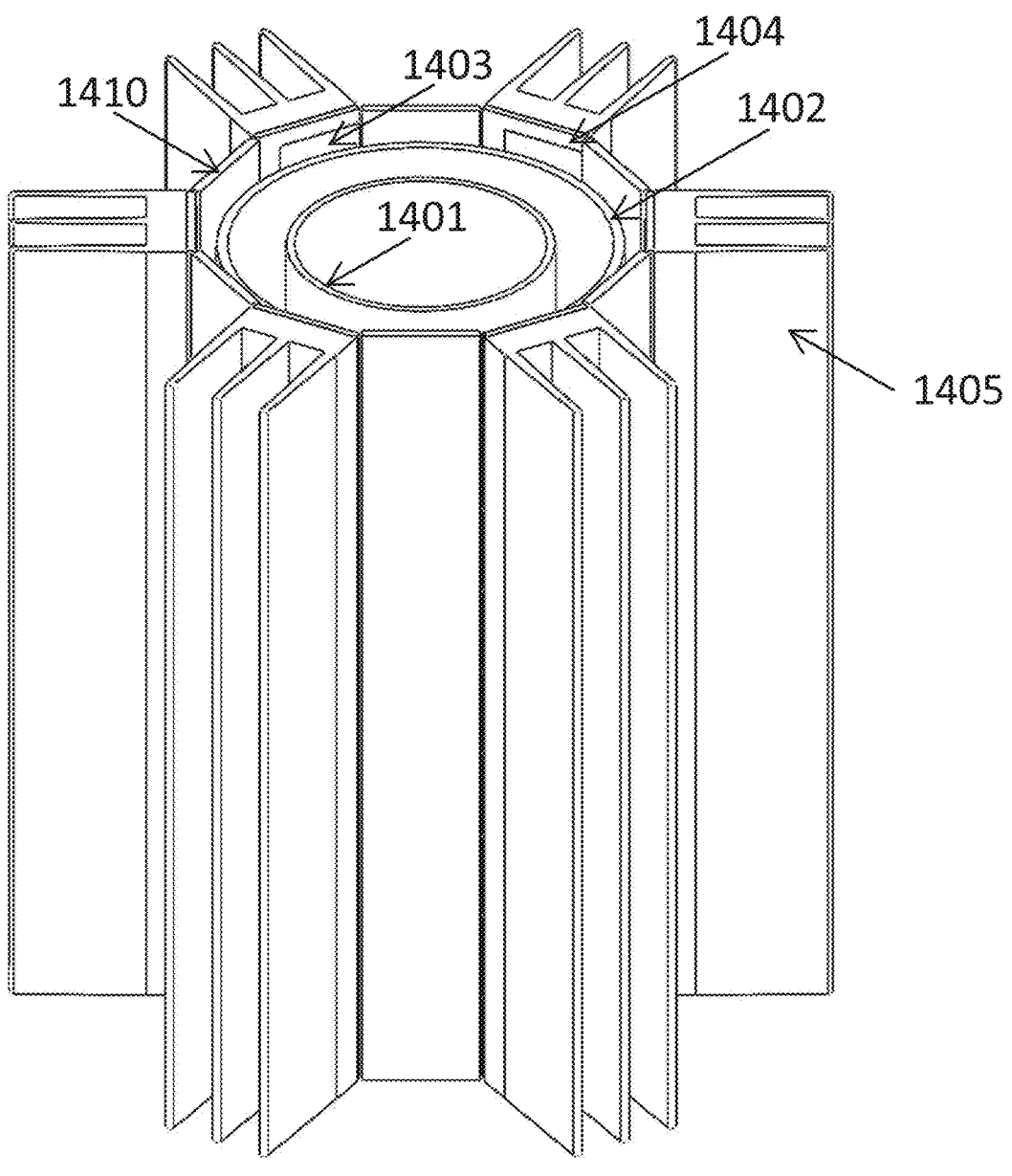
FIGS. 14, 15, and 16 show views of embodiments where both photocells and mirrors surround the combustion chamber.
Figure 15:
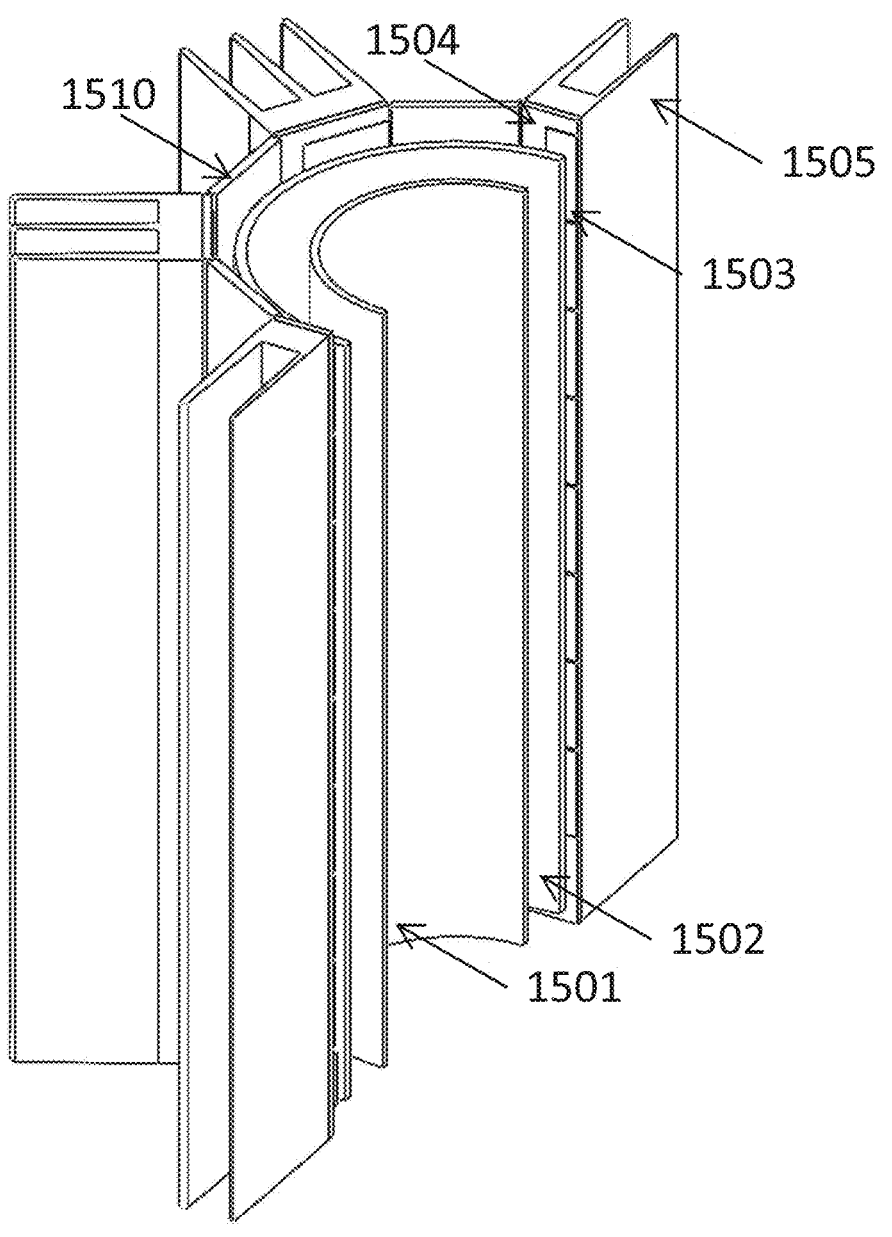
Figure 16:
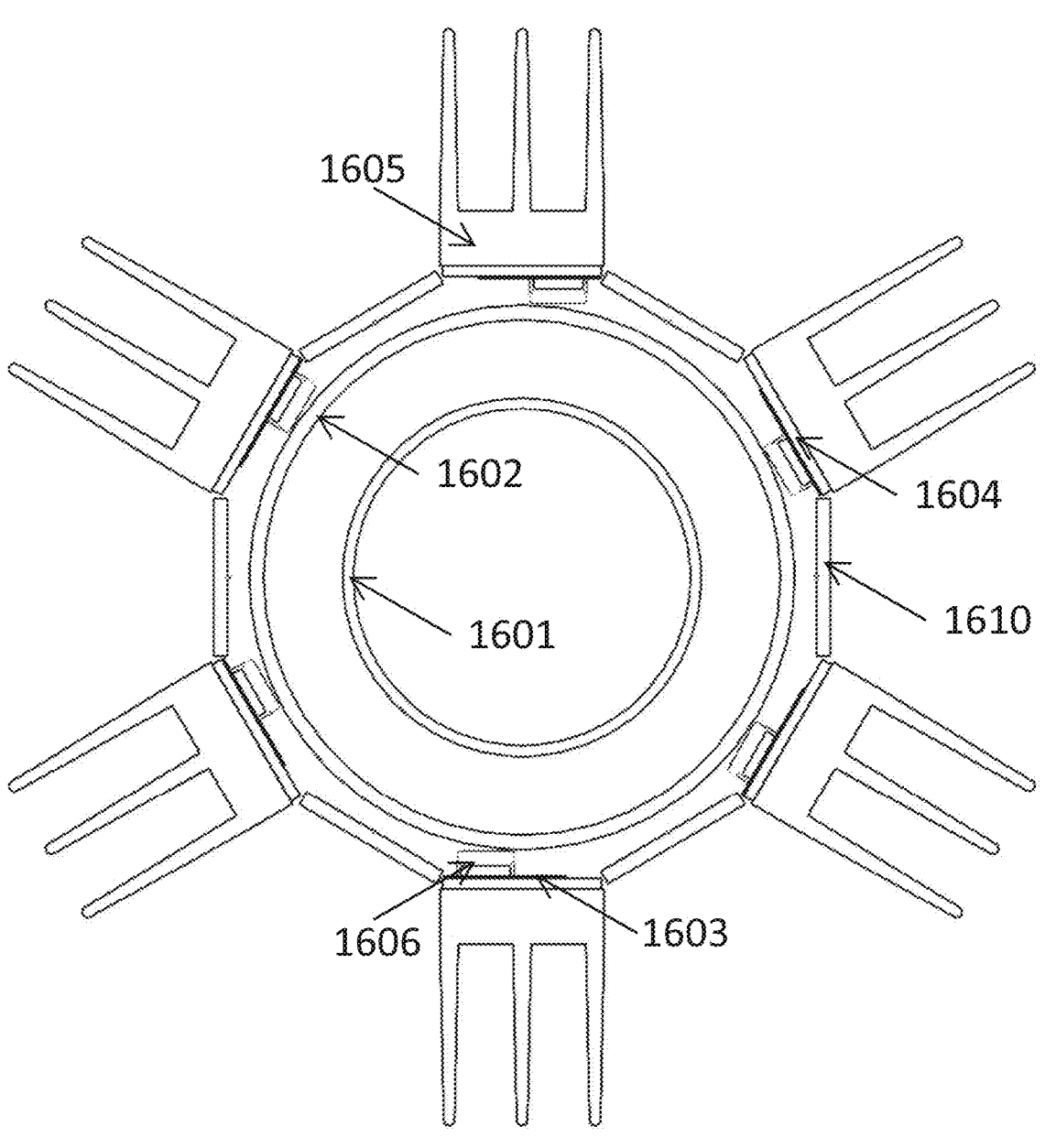

Referring now to FIGS. 14, 15, and 16, an embodiment is shown where both photocells 1404/1504/1604 and mirrors 1410/1510/1610 surround the combustion chamber. These have approximately equal area.

In other embodiments their respective areas may be substantially unequal.

If mirrors are present, the photocells will receive more intense radiation. The cells can be designed to accommodate extra heat and/or current.

In certain embodiments, the combustion chamber is surrounded almost entirely by flat mirrors or a cylindrical mirrored surface. Light is collected by a single photocell, or a narrow array of photocells arranged along the axis of the combustion chamber.

Thermal isolation of photocells according to particular embodiments is now described. In some embodiments, PV cells are isolated from the combustion chamber by an intervening vacuum or a gas (such as xenon) having low thermal conductivity. This may substantially reduce the rate of thermal energy transfer due to convection and conduction.

Figure 17:
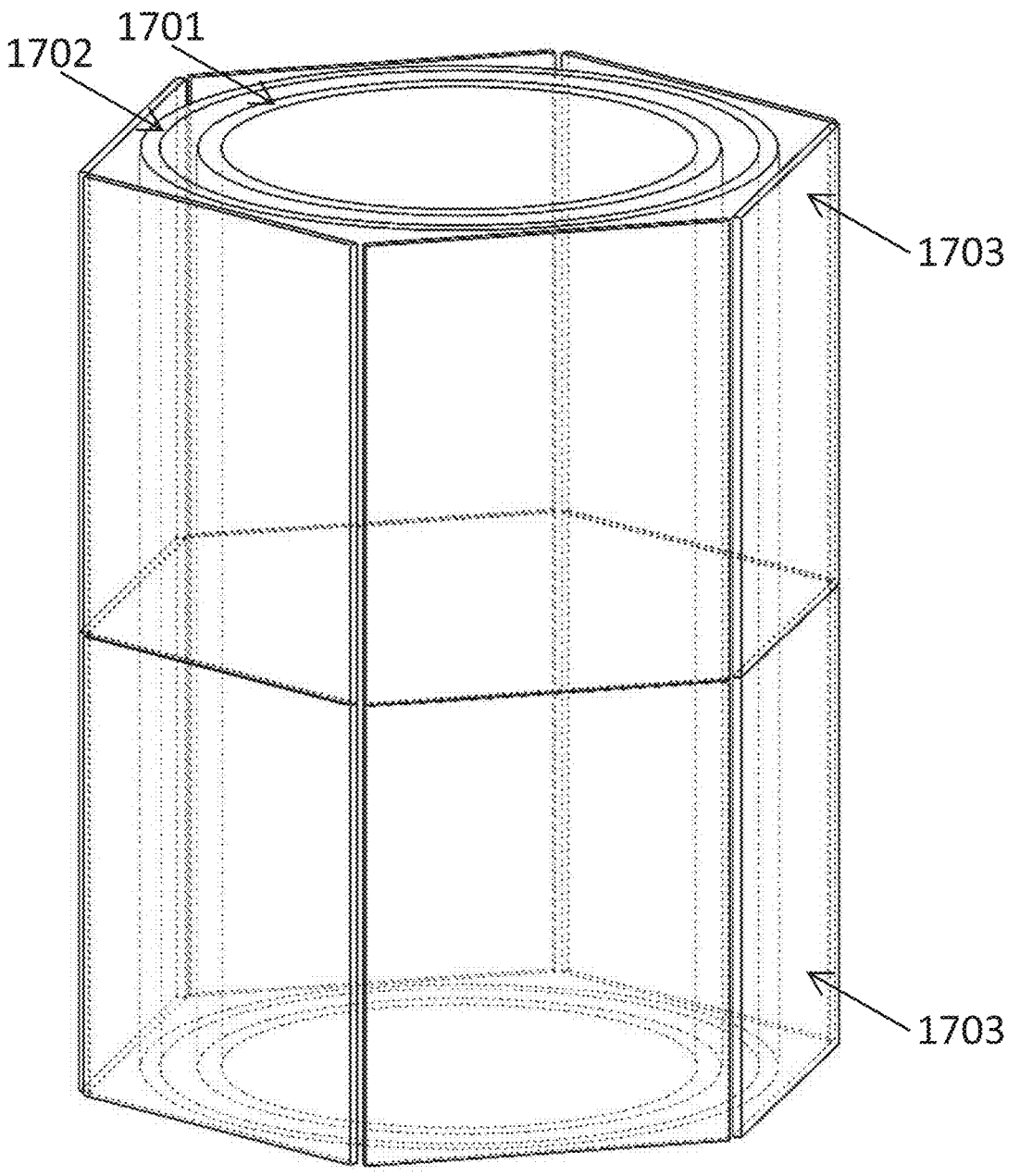
FIGS. 17 and 18 show views of embodiments where a second transparent chamber surrounds the combustion chamber.
Figure 18:
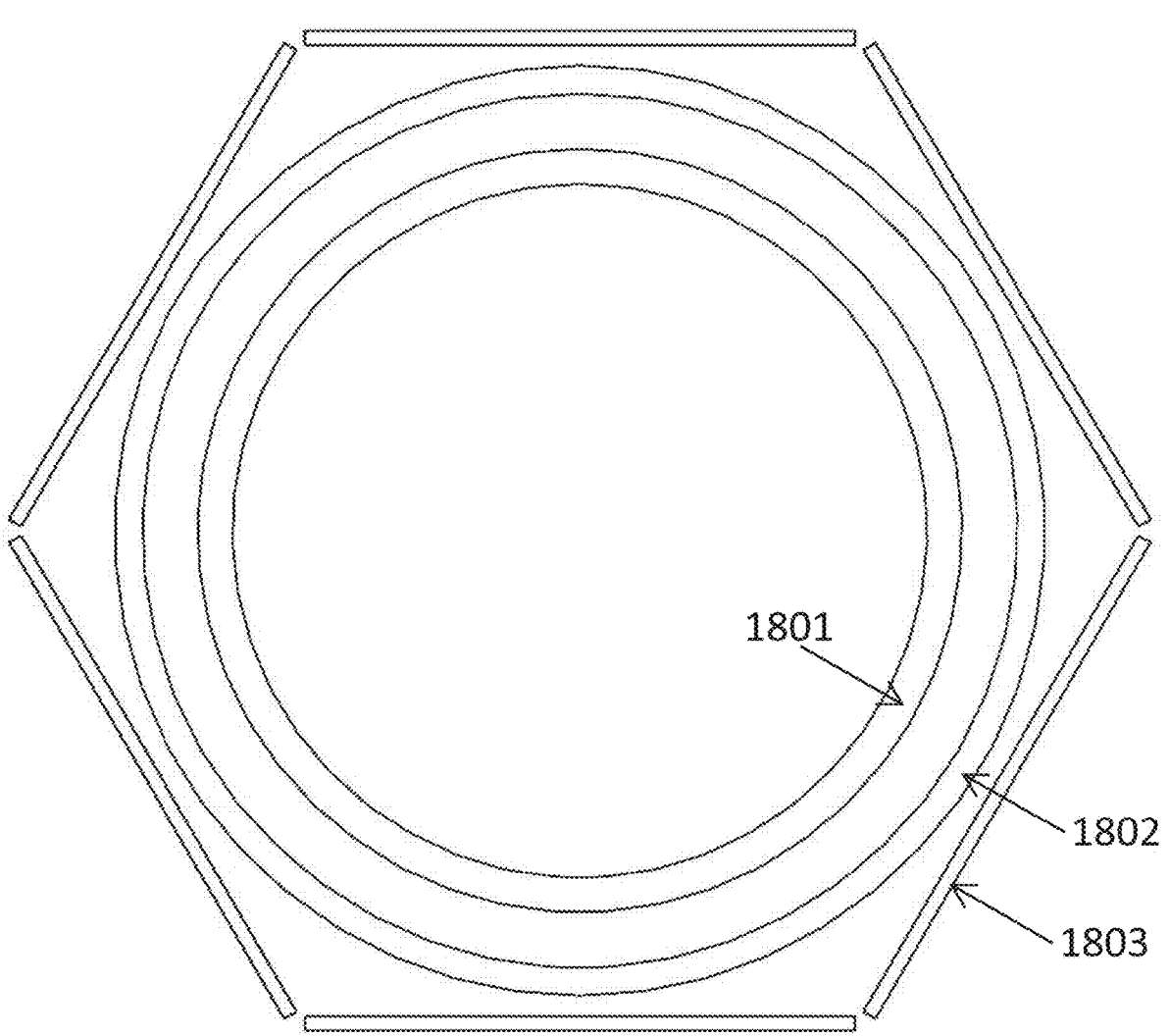

Referring now to FIGS. 17 and 18, in certain embodiments, a second transparent chamber 1702/1802, which is evacuated or filled with low thermal conductivity gas, may surround the combustion chamber 1701/1801. If gas is used for thermal isolation, the various chamber dimensions may be chosen to reduce convective heat transfer by frustrating gas flow.

Figure 19:
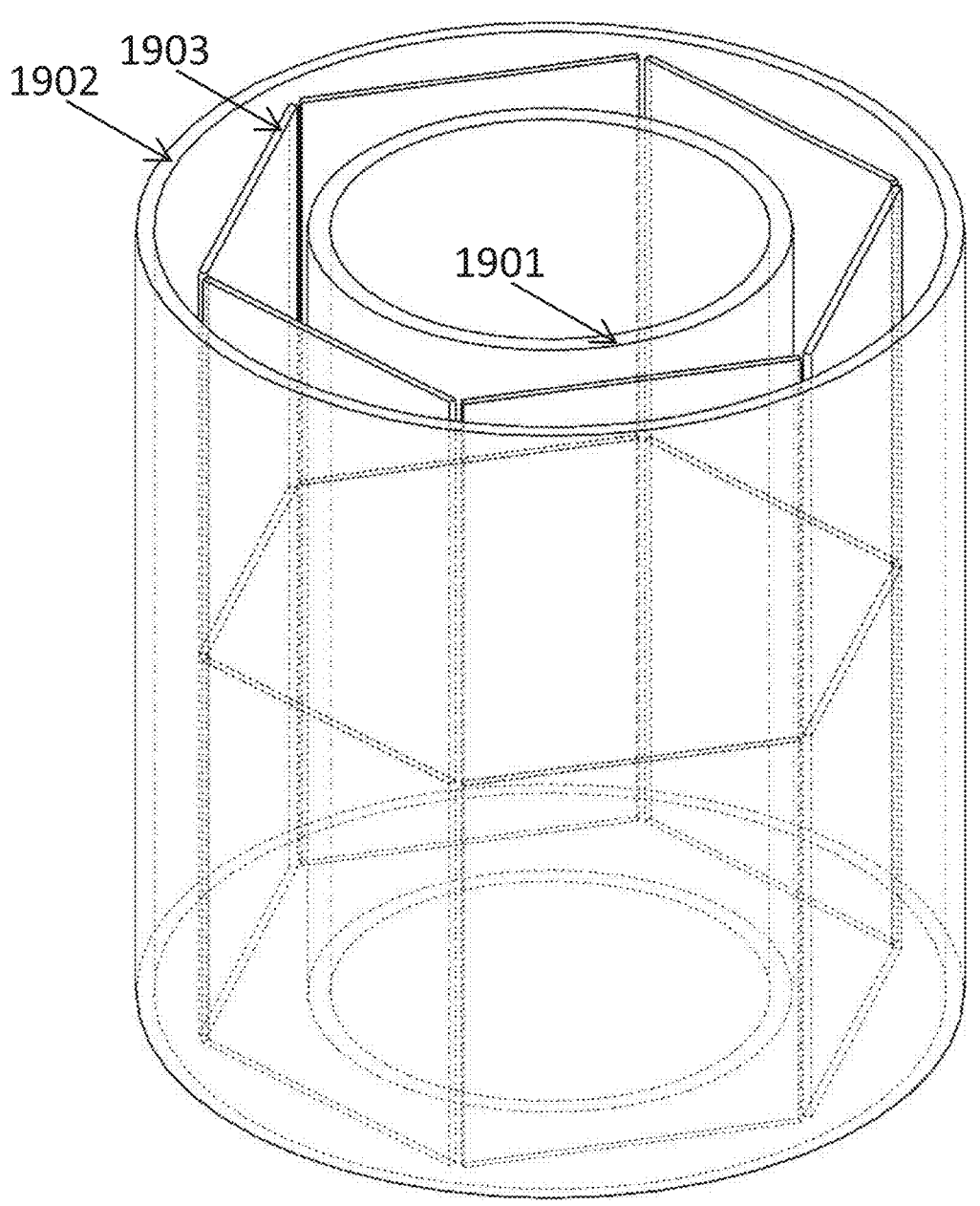
FIGS. 19 and 20 are views of embodiments enclosing the photocell array within the volume between the combustion chamber 1901/2001 and a second cylinder.
Figure 20:
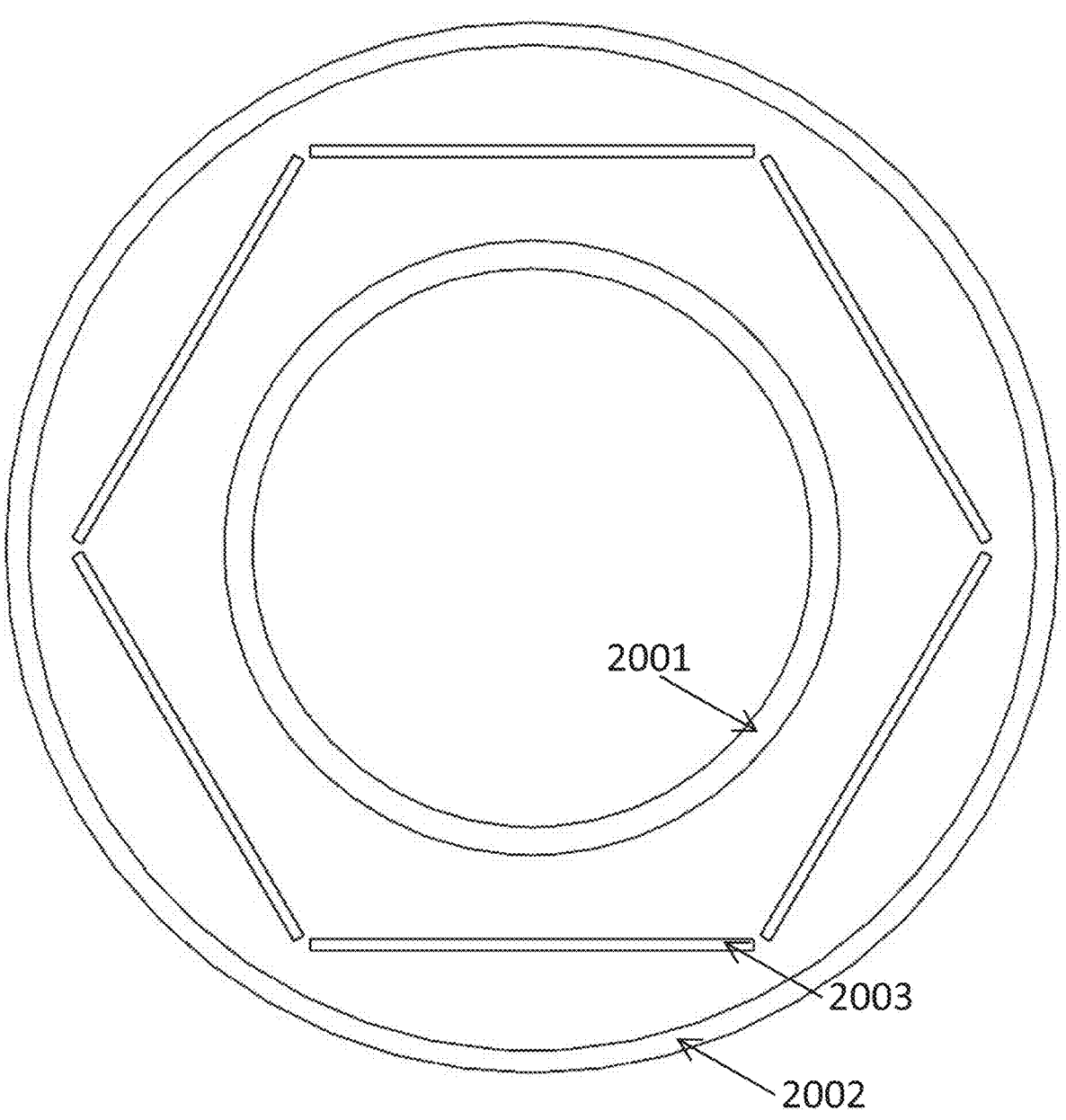

Referring now to FIGS. 19 and 20, other embodiments may enclose the photocell array within the volume between the combustion chamber 1901/2001 and a second cylinder 1902/2002—which need not be transparent. In such an arrangement, the electrical connection may pass through some sealed surface to exit the enclosed volume.

Certain embodiments may use a secondary electrical system to meet peak power requirements and/or for system start-up. It may also be used for balancing power and load, at a higher response rate than the combustion system can throttle. Thus in some embodiments, a secondary energy storage system (block 703 in FIG. 7) is present.

Such a system may be comprised of batteries, capacitors, super capacitors, or some combination of these. The energy storage devices are discharged to meet peak power needs and/or to initiate combustion during startup. The devices are recharged during periods of lower power needs.

Particular embodiments may use an inverter to deliver AC power. Applications and devices exist designed to consume alternating current (AC) power.

PV cells natively output direct current power. In some embodiments, an inverter may be added to the output of the TPV generator to meet AC power needs.

Conversion of heat to electricity via the emission of characteristic radiation according to certain embodiments, is now discussed. Embodiments may utilize one or more configurations of the following elements, alone or in various combinations, in order to implement a combustion-powered TPV generator.

Oxidizer. Oxidizer may be introduced from the top, the bottom, and/or from multiple points within the combustion chamber Fuel. Fuel may be introduced from the top, the bottom, and/or from multiple points within the combustion chamber. A variety of fuels may be burned in the combustion chamber. Possible fuels include but are not limited to:

methane,
    propane,
    butane,
    natural gas,
    ammonia,
    hydrogen,
    synfuels,
    gasoline,
    diesel,
    jet fuel (JP-8 and similar).

Flame. One or more flames may be active within the combustion chamber.

Emitting material. The emitting material can be introduced as a consumable material and/or incorporated into a combustion chamber wall one or more structures within the combustion chamber (e.g., as a surface coating or encapsulated or incorporated within a transparent structure). If the emitting material is consumable, it may be introduced directly into the combustion chamber. The emitting material can be mixed with the fuel, or it can be mixed with the oxidizer or some combination of these. The emitting material can be introduced as a powder, as a liquid, as a vapor, or as an aerosol. If the emitting material is introduced as an aerosol, it can be introduced directly into the combustion chamber, or premixed with the fuel, or premixed with the oxidizer, or some combination of these.

FIG. 47 shows a table with a non-exclusive list of emitting atoms. FIGS. 48A-B are tables with a non-exclusive list of compounds that may serve as emitting materials.

It is noted that emitting materials may comprise metals. Examples can include but are not limited to metallic sodium, metallic potassium, or others.

It is also noted that emitting materials may comprise atomic dopants. One example is yttrium in yttrium-stabilized zirconia.

Wicking. In some embodiments a wicking structure may be present that collects emitting material. Then, via capillary action, the wicking structure allows the emitting material to drip into the flame(s).

Beads of various sizes may be used that:
1) have emitting material incorporated into their structure, or
2) have emitting material that coats their surfaces permanently, or
3) have surfaces to which emitting material adheres during operation of the TPV cell.

If beads are used, they can form a stationary bed or permanent structure within the combustion chamber. In certain embodiments, the beads can be moved about via convection of the gasses circulating within the chamber such that the emitting material coating the beads or adhering to them or encapsulated or incorporated within them, is periodically exposed to the flame(s).

A regenerator may be employed to capture the emitting material and/or heat that leaves the combustion chamber and then return it to the chamber. One or more flow structures within the combustion chamber may be used to direct the flow of the incoming reactant gasses, the flow of the outgoing exhaust gasses, or both.

The oxidizer, the outgoing exhaust gasses, and/or some portion of one or both may be directed such that they cool the inner surface of the combustion chamber. A heat exchanger may be used to transfer heat from the exhaust gasses to preheat the oxidizer or the fuel or both before it enters the combustion chamber. An ignition device (such as a glow plug or spark plug) may be present in the combustion chamber to initiate combustion.

In specific embodiments, the combustion chamber geometry is a cylinder and combustion flame(s) are aligned with the axis of the cylinder.

Figure 21:
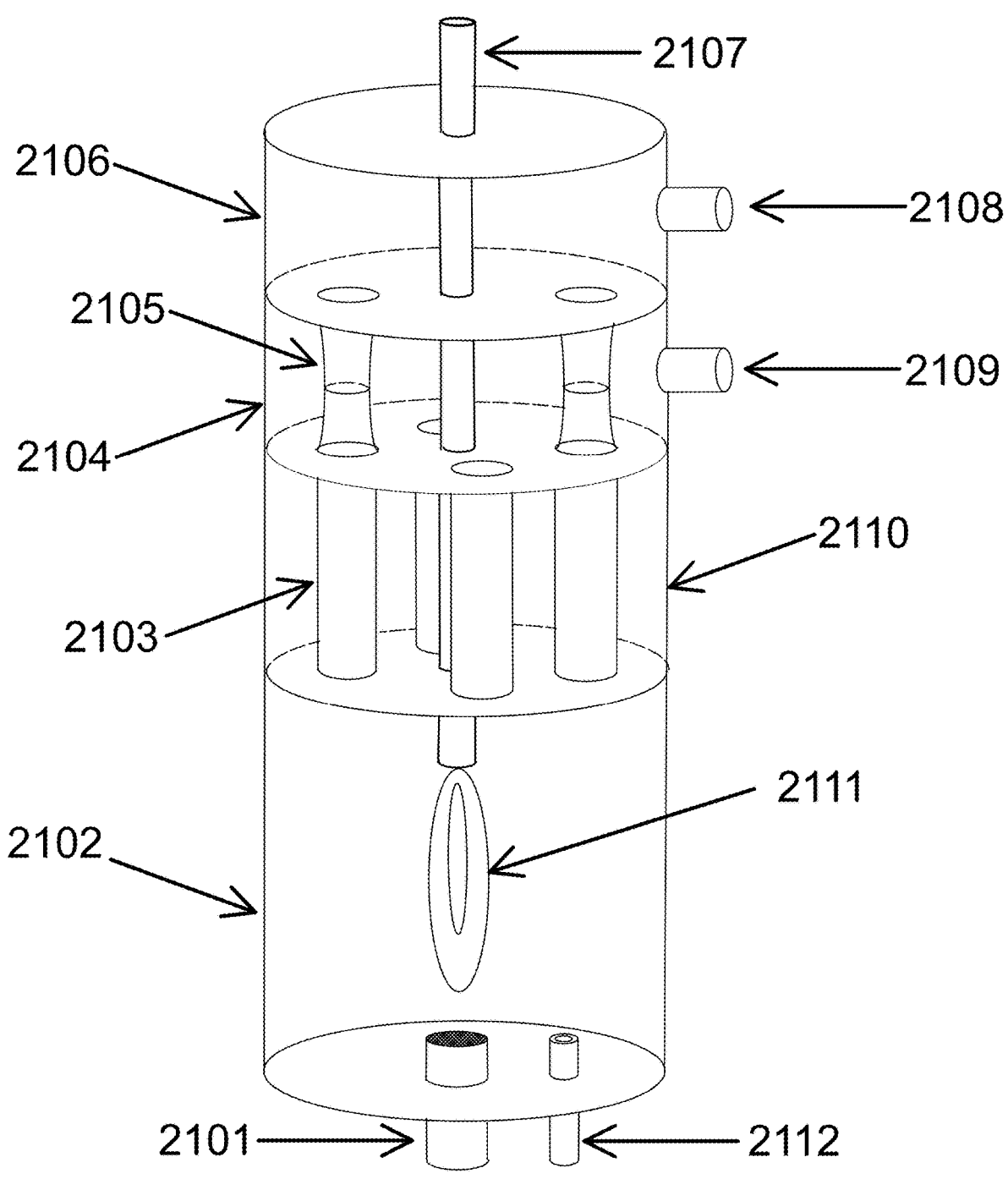
FIG. 21 shows a simplified view of a generator according to an embodiment.

Referring now to FIG. 21, one embodiment of a TPV generator is shown in simplified form. In this specific embodiment, the fuel is introduced into the combustion chamber 2102 via a conduit 2107.

Oxidizer, for example air or oxygen gas, is introduced via inlet 2108. The oxidizer is drawn in either passively, or actively via a fan or other mechanism (not shown).

The oxidizer passes through a plenum 2106 then through a plurality of channels 2105. Only two are shown here for the sake of visual clarity, but in some embodiments there are many more such channels.

The oxidizer then passes through a set of channels 2103 in a heat exchanger 2110. In FIG. 21 the heat exchanger is a counterflow arrangement, wherein the exhaust gasses leaving the combustion chamber pass through a substantially equal number of channels in the direction opposite to the incoming oxidizer.

The gasses flowing through the oxidizer and exhaust channels are thus in thermal communication but not in direct communication. Heat is transferred, but the oxidizer and exhaust gases do not mix.

The incoming and outgoing channels are interleaved so that each channel of one type is adjacent to a plurality of channels of the other type. Such an arrangement can enhance heat transfer from the exhaust gasses to the incoming oxidizer.

Once the fuel and oxidizer are ignited by an ignition mechanism 2112 (e.g., glow plug or spark plug) the combustion flame 2111 heats the chamber. An emitting material—for example a sodium compound (such as sodium chloride, sodium fluoride, sodium bromide sodium iodide, sodium sulfate, sodium bicarbonate, sodium amide, or a combination of such salts)—is introduced via 2101. Details regarding the introduction of emitting material are described later below.

This material is heated by combustion until it emits radiation characteristic of the material. For example, sodium-containing materials will emit sodium D-line radiation at about 589 nm).

The combustion chamber is constructed such that the great majority of this radiation leaves the chamber through its transparent wall(s).

The probability of an atom being in an excited state, and subsequently emitting characteristic radiation may be approximated using the Boltzmann distribution—that is, it is proportional to:

$$\exp(-e/kT).$$

Figure 49:
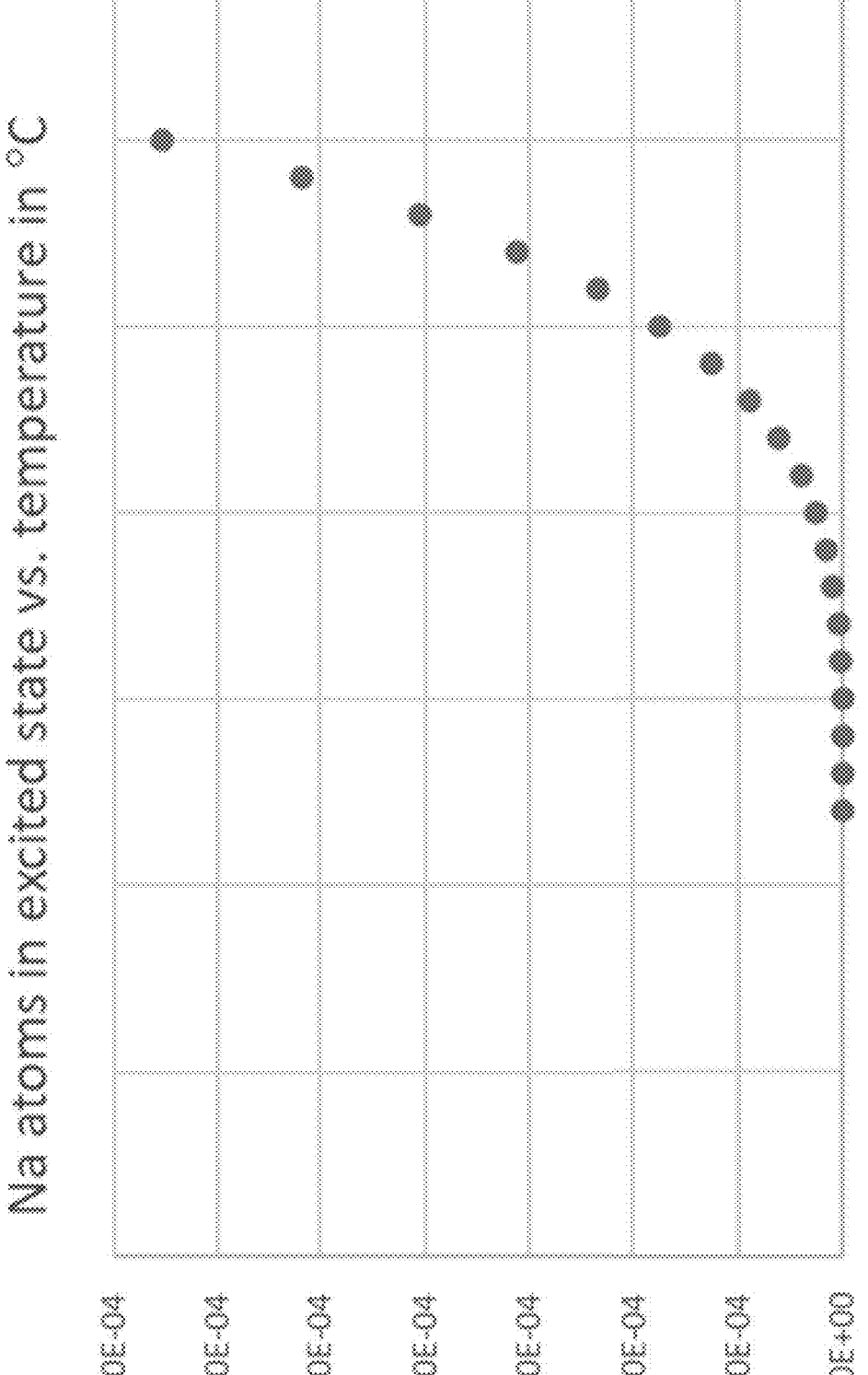
FIG. 49 plots sodium atoms in excited state versus temperature in ° C.

The emission intensity increases exponentially with temperature. This can be seen in FIG. 49, which plots sodium atoms in excited state versus temperature in ° C.

If the temperature experienced by sodium atoms is increased from 1200° C. to 1500° C., the number of excited sodium atoms (and consequently the intensity of characteristic radiation) increases by a factor of about fifteen. Raising the temperature further to 2000° C.—to near the adiabatic flame temperature of propane (1980° C.)—increases emissions by another factor of nearly twenty.

Recycling heat by reflecting infrared emissions back to the combustion chamber, and/or using the heat in the exhaust gasses to heat the incoming oxidizer, can increase the temperature in the combustion chamber above the adiabatic flame temperature (defined with the reactants introduced at STP). Compared to the characteristic radiation emitted at 2000° C., the intensity of radiation at 2500° C. is almost seven times greater.

If the concentration of emitting material in the flame is low (e.g., below about 10 ppm, with the exact number varying according to depth and/or situation), the increase in emissions is nearly linear in increased concentration. If the concentration is above about 10 ppm, emissions increase proportionately with the square root of the increased concentration less pronounced (see FIG. 46).

Design choices can maximize the temperature experienced by the emitting material. Doing so improves the conversion efficiency of fuel to characteristic radiation. Examples of such approaches are discussed in detail below.

It is noted that introducing emitting material into the hottest part of the flame (as opposed to cooler regions) can have a beneficial effect.

Certain emitting materials (for example sodium chloride) will be in the vapor or plasma state when heated to the adiabatic flame temperatures of most fuels. This, along with desirability of heating the emitter to high temperatures, may inform detail(s) of the design.

The exhaust products of combustion exit the chamber and pass through the heat exchanger. The exhaust products reach a second plenum 2104, and then exit the TPV cell via an outlet 2109.

In certain embodiments, the flow through the TPV cell occurs in the opposite direction. That is, oxidizer enters through 2109 and the exhaust gasses exit via 2108.

In the embodiment shown in FIG. 21, some fraction of the emitting material may remain in the combustion chamber while the remainder exits the chamber intermingled with the exhaust gases.

In one example, an appropriate quantity of emitting material may be calculated as follows. The reactants are propane and air. The emitting material is sodium chloride (NaCl). One kilowatt of sodium D-line characteristic radiation is desired.

It is assumed that combustion is stoichiometric and complete. In this example, waste heat from the exhaust stream is recaptured and used to heat the incoming air. As a result, the temperature of the emitting sodium atoms is assumed to be 2500° C. (that is, substantially higher than the adiabatic combustion temperature of propane and air at STP, 1980° C.).

An excited Na atom emits a 2.1 eV photon following a 3p to 3s (excited state to ground state) transition. One kilowatt-hour is $2.25 \times 10^{25}$ eV. Therefore, $2.25 \times 10^{25}/2.1 = 1.1 \times 10^{25}$ sodium D-line emissions deliver 1 kWh.

The Boltzmann distribution: exp (−e/kT), gives the probability of a Na atom being in an excited state with energy e (in joules) at temperature T (in Kelvin). The Boltzmann constant $k = 1.4 \times 10^{-23}$ J/K.

For the 3p-3s transition, $e = 2.1$ eV $= 3.36 \times 10^{-19}$ J, and our desired temperature is 2500° C. $= 2773$ K. The probability is therefore exp $(-3.36 \times 10^{-19}/(1.4 \times 10^{-23} \times 2773)) = 1.7 \times 10^{-4}$. That is, at 2500° C., approximately one out of every 5,700 sodium atoms is in the 3p excited state at any given time.

An Na atom in its excited 3p state will emit a photon and return to its 3s ground state after 16 ns, on average. So each Na atom will emit $3600/16 \times 10^{-9} = 2.25 \times 10^{11}$ photons per hour.

As discussed above, $1.1 \times 10^{25}$ emissions deliver 1 kWh. Each excited Na atom delivers $2.25 \times 10^{11}$ photons per hour, and one out of every 5,700 Na atoms present is excited. Therefore, $5,700 \times 1.1 \times 10^{25}/2.25 \times 10^{11} = 2.8 \times 10^{17}$ Na atoms present in the combustion chamber emit 1 kW of power (that is, 1 kWh per hour).

A mole of NaCl contains $6.02 \times 10^{23}$ Na atoms and weighs 58.4 grams. Therefore, $58.4 \times 2.8 \times 10^{17}/6.02 \times 10^{23} = 0.027$ milligrams of NaCl heated to 2500° C. will emit 1 kW of sodium D-line light.

The effect of self-absorption may be taken into consideration. Sodium atoms are both absorbers and emitters of D-line photons.

Figure 46:
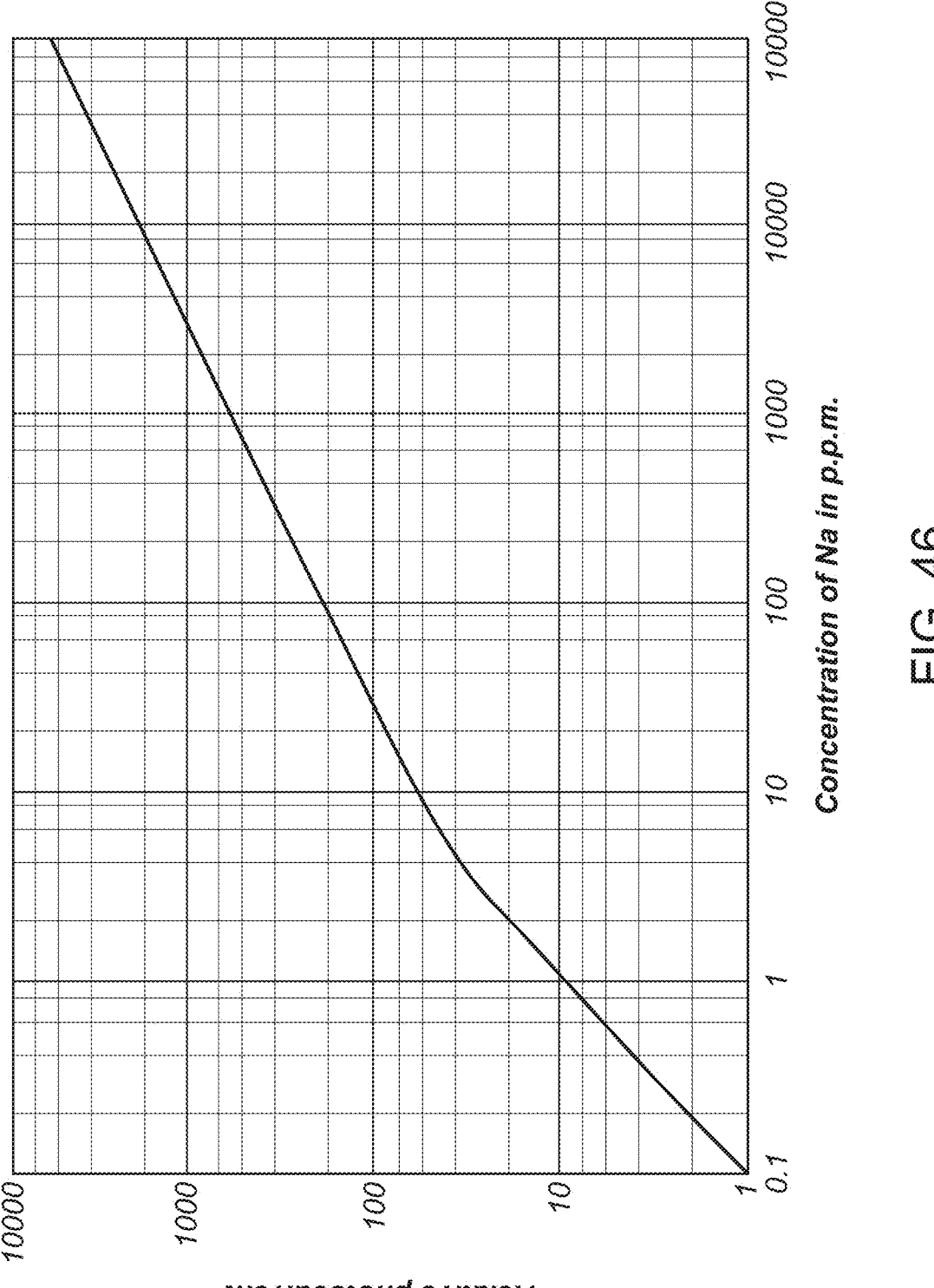
FIG. 46 plots relative photocurrent versus concentration of Na in ppm.

At a sufficiently high concentration of Na in the combustion chamber (e.g., above about 5 ppm), some fraction of the emitted photons may be absorbed by other Na atoms, reducing the intensity of radiation leaving the chamber. FIG. 46 plots relative photocurrent versus concentration of Na in ppm.

A correction factor can be derived from this. That is, the emissions increase approximately as the square root of the Na concentration above 5 ppm.

A combustion chamber that is 12 cm long and 7.5 cm in diameter has a volume of about 0.5 liters. At 2500° C. and 1 atm pressure, that volume will contain 0.0022 moles of an ideal gas.

The amount required to emit 1 kW, 0.027 mg, as computed above, is $4.7 \times 10^{-7}$ moles, or 212 ppm. This is above the concentration at which self-absorption becomes significant.

Based on the correction factor shown in the graph of FIG. 46, about 12,000 ppm, or 1.5 mg of NaCl will emit 1 kW of Na D-line radiation at 2500° C. from a 0.5 liter chamber.

It is noted that the above calculation is simplified. Even taking into consideration the correction factor, this analysis simplifies the physics of electronic excitation via thermal energy.

For example, the rates of excitation may be increased due to affinities between the vibrational and rotational modes of the emitting atoms and those of the various chemical species present in the chamber. Interactions of such rotational and vibrational energies can result in effective temperatures above that of the bulk temperature and, consequently, higher excitation probabilities and higher emissions.

The above sample calculation illustrates that a small mass of sodium-containing salt can produce intense characteristic radiation at 589 nm. This is provided that the sodium atoms are heated to high temperatures.

Figure 22:
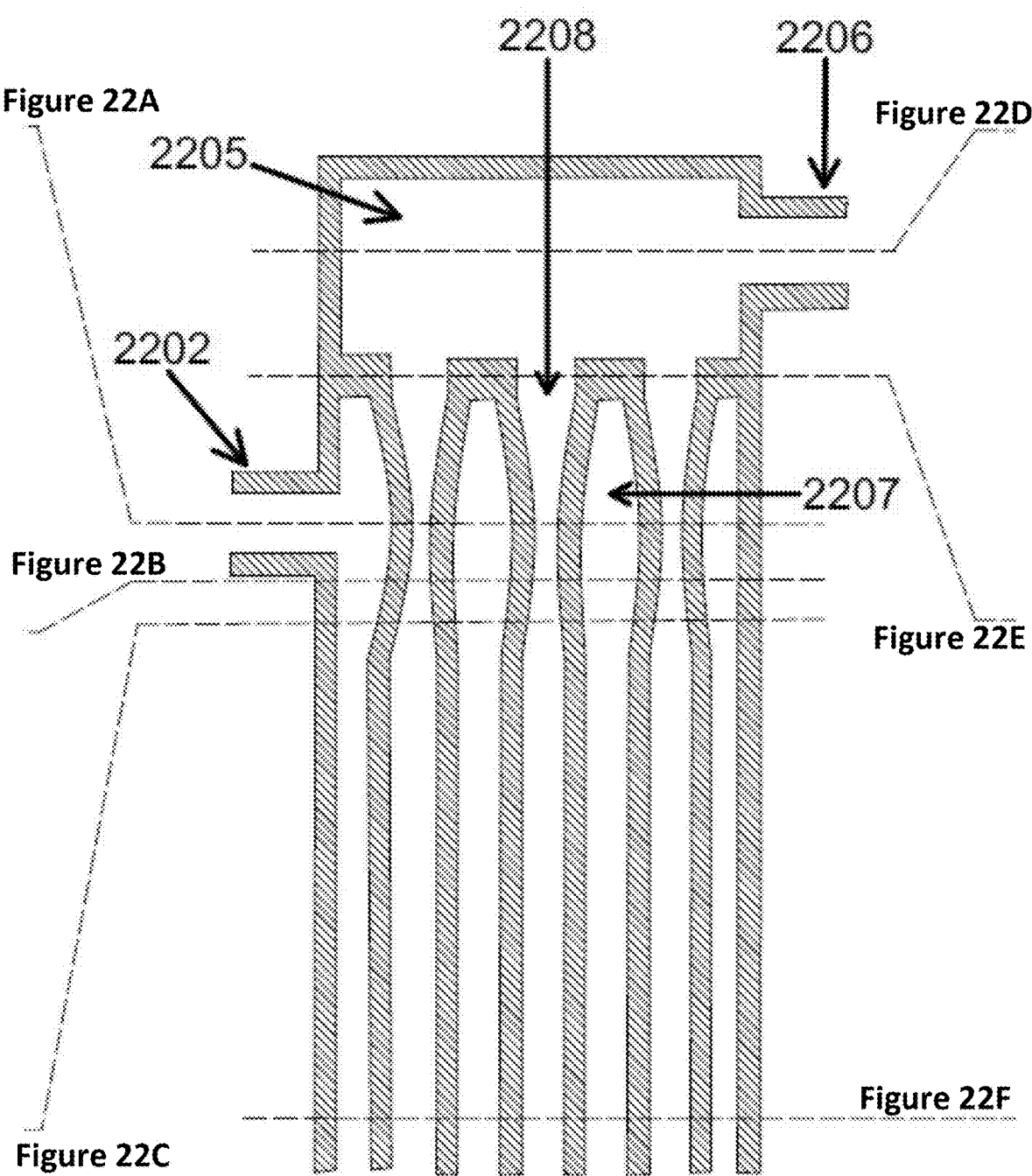
FIG. 22 shows a view of the intake, exhaust and heat exchange mechanisms according to an embodiment.
Figures 22A, 22B, 22C:
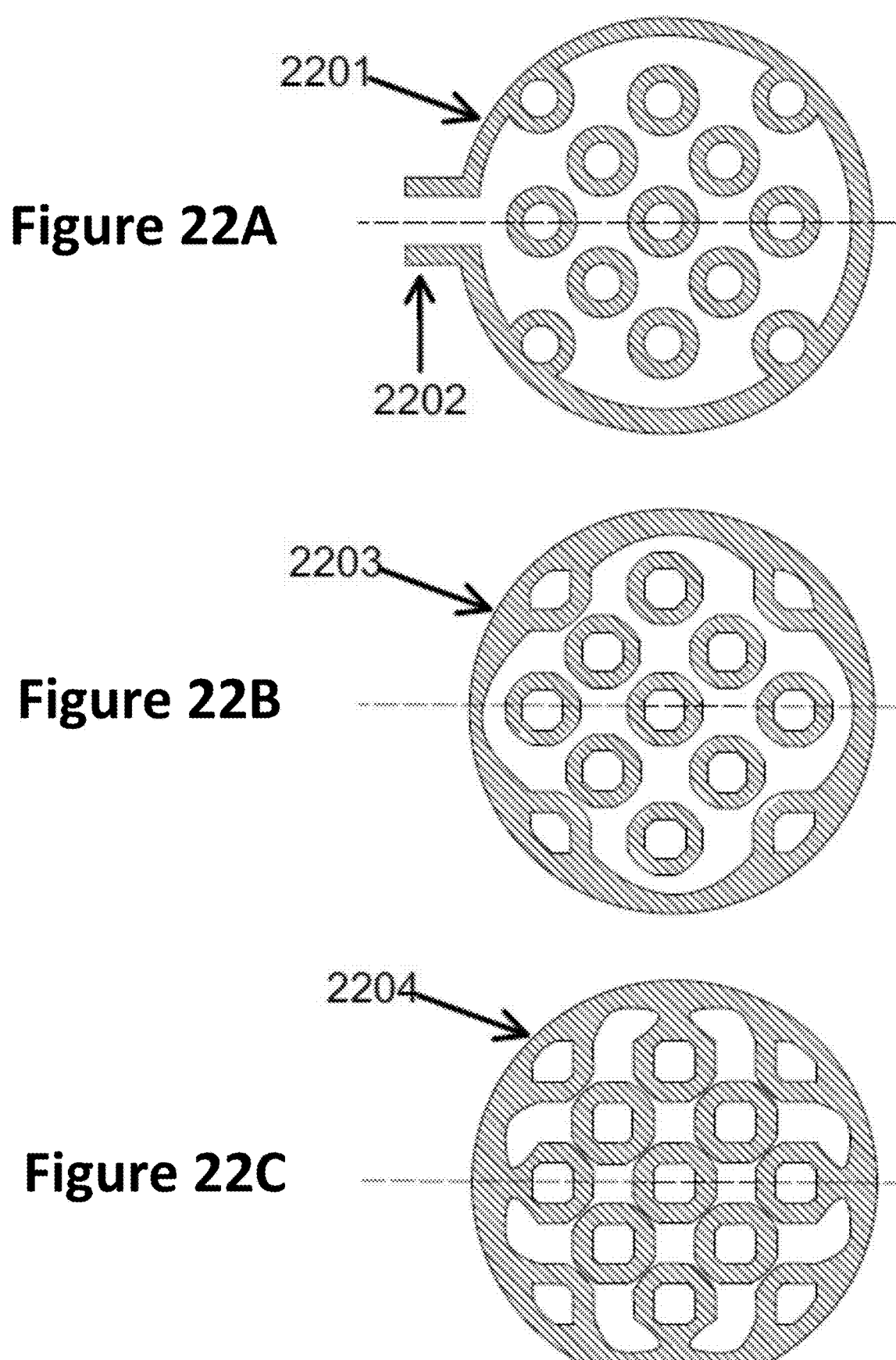
FIGS. 22A-F show selected cross-sections of FIG. 22.

Referring now to FIG. 22, the intake, exhaust and heat exchange mechanisms of FIG. 21 are shown in more detail.

In some embodiments the apparatus shown in FIG. 22 is fabricated from a high-temperature ceramic material (for example, alumina or zirconia) using an additive manufacturing technique (for example, 3D printing followed by sintering). The regions in the figure shown with hatching indicate the presence of this material. The unhatched areas are channels and plenums through which gasses are free to travel.

The apparatus of FIG. 22 integrates three elements also shown in FIG. 21. The oxidizer enters the upper plenum 2205 (2106 in FIG. 21) via inlet 2206 (2108 in FIG. 21). The reference number 2209 and FIG. 22D show this plenum in cross-section.

Figures 22D, 22E, 22F:
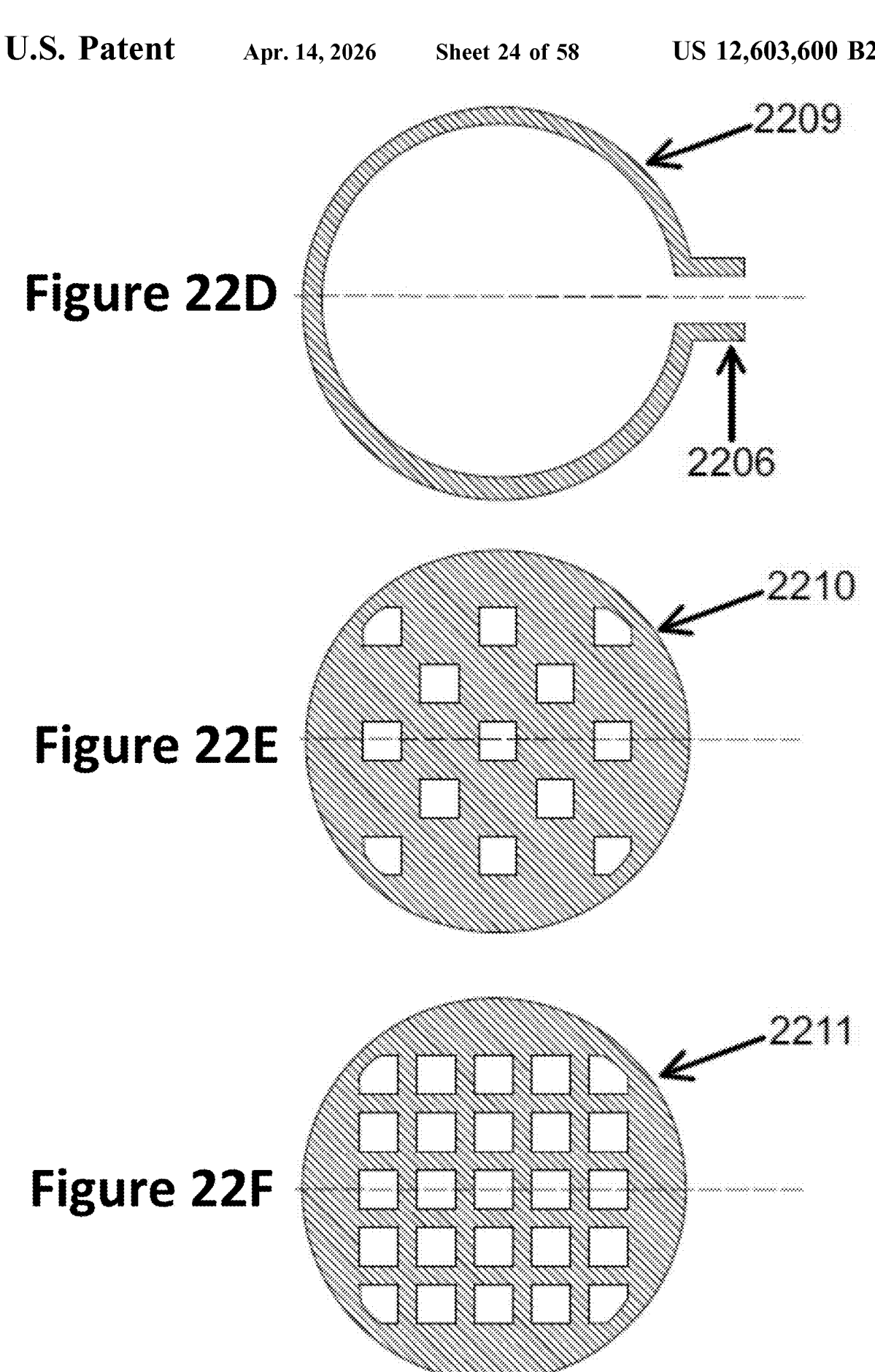

The oxidizer proceeds from the upper plenum through channels 2208 (2105 in FIG. 21) that lead through the lower plenum (cross-section 2201, 2104 in FIG. 21), and finally into the heat exchanger section (cross-section 2211 and FIG. 22F, 2110 in FIG. 21). The series of cross-sections 2210, 2201, 2203, 2204, and 2211 (FIGS. 22E, 22A, 22B, 22C, and 22F respectively) shows one example of how the size and shape of the channels may change with distance along the axis of the apparatus.

Various embodiments may utilize different channel geometries. Some features common across different embodiments may include one or more of the following.

1) The size and shape of the oxidizer channels 2208 vary in such a way that the exhaust gasses reaching the upper plenum 2201 (2106 in FIG. 21) can flow freely around the exterior walls of the oxidizer channels in the lower plenum.

2) The exhaust channels 2207 (2103 in FIG. 21) open up as they enter the upper plenum until they are in direct communication with each other and with the outlet 2202 (2109 in FIG. 21).

While the oxidizer and the exhaust gases are passing through the heat exchanger section 2211 and FIG. 22F of the apparatus, they are in thermal communication. So, heat is transferred from the exhaust to the oxidizer.

In embodiment of the apparatus of FIG. 22, the exhaust and the oxidizer remain in separate channels or plenums and do not mix.

Note that (as in FIG. 21) in some embodiments the direction of flow may be the reverse of that just described. That is, oxidizer enters the apparatus via 2202 and the exhaust gases exit via 2206.

Note also that the channel through which the fuel enters the combustion chamber (2107 in FIG. 21) is omitted in FIG. 22 for reasons of visual clarity. In certain embodiments it is present and passes through the center of the apparatus (e.g., FIG. 21).

Figure 24:
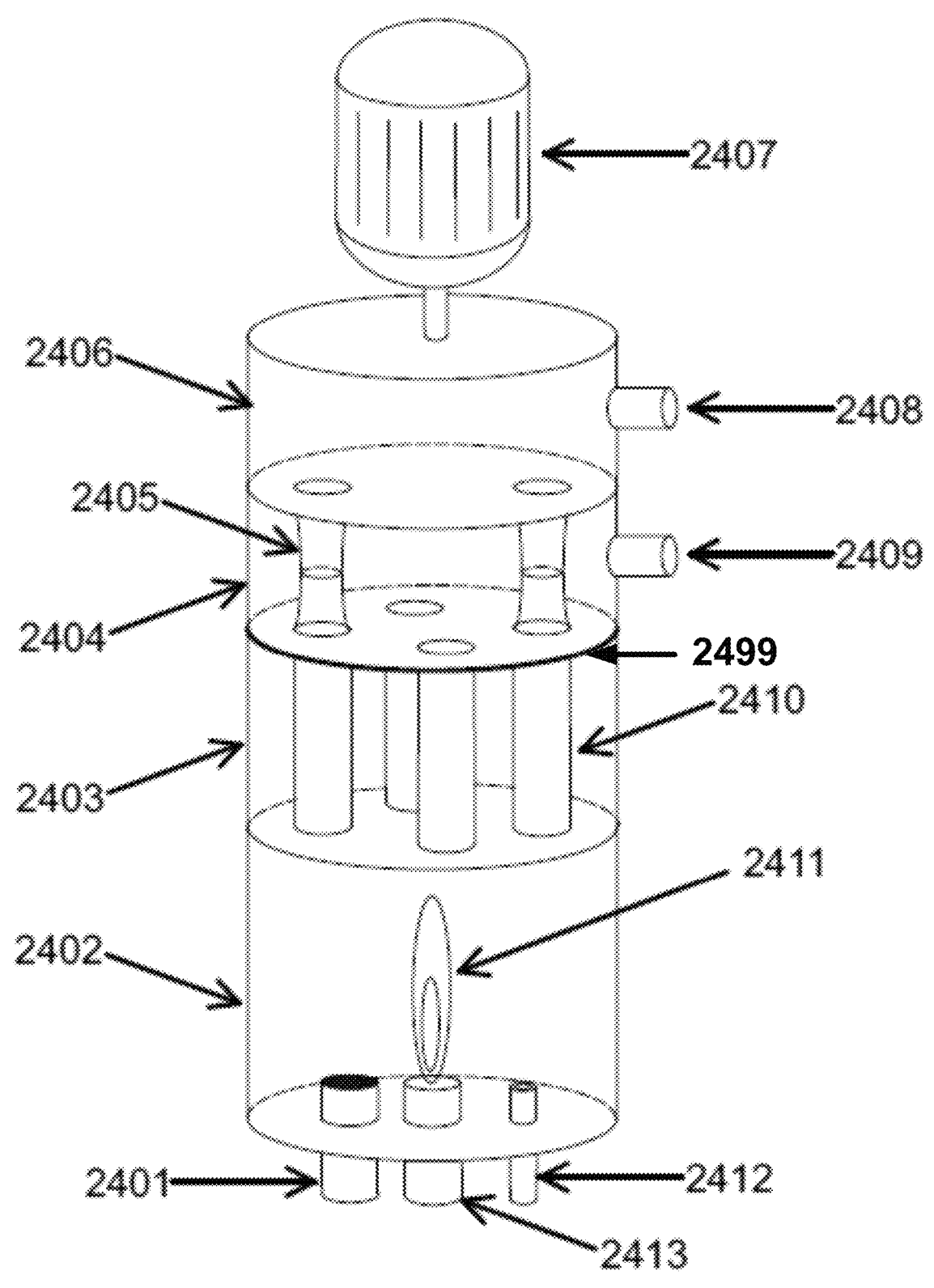
FIG. 24 is a simplified illustration of an approach to recover emitting material.

In specific embodiments that channel is absent, and the fuel enters the chamber from below. An example is depicted in FIG. 24.

In some embodiments the apparatus is fabricated as a single unit. This is shown in FIG. 22.

In other embodiments, the apparatus is comprised of multiple attached sections. Such an arrangement may be desirable so that a different material capable of tolerating high temperatures can be utilized for the section closer to the combustion chamber. A less temperature-tolerant (but lower cost) material can be used for the sections that are farther away from the combustion chamber and are thus exposed to lower temperature gases.

The heat exchanger section of the apparatus shown in FIG. 22 may be longer or shorter than shown in the figure relative to the other dimensions.

A simplified sample calculation for dimensions of a heat exchanger is now described. In this example, the desired rate of heat transfer from the hot exhaust gasses to the incoming oxidizer is 1 kW (that is, 1 kWh of heat transferred per hour).

Note that this does not necessarily result in the TPV generator delivering 1 kW of power. The relationship between the system power and heat duty of the heat exchanger can depend upon the system efficiency and other parameters.

The heat duty, or total heat transferred per unit time, by a heat exchanger is given by:

$$Q = M_{hot} * Cp_{hot} * (T_1 - T_2)$$

Q=heat duty (watts)
$M_{hot}$=mass flow of the hot fluid (kg/s)
$Cp_{hot}$=heat capacity of the hot fluid (J/kg*K)
$T_1$=initial temperature of the hot fluid (temperature at the heat exchanger inlet)
$T_2$=final temperature of the hot fluid (temperature at the outlet)

For this example, the exhaust gasses enter the heat exchanger at 1800° C. and exit at 200° C. As an approximation, the heat duty will be computed using an average temperature of 1000° C. The heat capacity of air at 1000° C. is 1.18 kJ/kg*K. From the above equation, for a heat duty of 1 kW, a mass flow of 1.91 kg/hour or 0.53 grams/sec is used.

The heat exchanger area for a heat duty of Q is:

$$A = Q/(U * \Delta T_m)$$

A=area of heat exchanger
U=overall heat transfer coefficient (W/m²*K)

16

$\Delta T_m$=log mean temperature difference:

$$\Delta T_m = ((T_1 - t_2) - (T_2 - t_1))/\ln\left((T_1 - t_2)/(T_2 - t_1)\right)$$

$t_1$=cold fluid inlet temperature
$t_2$=cold fluid outlet temperature

The quantity that is specific to a particular design and set of operating conditions is the overall heat transfer coefficient U.

In the TPV cell designs disclosed in this example, the heat exchanger is a counterflow design, and the fluids are gasses. In this example, the incoming oxidizer is ambient air at 20° C., and the air exits the heat exchanger (and enters the combustion chamber) at 1500° C.

According to various embodiments, a heat exchanger may heat oxidizer to at least 1500° C., to at least 1400° C., to at least 1300° C., or to at least 1200° C.

From equation the above, the log mean temperature difference for this example is 235° C.

A first-order estimate of the overall heat transfer coefficient U can be obtained by calculating the convective heat transfer across the wall separating the hot and cold gas streams. In this example, the wall is 1 mm thick alumina. Ignoring effects such as fouling of the wall surfaces, U is given by:

$$U = 1/\left(1/h_{ci} + s/k + 1/h_{co}\right)$$

$h_{ci}$=convective heat transfer coefficient inside the wall (hot side)
$h_{co}$=convective heat transfer coefficient outside the wall (cold side)
s=wall thickness
k=thermal conductivity of the wall The convective heat transfer coefficients for air and combustion exhaust vary with velocity, temperature, and the geometry of the heat exchanger. In this example, the heat exchanger is fabricated from alumina honeycomb, and the channels through which the gasses flow are narrow (2 mm×2 mm). The thermal conductivity of alumina is 30 W/m*K.

Given the above, estimated values for the convective heat transfer coefficients for the hot and cold streams are 30 and 25, respectively.

Therefore, for this example, the overall heat transfer coefficient U is 13.6 W/m²*K. Note that several approximations were made. In actual operation, U might deviate from this value by a factor of two or more.

With 1 kW heat duty, the surface area required for heat exchange is 0.31 square meters.

In this particular example, an alumina honeycomb heat exchanger 8 cm in diameter with 2 mm square holes and 1 mm walls with a square arrangement of the holes is used. Such a heat exchanger will have 0.31 square meters of surface area in each direction of flow if its length is approximately 12.5 cm.

In the embodiment shown in FIGS. 21 and 22, the heat exchanger is integrated into the TPV generator. In other embodiments heat exchanger(s) can be separate device(s).

Such a separate heat exchanger can use a counterflow arrangement similar to that illustrated in FIGS. 21 and 22. Other heat exchange methods could be used, for example crossflow, parallel flow, shell-and-tube, plate, recuperator, or another design.

Figures 23A, 23B:
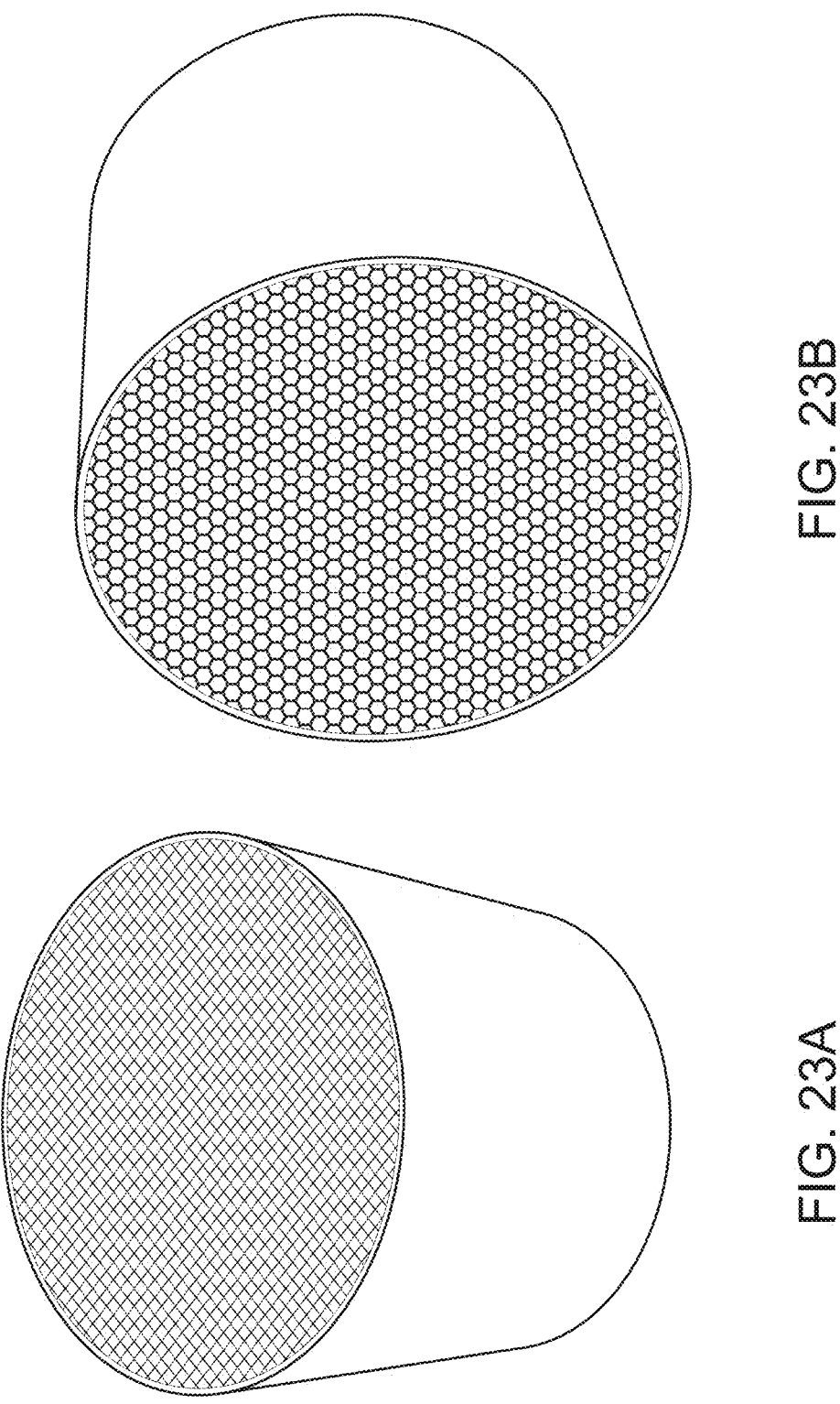
FIG. 23A shows a view of an embodiment of a honeycomb having channels of squares.
FIG. 23B shows a view of an embodiment of a honeycomb having channels of hexagons.

Although only twenty-five channels are shown in FIG. 22 (and only four in FIG. 21), a greater number of channels may be present in the apparatus (e.g., as a honeycomb structure). Such a honeycomb may have channels of various shapes—for example squares or hexagons as illustrated in FIGS. 23A-23B.

Referring now to FIG. 24, an approach to recover some of the emitting material is illustrated. The apparatus shown in FIG. 24 differs from that of FIG. 21 in at least two respects.

First, the fuel enters from the bottom of the combustion chamber. Second, the upper part of the apparatus (the upper and lower plenums, 2406 and 2404) are able to rotate relative to the lower section (the heat exchanger 2403 and the combustion chamber 2402). The boundary between the two sections is indicated with line 2499.

The emitting material is introduced via a mechanism 2401. The flame 2411 is ignited by a mechanism 2412. The fuel is introduced into the combustion chamber via a conduit 2413.

The emitting material leaves the combustion chamber primarily as a vapor intermixed with the exhaust gasses. The heat exchanger section of the apparatus 2403 may be designed so that the emitting material changes phase with the distance it travels upward along the heat exchanger.

The emitting material may first condense from vapor to liquid, and then from liquid to solid. Phase transitions are shown in simplified form in the plots of FIGS. 25 and 26.

In the embodiment illustrated in these figures, the emitting material is sodium chloride, the fuel is propane, and the oxidizer is air. The features illustrated in these figures may be similar if different reactants and/or emitting materials are used.

The exhaust gasses enter the bottom of the heat exchanger (shown as 2502 in FIG. 25) at a temperature high enough that the emitting material is primarily in the vapor phase. Oxidizer passing through adjacent channels in the heat exchanger cools the exhaust as it travels upward, ultimately reaching a temperature at which the emitting material condenses to a liquid (the region shown as 2503).

Figure 25:
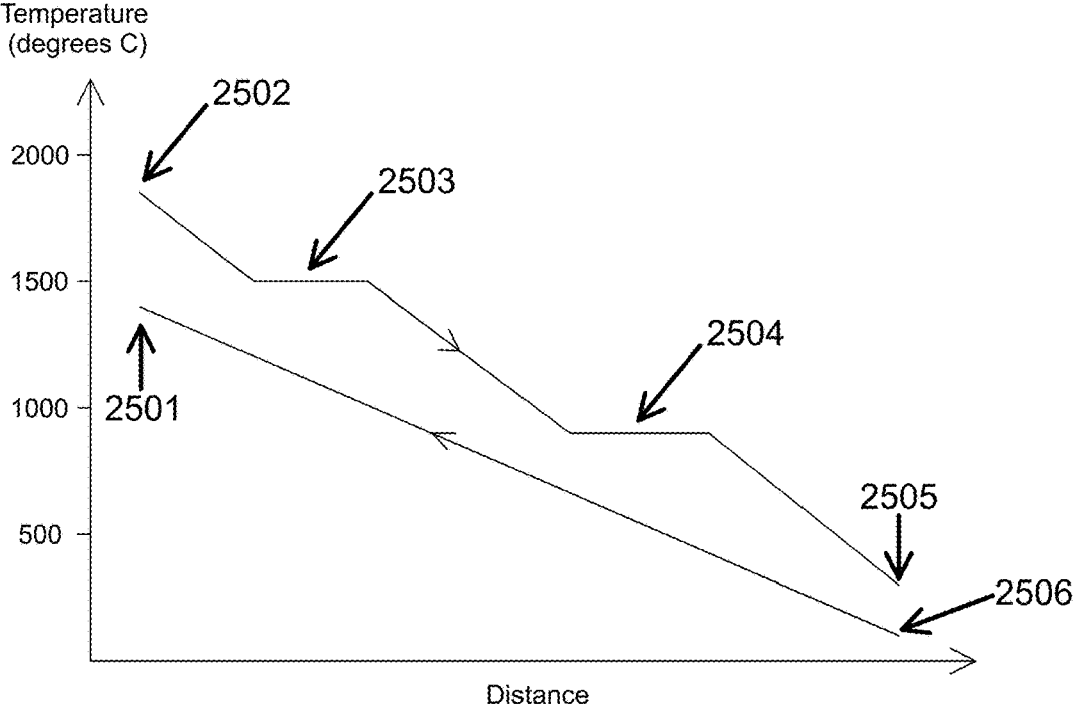
FIG. 25 is a temperature plot versus distance along a heat exchanger.

The temperature of the oxidizer increases as it absorbs heat from the cooling exhaust. This is shown in FIG. 25 as the line proceeding from 2506 to 2501. The liquid emitter continues to cool until it reaches the temperature at which it condenses as a solid (shown as 2504 in FIG. 25).

Figure 26:
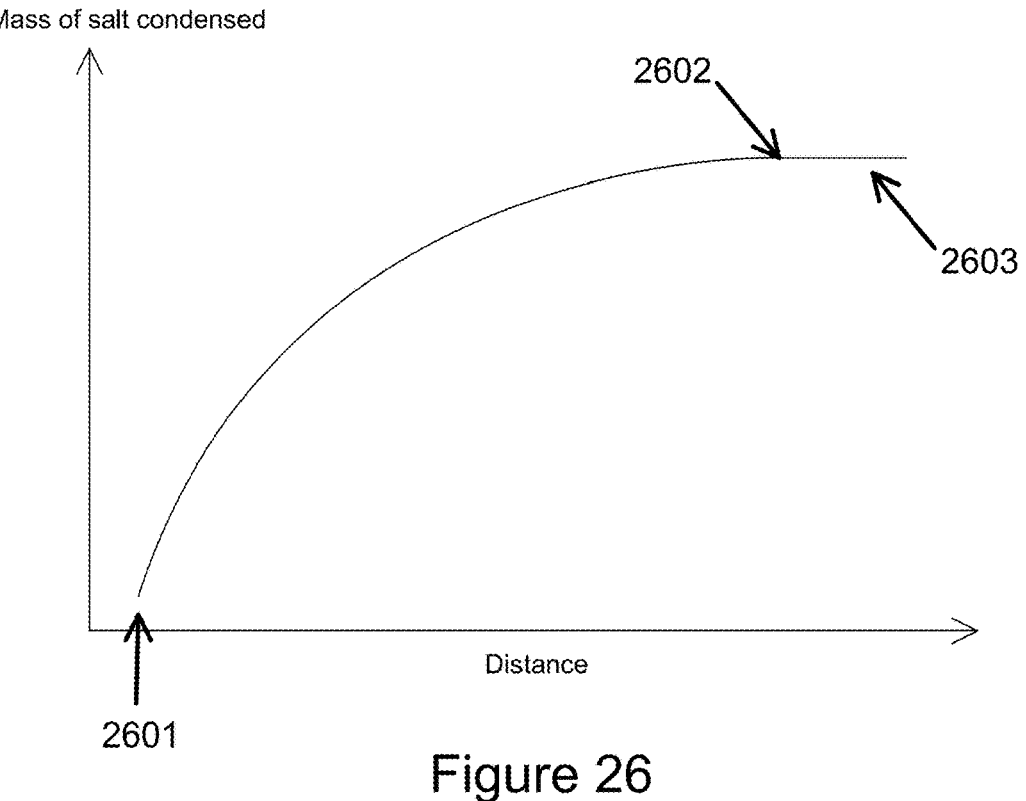
FIG. 26 is a plot showing accumulating mass of condensing emitting material versus distance along a heat exchanger.

The accumulation of condensed solid with distance along the heat exchanger channels is shown in FIG. 26. By 2602, substantially all the emitting material may have condensed.

Referring again to FIG. 24, the shaft of a motor (e.g., stepping motor) 2407 is attached to the upper section of the apparatus. At regular intervals this motor (which is also anchored to some fixed point, not shown) rotates the upper section of the apparatus relative to the lower section.

The rotation angle is calculated to realign the channels such that the exhaust gasses flow through the channels that the oxidizer had flowed through previously and vice versa. In the particular embodiment illustrated in FIG. 24, that rotation angle is 90 degrees.

Once the upper section has realigned, incoming oxidizer passing downward through the heat exchanger is heated to a temperature sufficient to melt the emitter condensed on the wall during the previous part of the cycle. Once melted, the emitting material will flow down the remainder of the length of the heat exchanger (due to gravity) re-entering the combustion chamber.

As a result of the periodic rotation of the upper section, in this embodiment the heat exchanger acts as a regenerator for the emitting material.

If the heat exchanger is fabricated from ceramic honeycomb with square channels (such as is shown in FIG. 23A) and there are a substantially equal number of channels for each direction of flow (distributed uniformly), the rotation angle to reverse the flow as described above will be 90 degrees. The angle may be different for other channel geometries.

In certain embodiments, periodic rotation effected by the motor may proceed in alternate directions. This can simplify connections to the inlet (2408) and the outlet (2409).

Figure 27:
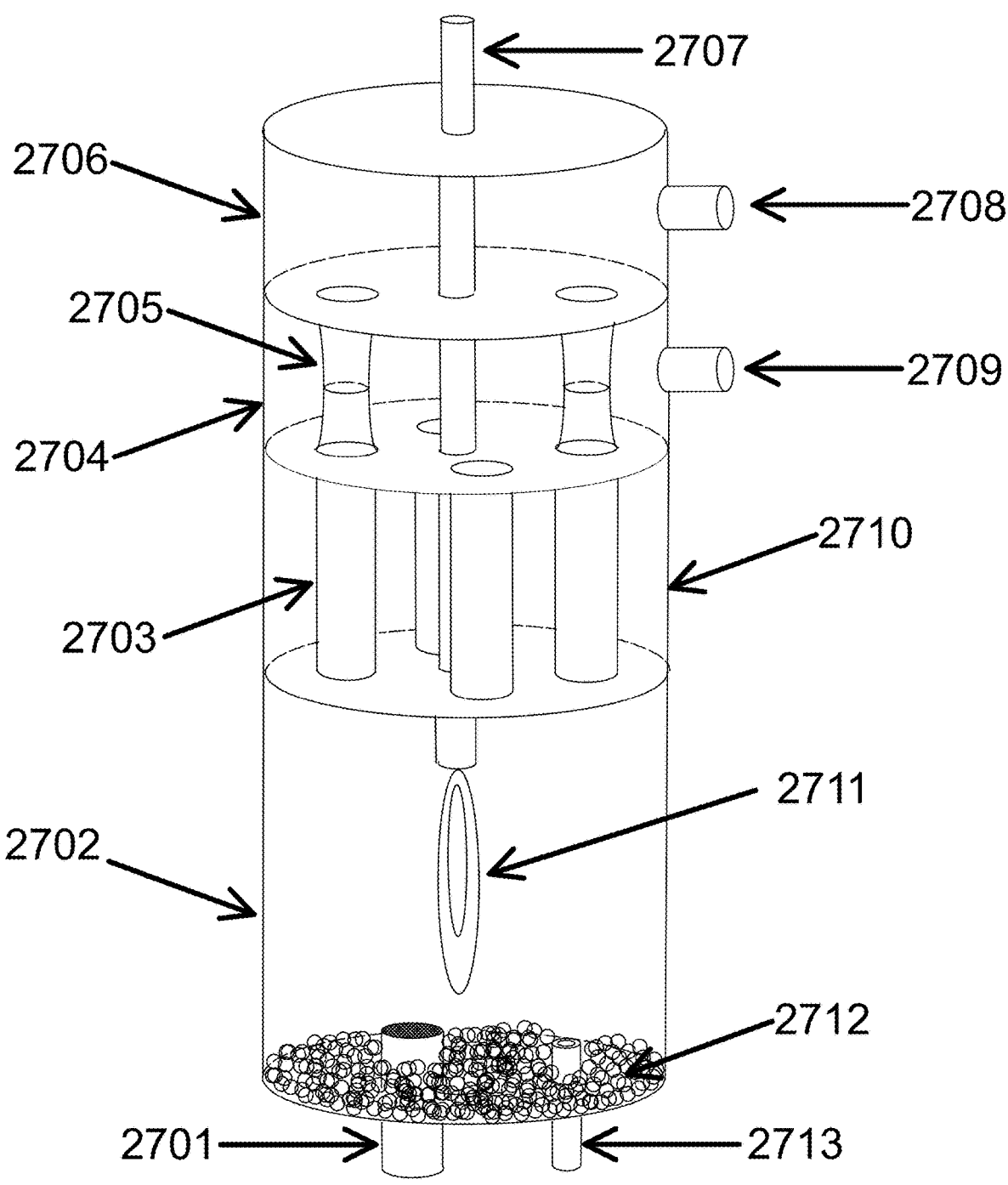
FIG. 27 shows an embodiment utilizing a bed of ceramic beads.

Referring now to FIG. 27, that embodiment utilizes a bed of ceramic beads 2712 at the bottom of the combustion chamber 2702. These allow the formation of a reservoir of emitting material.

Fuel and oxidizer are introduced as in FIG. 21 (in this embodiment via conduits 2707 and 2703, respectively) and ignited by mechanism 2713.

In the embodiment shown in FIG. 27, material is initially introduced via the mechanism 2701. Emitting material ultimately condenses and adheres to the beads.

Such beads may be of various sizes and materials (for example, alumina or zirconia). Their surfaces can allow the condensation and subsequent evaporation of the emitting material. This provides an equilibrium or near-equilibrium concentration of vaporous emitter to be established within the chamber.

In the embodiment shown in FIG. 27, the flame is pointed downward. Thus, the flame impinges directly on the bead bed.

In certain embodiments, a wicking structure may be present at the top of the combustion chamber (e.g., FIG. 28 or 29) in addition to a bead bed. Such a structure assists in the condensation of vaporous emitter (as a liquid) with the wicking structure subsequently returning a portion of the emitter to the bed via gravity.

Some portion of the emitting material could remain intermingled with the exhaust gasses and exit the combustion chamber. Hence, additional emitting material may be added to the chamber via mechanism 2701 to maintain a desired concentration.

In certain embodiments, beads incorporate emitting material (for example, ytterbium oxide) into their structure or as coatings on their surfaces. Such embodiments may not need a device 2701 to introduce and replenish additional emitting material.

Figure 28:
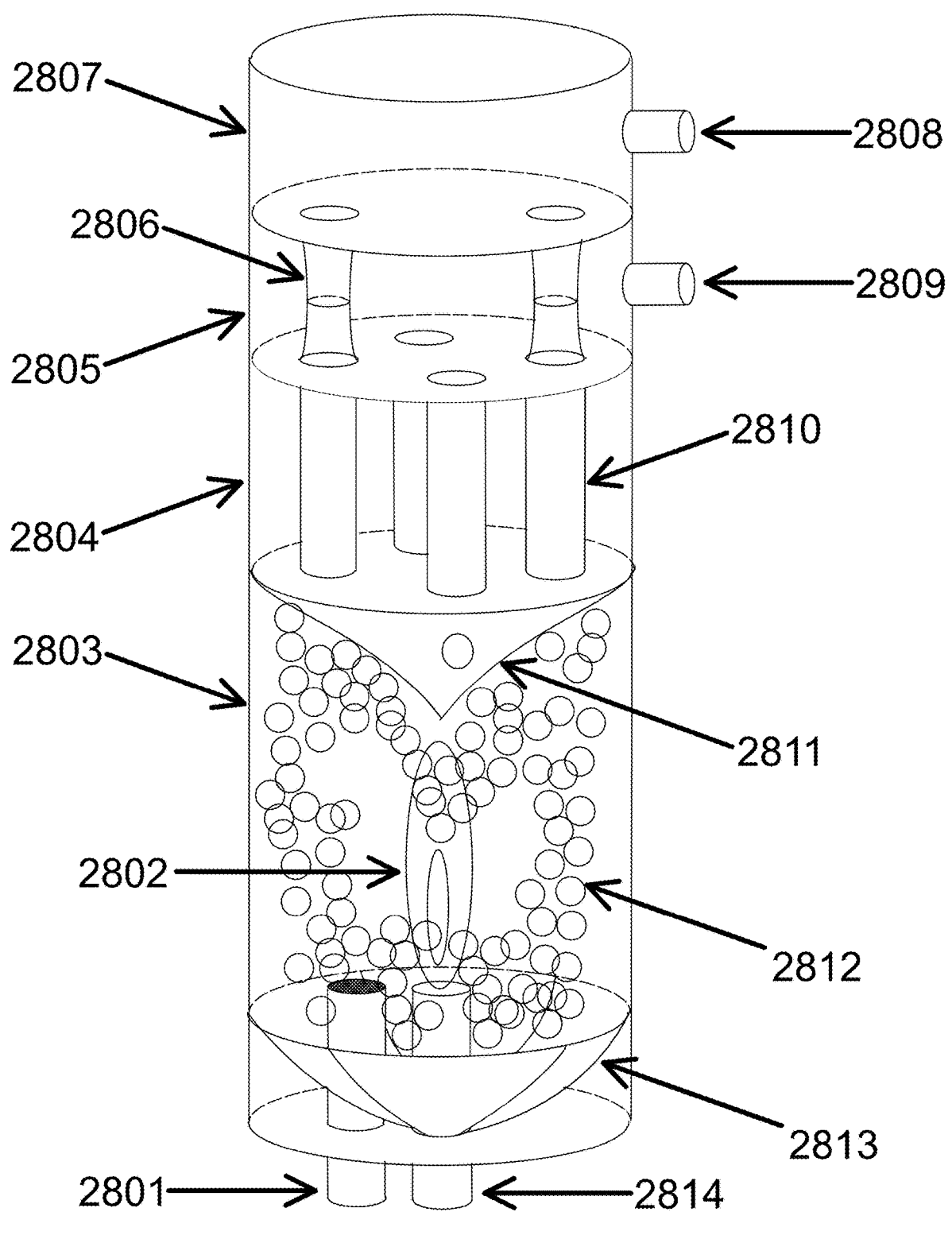
FIG. 28 shows an embodiment with circulating ceramic beads.

Referring now to FIG. 28, an embodiment is shown with circulating ceramic beads 2812. Such beads perform a function similar to that of the bead bed of FIG. 27, with a difference being that they move about in the combustion chamber 2803 due to gaseous convection currents rather than remaining stationary. Such currents may be caused by convection of reactant gasses, exhaust gases, heat released by combustion in an enclosed chamber, or by some combination of these.

Circulating beads may be small and light to facilitate their mobility under the influence of convection currents. Circulating beads are larger than the channel openings at the bottom of the heat exchanger 2810 and remain within combustion chamber.

As in the embodiment of FIG. 27, the beads allow emitting material to condense on their surfaces when they find themselves distant from the flame 2802. When moving close enough to the flame, the condensed emitter vaporizes again.

Such vapor can emit characteristic radiation at high intensities. It is therefore desirable to maximize such vaporization.

A particular embodiment is now described.

The flame is propane/air consuming one liter of propane gas at STP per minute.

The hot part of the flame is 1 cm wide.

Each bead holds 1 mg of NaCl emitter on its surface in a liquid state.

The average temperature in the combustion chamber away from the flame is about 1400° C.

Based upon a calculation considering only first-order effects, the bead may be traveling at a speed of approximately 7 m/s. At that speed, substantially all of the NaCl will vaporize during transit through the flame.

The following calculation can inform design details such as the size of the beads and the dimensions of the combustion chamber. The following relates to calculation of bead velocity in FIG. 28.

heat capacity of NaCl=0.9 J/g-K heat of vaporization=about 2200 J/g melting point=800° C., boiling point=1465° C.

the hottest part of the flame is 1 cm wide propane is burning at a rate of 1 liter/minute propane delivers 2040 kJ/mole burned (lower heating value)

22.4 liters per mole for an ideal gas at STP 1 l/min=1/22.4=0.045 moles per minute=0.00074 mol/s 2040 kJ/mol*0.00074 mol/s=1520 J of heat released per second by the flame If a bead holds 1 mg of NaCl, then a bead utilizes 0.001 g*2200 J/g=2.2 J to vaporize. So the bead spends 2.2 J/1520 J/s=1.4 ms in the flame. To travel 1 cm in 1.4 ms, the bead's speed is 0.01 m/0.0014 s=7 m/s (about 16 mph).

FIG. 28 shows, in simplified form, two structures in the combustion chamber: a lower structure 2813 and an upper structure 2811. These serve to direct the flow of the beads.

These structures are designed to maintain an approximately steady circulation. Thus, individual beads repeatedly move from the cooler sections of the chamber into the flame and out again to the cooler sections.

In certain embodiments, the convective circulation within the chamber may be primarily laminar, and the beads will circulate in a substantially orderly and predictable fashion. In other embodiments chamber circulation may be primarily turbulent with the beads moving more randomly.

As with the embodiment of FIG. 27, alternative embodiments may utilize beads that have emitting material incorporated in their structure or applied to their surface as a coating. In such embodiments there may be no need for a separate apparatus 2801 to introduce additional emitting material or wicking structures.

Figure 29:
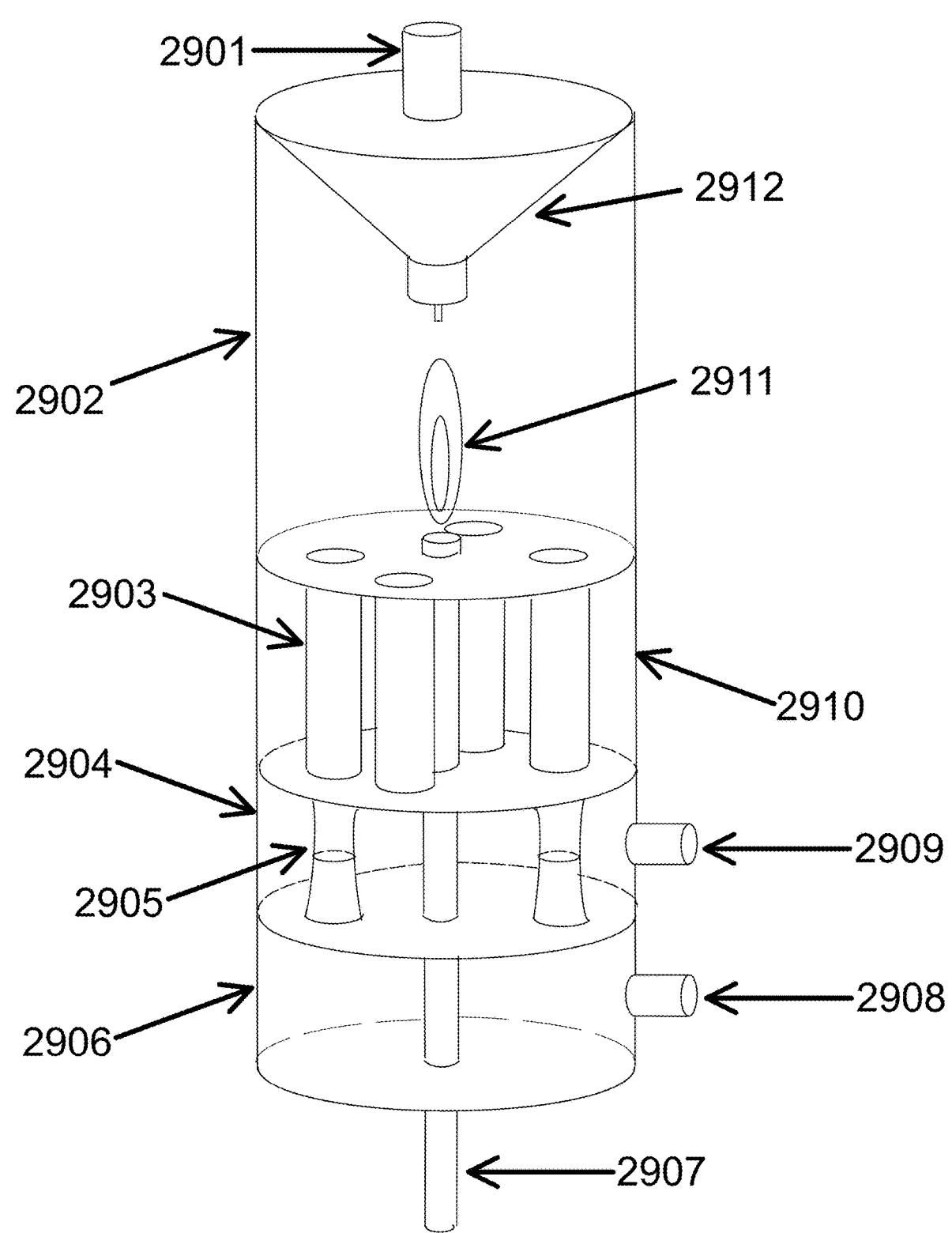
FIG. 29 shows a heat exchanger and the associated intake and exhaust apparatuses positioned beneath a combustion chamber, and a wicking device incorporating an emitter candle positioned at the top of the combustion chamber.

FIG. 29 shows another embodiment. The embodiment of FIG. 29 features heat exchanger 2910 and the associated intake and exhaust apparatus 2906 and 2905 positioned beneath the combustion chamber 2902.

Such an arrangement may be an alternative to the combustion chamber being located at the bottom of the apparatus (for example, such is the case for the design illustrated in FIG. 21). Possible exceptions are embodiments that employ a bead bed (e.g., FIG. 27) or a rotating emitter regenerator (e.g., FIG. 24). If a regenerator mechanism is used (as in the embodiment of FIG. 24), the regenerator may be above the combustion chamber to allow regenerated emitting material to drip down into the chamber via gravity.

A wicking structure 2912 forms the upper part of the combustion chamber. Such structures are discussed further below (e.g., in connection with FIGS. 31 and 32).

Figures 30A, 30B:
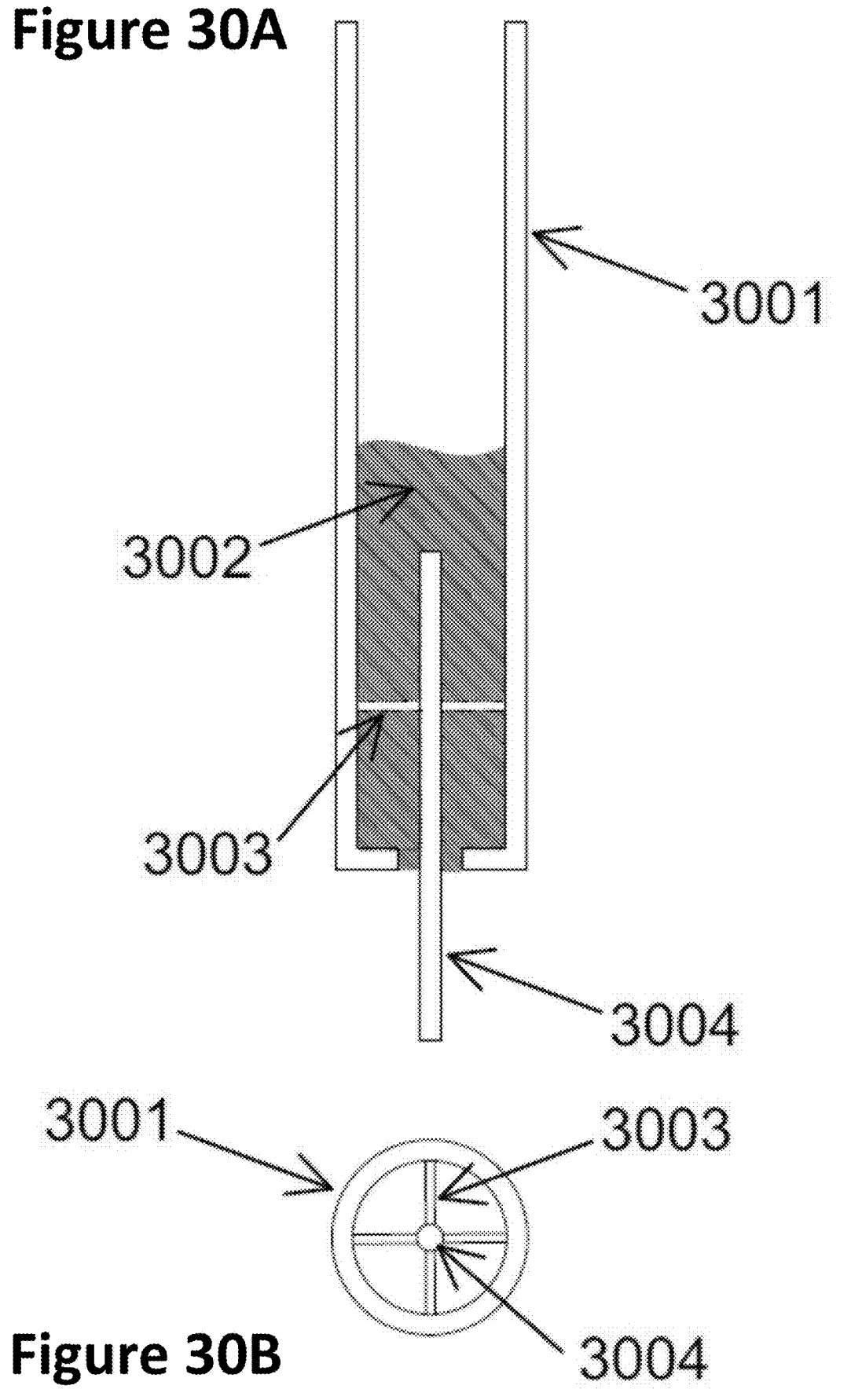
FIG. 30A shows a simplified cross-sectional view of an emitter candle according to an embodiment.
FIG. 30B shows a simplified top view of an emitter candle according to an embodiment.

The emitter candle device 2901 uses phase change and capillary action to introduce the emitter into the combustion chamber. FIG. 30A shows a simplified cross-sectional view of the emitter candle in more detail. FIG. 30B shows a simplified top view.

The emitter candle device is a tube of refractory material 3001 (including, but not limited to, alumina or zirconia) capable of tolerating the temperatures present at the top of the combustion chamber. The tube is filled with solid emitting material (for example, sodium chloride powder) 3002.

A wick (a small rod made of the same or similar material as the tube) 3004 is positioned along the axis of the tube so that its tip extends below the bottom of the tube. The rod passes through a hole slightly larger than the rod's diameter. So, there is a small space between the rod's outer surface and the interior surface of the hole in the bottom of the tube.

In some embodiments, there is a support structure (3003 in FIG. 30) that holds the wick in the correct position.

The wick need not be cylindrical. The hole in the bottom of the tube need not be circular. Provided that a small gap is present between the wick and the opening at the bottom of the tube, the wick and the opening may be a variety of shapes.

The wick may have the property that it is wetted by the emitting material when the latter is a liquid. In one example, alumina is wetted by molten sodium chloride.

During operation, flame(s) in the combustion chamber heat the emitting material, causing the material to change phase from solid to liquid. Where the wick is wetted by the liquid emitting material, this liquid will flow along the wick via capillary action, ultimately dripping off the tip into the combustion chamber. In some embodiments (as in FIG. 29) the wick is positioned such that the liquid emitter drips into the flame(s).

Figure 31:
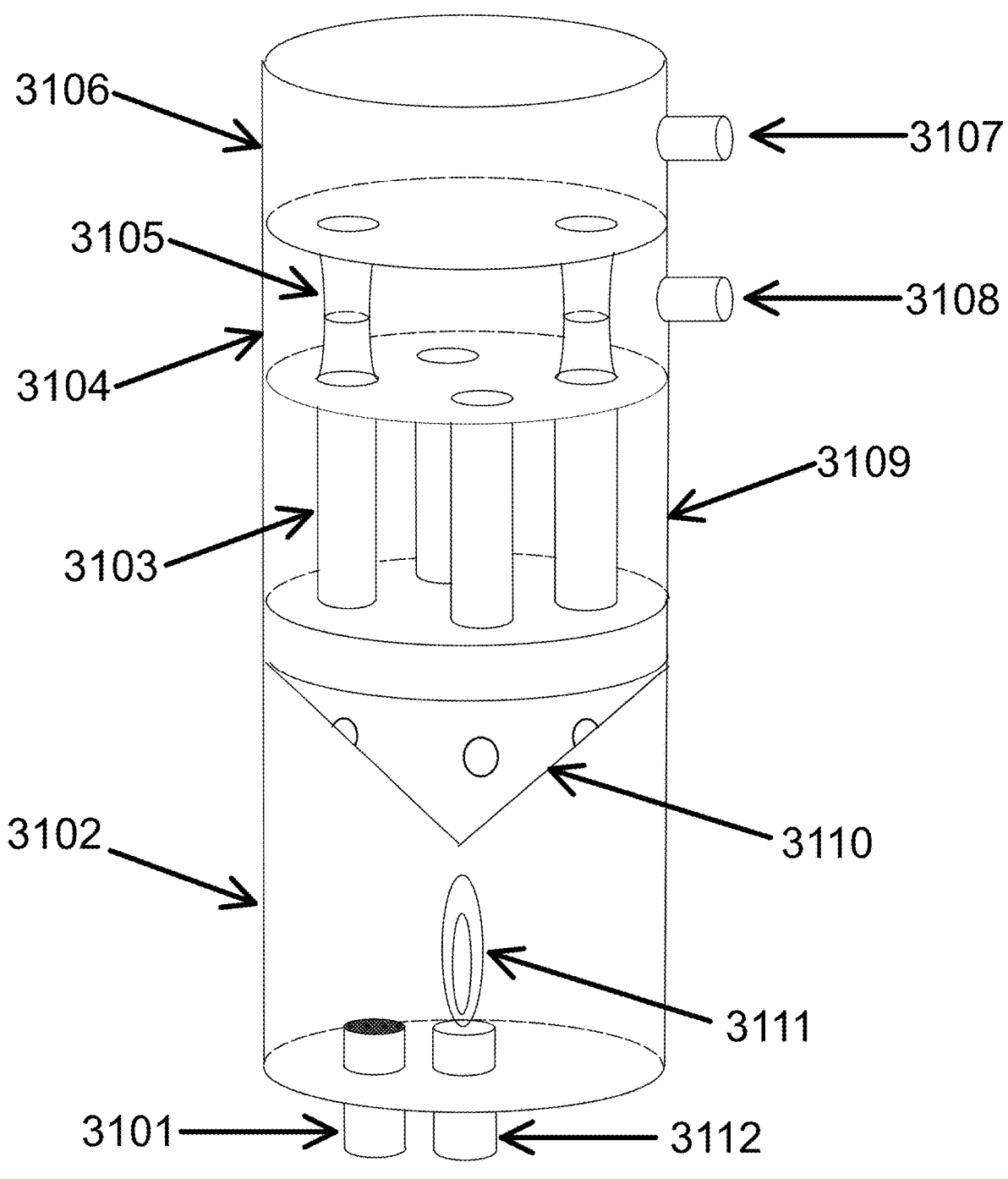
FIG. 31 shows a simplified view of wicking structure according to one embodiment.

The embodiment of FIG. 31 shows wicking structure 3110. A function of such a structure is to collect emitting material in the liquid or vapor state that is entrained in the exhaust stream after being heated in the flame(s) 3111. The vaporous or liquid emitting material adheres to the bottom of the wicking structure upon contact. Vapor condenses to a liquid on the surface of the structure.

The shape of the wicking structure is such that gravity causes the liquid emitter to run down the surface of the structure until it reaches some low point. The liquid emitter drips off of the structure into the flame(s) 3111.

Figure 32:
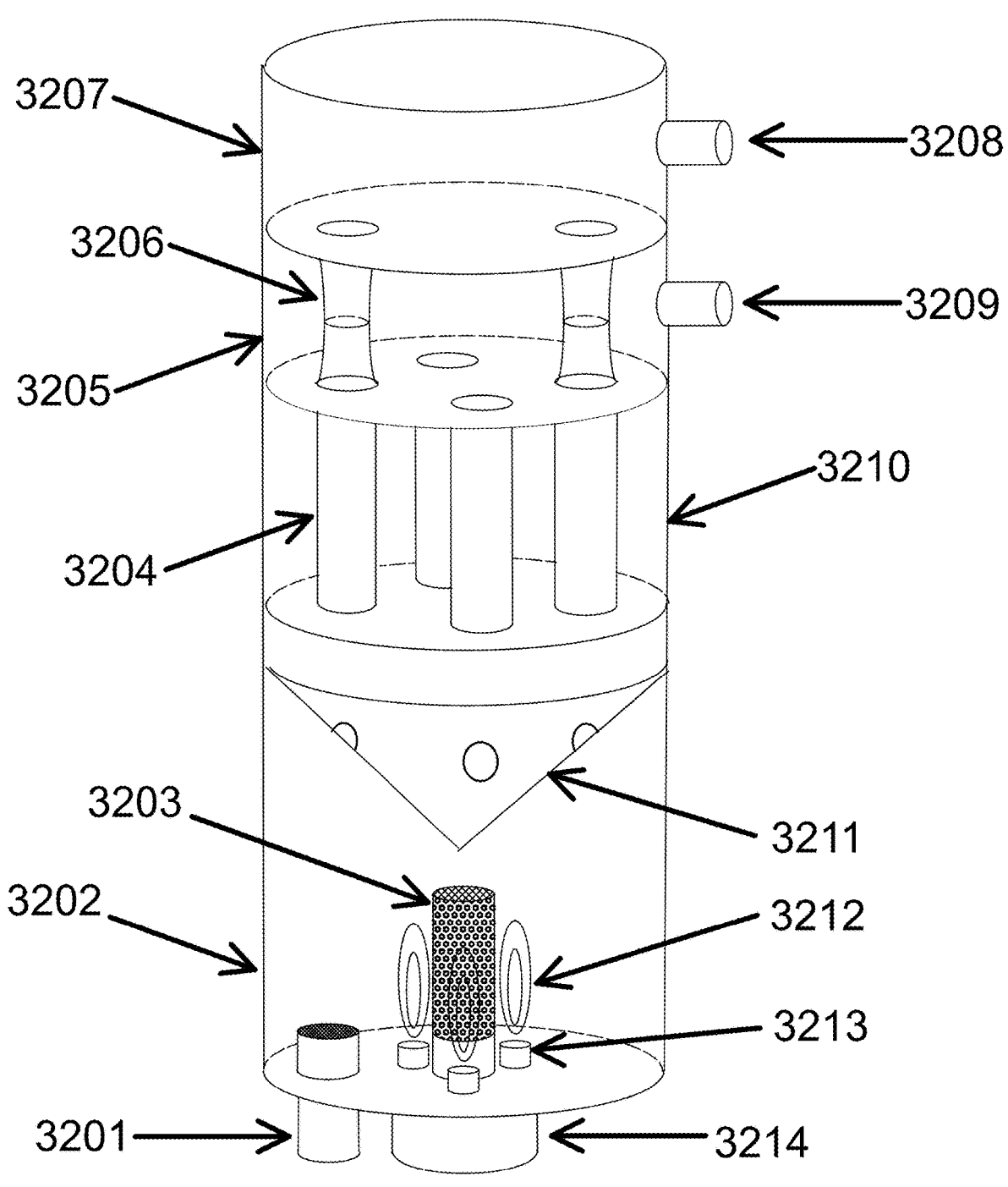
FIG. 32 shows a simplified view of a central structure that catches liquid emitting material dripping from a wicking structure.

FIG. 32 shows an embodiment with a configuration similar to FIG. 31. Liquid dripping from the wicking structure 3211 falls not into the flames, but onto a structure 3203 located at the center of a plurality of flames 3212. The liquid emitting material adheres to the central structure and is vaporized by the proximate flames.

The central structure 3203 tolerates high temperatures. In certain embodiments, the central structure is fabricated from alumina or zirconia foam, or other material wetted by molten emitting material.

A manifold 3214 supplies fuel to a set of nozzles 3213. Emitting material is introduced via apparatus 3201 to replenish any lost via the exhaust.

FIG. 33 shows three different designs for wicking structures. All three are fabricated from a honeycomb of refractory material, such as alumina or zirconia.

Honeycomb channels extend vertically through the structure. The bottom openings of a few of these channels (3303, 3307) are shown in the upper two illustrations 3302 and 3306. It is to be understood that channels whose top openings (3301, 3305) are shown continue through to the bottom of the structure.

In FIG. 33A, for the wicking structure 3302 the emitting material adhering to the bottom surface wicks to a single point 3304. FIGS. 31 and 32 show wicking structures of this type.

In FIG. 33B for the wicking structure embodiment 3306, several small rods 3308 provide several separate collection points. Such points may drip liquid emitting material into separate flames.

In FIG. 33C the wicking structure embodiment 3309 is shown in cross-section. The emitter collects around the outer edges of the structure and drips down the inner walls of the combustion chamber.

Figure 34:
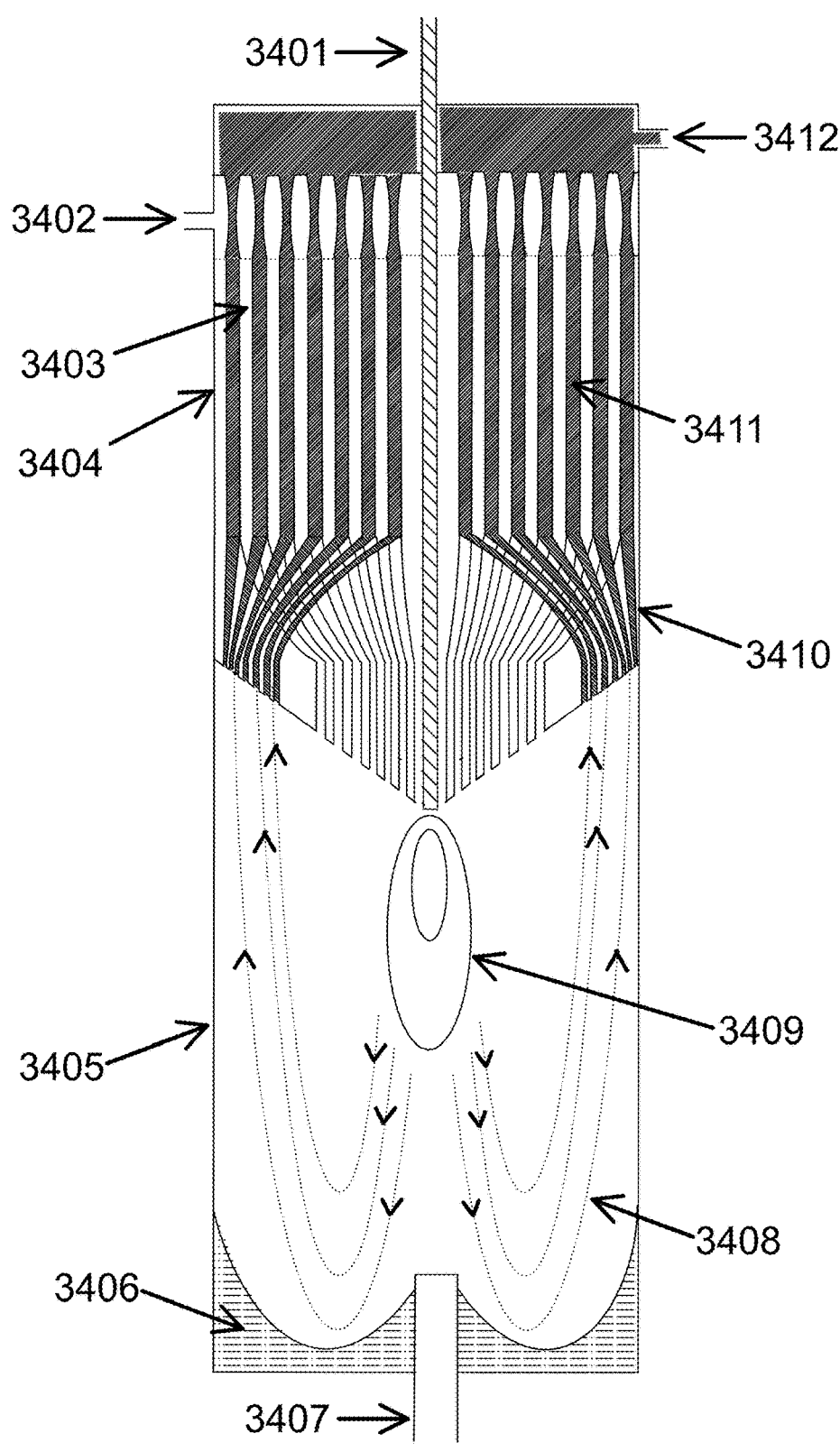
FIG. 34 shows a simplified cross-section of an embodiment of a generator comprising a manifold that segregates flows of gasses entering and leaving the combustion chamber.

Referring now to FIG. 34, manifold 3410 segregates flows of gasses entering and leaving the combustion chamber 3405. The figure shows the TPV cell in cross-section. (FIG. 31 shows a 3D projection of a similar configuration).

Fuel enters via conduit 3401. Oxidizer enters via inlet 3402, then proceeds down channels 3403.

The oxidizer passes through the heat exchanger 3404. It is warmed by the escaping exhaust gasses flowing through channels 3411.

Emitting material is introduced via mechanism 3407.

At the bottom of the heat exchanger, interleaved oxidizer and exhaust channels are segregated via manifold 3410. Within this manifold, the oxidizer channels are redirected to the inner region of the combustion chamber near the flame 3409.

The exhaust gasses resulting from combustion initially travel downward. They are redirected by the flow-reversing structure 3406 at the bottom of the chamber.

This structure directs the exhaust upward along the inner surface of the wall of the combustion chamber.

When the exhaust gasses reach the manifold 3410, they enter a set of channels around the outside of the manifold (shown with hatching). This set of channels redirect the exhaust into the heat exchanger 3404. These channels are interleaved with the oxidizer channels so as to create a counterflow arrangement.

The exhaust, once it has traversed the heat exchanger, exits the cell via outlet 3412.

In certain embodiments, the design of the manifold 3410 and the flow reversing structure 3406, effects a laminar flow of the gasses throughout the entirety of their traversal of the TPV cell. In other embodiments, the flow is turbulent in some regions of the combustion chamber and laminar in others.

The manifold 3410 can also act as a wicking structure (as in FIG. 31).

The channels carrying the oxidizer in the manifold may take a curved path into the central section of the structure. Thus, the oxidizer gas swirls helically once it enters combustion chamber. This causes the flame to swirl as well, creating a larger area of light emission.

In certain embodiments, some fraction of the oxidizer is directed by the manifold to flow along the inner surface of the combustion chamber walls. This can protect the walls from thermal damage.

In some embodiments, the configuration shown in FIG. 34 is turned vertically 180° such that the flames(s) 3409 point upward. The exhaust gasses initially flow upward and are redirected downward by the flow reversing structure 3406.

In such embodiments, the manifold 3410 may not act as a wicking structure. In such embodiments the flow reversing structure 3406 may act as a wicking structure.

Figure 35B:
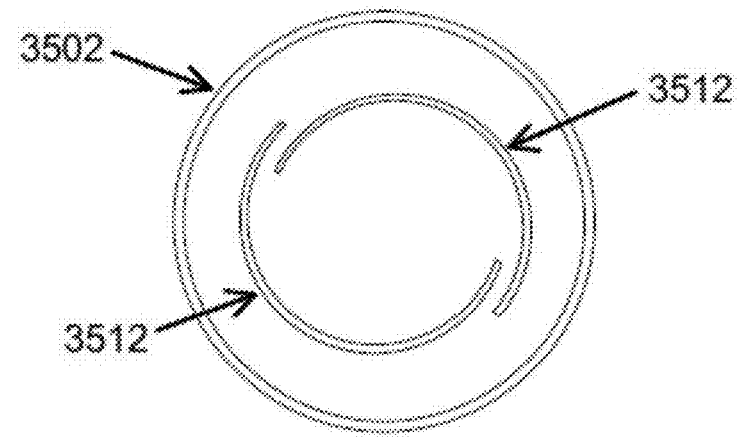
FIG. 35B shows a top view.
Figure 35A:
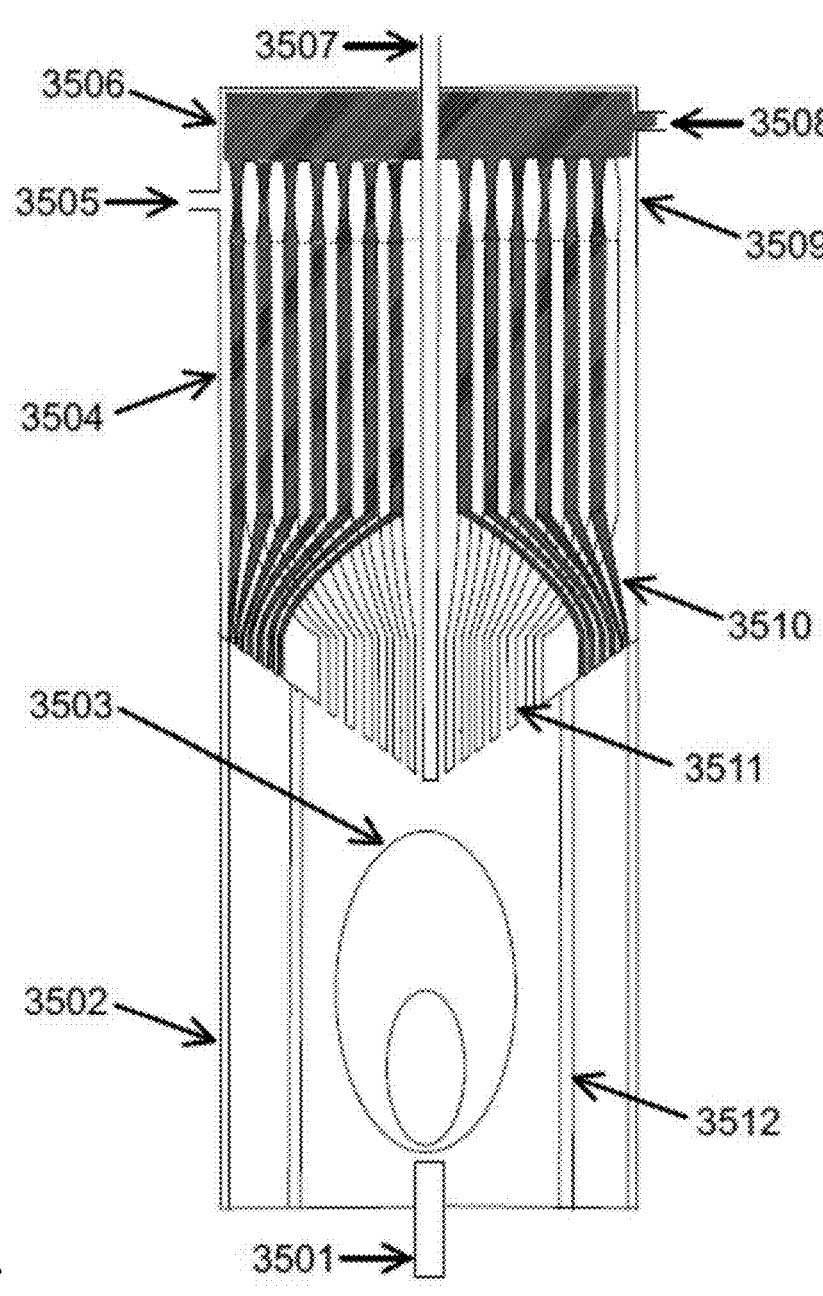
FIG. 35A shows a simplified cross-sectional view of combustion chamber incorporating a structure comprising two transparent half-cylindrical shells.

Referring now to FIG. 35, the combustion chamber 3502 incorporates a structure comprising two transparent half-cylindrical shells 3512. The concave surfaces face each other and edges overlap.

This arrangement is shown in the cross-sectional view FIG. 35B of the combustion chamber 3502. The half-cylindrical shells, being close to the flame 3503 may be fabricated from material that can withstand high temperatures (e.g., polycrystalline alumina, zirconia, sapphire).

Incoming oxidizer flows in through inlet 3508, and thence through the heat exchanger 3504. Note that this is the reverse of the arrangement shown in FIG. 34. In FIG. 35 it is the incoming oxidizer that flows through channels shown with hatching rather than the exhaust.

The manifold 3510 directs the oxidizer to the outer annulus of the combustion chamber, outside the structure formed by the two half-cylinders 3512. The oxidizer is caused to swirl by this structure as it enters the central region of the combustion chamber.

An effect of the swirl is to distribute the flame 3503 across a large volume in the combustion chamber. This can increase the total characteristic radiation emitted and distribute this radiation more uniformly. Another effect of the swirl may be to cool the combustion chamber wall.

It is noted that particular embodiments may comprise a combustion chamber with internal structures to guide flows of materials. For example, an embodiment could incorporate a manifold that induces swirling in incoming oxidizer, fuel, and/or emitting material.

Exhaust gasses exit via channels 3511 above the central region and proceed to the heat exchanger 3504. The exhaust gasses then exit the TPV cell via outlet 3505.

Figure 36:
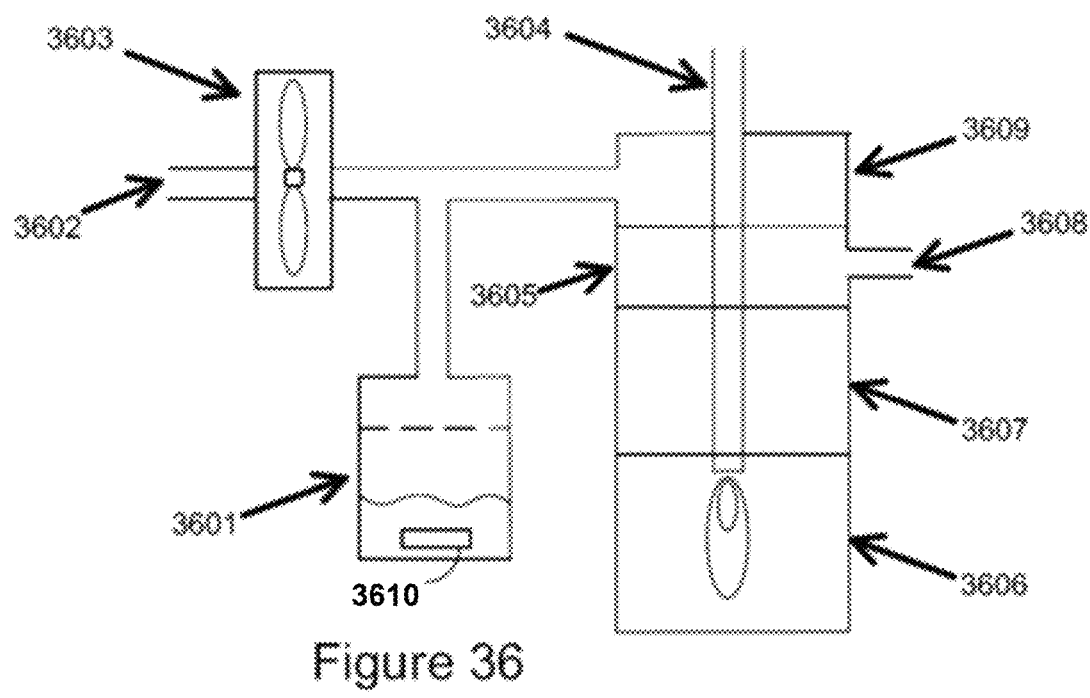
FIG. 36 shows an embodiment illustrating an approach to introducing emitting material into the incoming oxidizer using an ultrasonic transducer.
Figure 37:
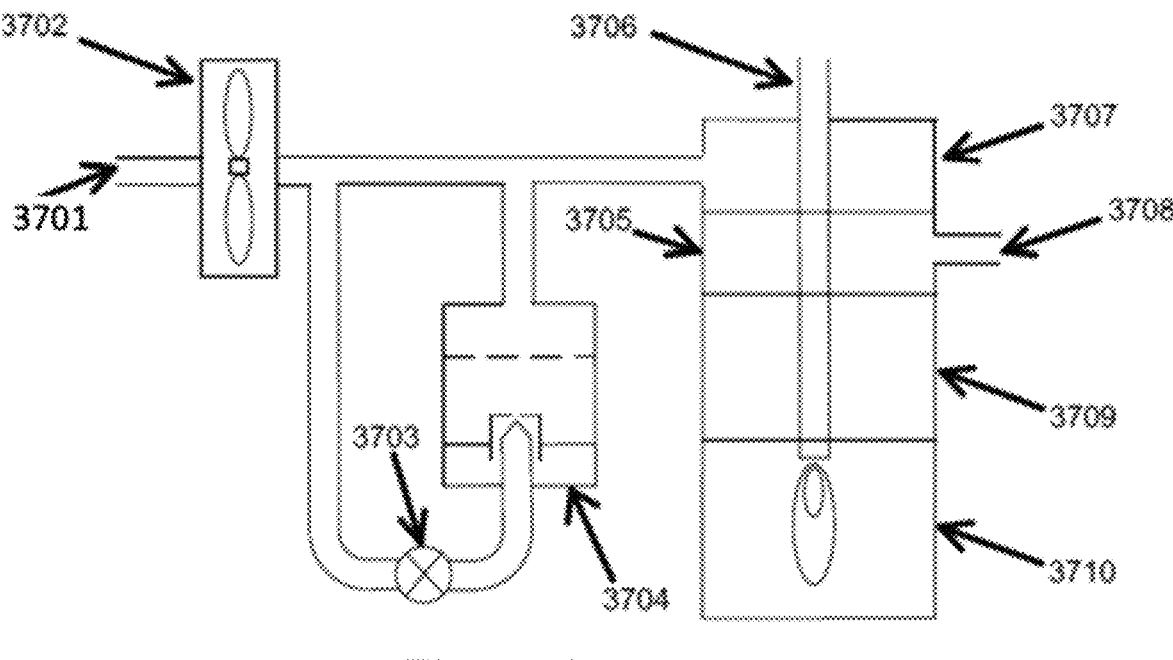
FIG. 37 shows an embodiment illustrating an approach to introducing emitting material into the incoming oxidizer using a nebulizer device.
Figure 38:
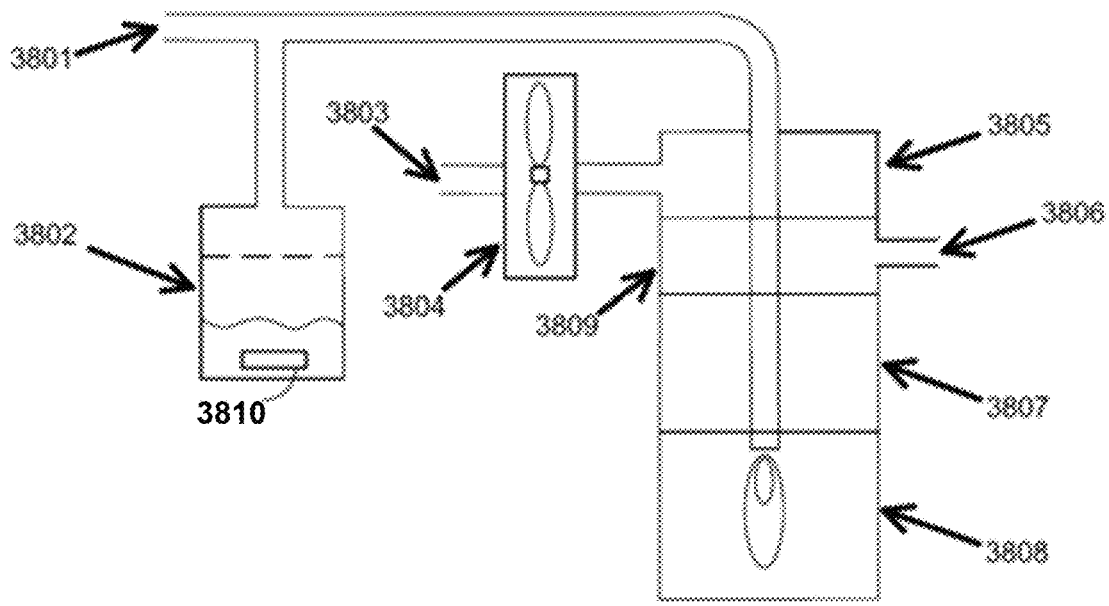
FIG. 38 shows an embodiment illustrating an approach to introducing emitting material into the incoming fuel stream using an ultrasonic transducer.
Figure 39:
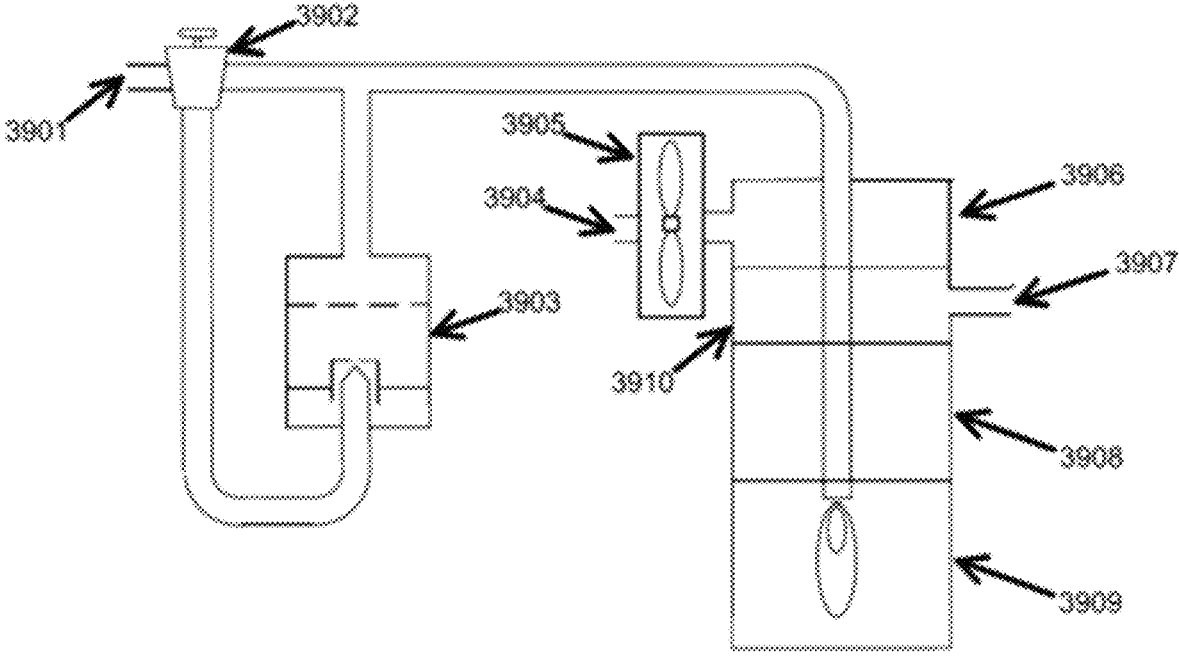
FIG. 39 shows an embodiment illustrating an approach to introducing emitting material into the incoming fuel streams using a nebulizer device.

Referring now to FIGS. 36, 37, 38, and 39 these illustrate four different approaches for introducing emitting material into either the incoming oxidizer (FIGS. 36 and 37) or fuel streams (FIGS. 38 and 39).

The emitting material is dissolved in a liquid, and the solution is held in a container (3601, 3704, 3802, and 3903). For example, if the emitting material is sodium chloride, it may be dissolved in water and/or methanol.

Two approaches are illustrated for creating an aerosol from the emitter solution. FIGS. 36 and 38 show an ultrasonic transducer as reference numbers 3610 and 3810, respectively. FIGS. 37 and 39 show a nebulizer.

Figures 40, 41:
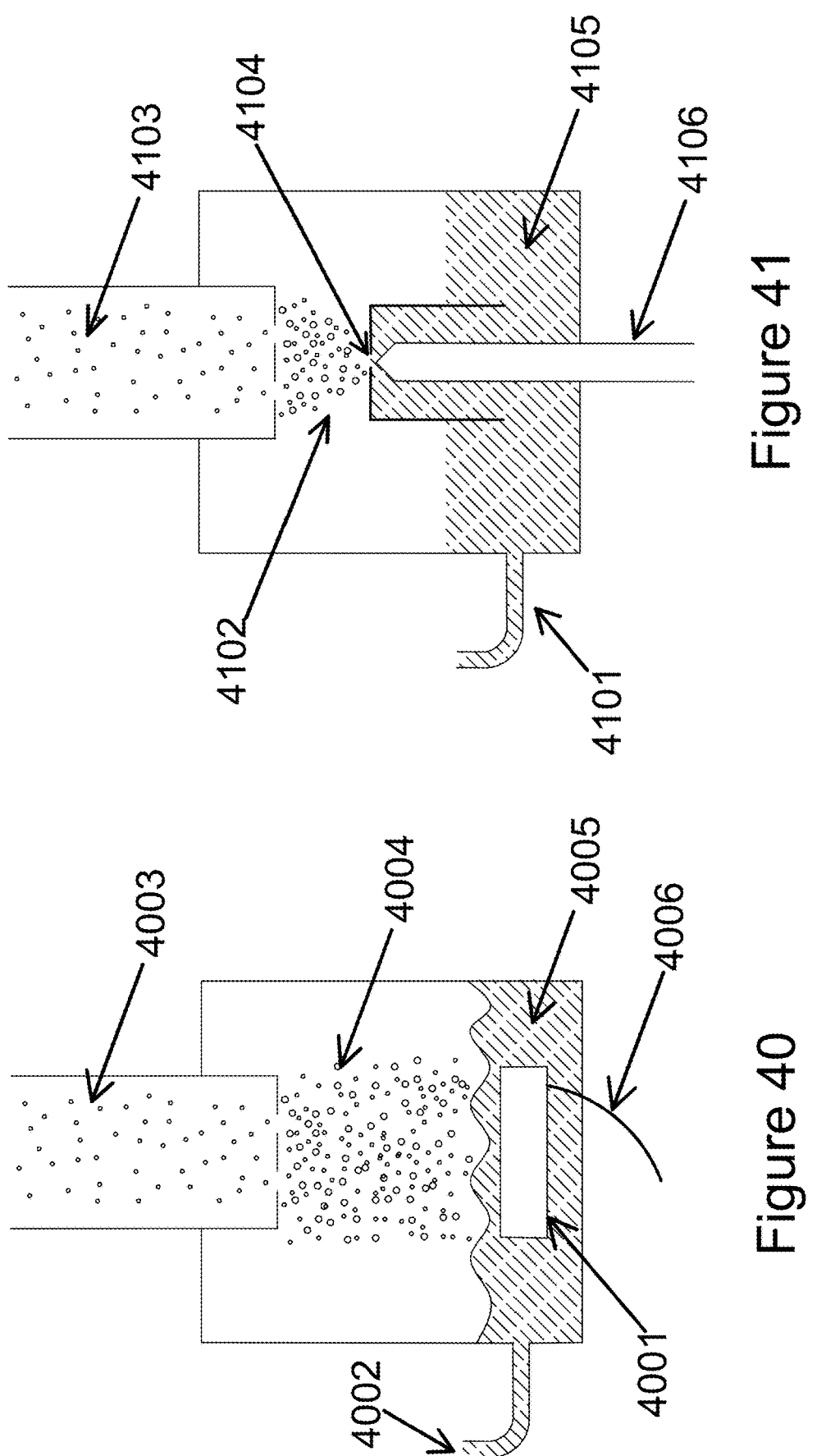
FIG. 40 shows details of an ultrasonic transducer according to an embodiment.
FIG. 41 shows details of a nebulizer according to an embodiment.

FIG. 40 shows additional details of an ultrasonic transducer mechanism according to an embodiment. Transducer 4001 is submerged in a reservoir of fluid 4005 containing dissolved emitting material.

Electricity supplied via a wire 4006 stimulates ultrasonic vibrations in the transducer. This in turn causes fluid to be pushed through a mesh at the top of the transducer, creating droplets 4004. These droplets pass through a baffle that only permits small diameter droplets 4003 to pass through.

In the embodiment of FIG. 36, the flow of incoming oxidizer draws the aerosol from the reservoir 3601. Thus, droplets created by the ultrasonic transducer mix with the oxidizer stream.

In FIG. 38, the stream of incoming gaseous fuel has the same effect. That is, emitter aerosol is drawn from reservoir 3802 into the fuel stream.

FIG. 41 shows additional details of a nebulizer device according to an embodiment. In this embodiment, the nebulizer is a jet nebulizer.

Gas enters the nebulizer under pressure. In FIG. 37 this gas is oxidizer. In FIG. 39, this gas is fuel.

The gas then passes through a small opening 4104 in the tip of tube 4106.

The rapidly flowing gas draws dissolved emitting material upward from a reservoir 4105 via the Bernoulli effect and forces it through a nozzle 4104. This atomizes the fluid, creating droplets of various diameters.

A baffle deflects the larger droplets so that only small droplets 4103 continue upward, mixed in with the gas stream.

For both the ultrasonic transducer device shown in FIG. 40, and the nebulizer shown in FIG. 41, the dissolved emitter is replenished in the reservoirs 4005 and 4105 via conduits 4002 and 4101 from an external supply (omitted from these figures for purposes of illustration).

Referring again to FIG. 37, the gas stream that causes the atomization is the oxidizer stream. In certain embodiments, the stream is divided into two streams as shown in FIG. 37, with only a portion of the oxidizer stream flowing through the nebulizer 3704. In certain embodiments the oxidizer flows through the nebulizer.

If the pressure of the oxidizer stream is insufficient to cause atomization, a compressor 3703 may be used to increase the pressure as required.

Referring again to FIG. 39, the gas stream that causes the atomization is the gaseous fuel stream. In certain embodiments, the stream is divided into two streams via valve 3902, with only a portion of the fuel stream flowing through the nebulizer 3903. In particular embodiments most of the fuel flows through the nebulizer.

FIGS. 36-39 illustrate embodiments in which the oxidizer is drawn into the TPV cell via a fan or pump (3603, 3702, 3804, 3905). In some embodiments, the oxidizer is supplied under pressure, and fans and/or pumps may not be present.

In FIGS. 38 and 39 the fuel may be gaseous (for example, propane or natural gas). In embodiments that burn liquid fuel, emitter dissolved in a liquid compatible with the fuel can be mixed with the fuel directly in the fuel delivery system.

As described above, the emitting material can circulate within the combustion chamber and come in direct contact with the flame(s). Some fraction of the emitter leaves the system with the exhaust and may be replenished. This may be the case even if a regenerator or other recovery mechanism is employed.

According to specific embodiments, in some system configurations the emitting material is not introduced into the combustion chamber during operation. Rather, the emitting material resides in the combustion chamber (e.g., incorporated into some structure within the chamber).

Figure 42:
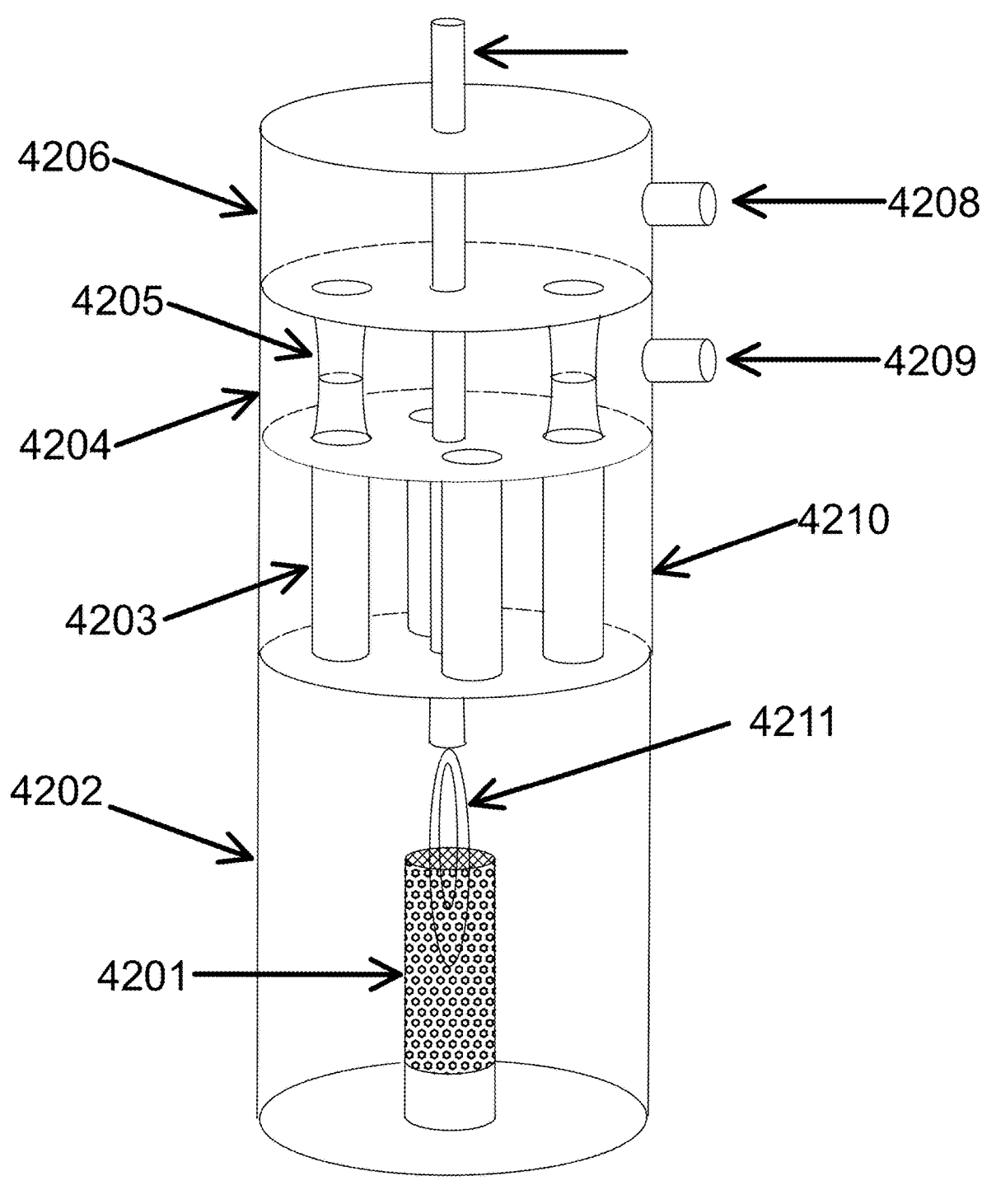
FIG. 42 shows an embodiment of a central structure including emitting material.

Referring now to FIG. 42, an embodiment is shown with a structure 4201 that is impinged upon directly by the combustion flame 4211. In certain embodiments this structure is a foam.

In certain embodiments, the structure may be comprised of some highly porous material. In particular embodiments it is a lattice or a structure made from fused beads. Material comprising the structure is able to tolerate flame temperature without damage.

In certain embodiments, the structure 4201 may be fabricated directly from the emitting material. In some embodiments, the structure may have emitting material incorporated into or supported by a non-emitting matrix (e.g., zirconia doped with ytterbium). Specific embodiments may comprise the emitting material as a coating applied to a non-emitting surface.

Figure 43:
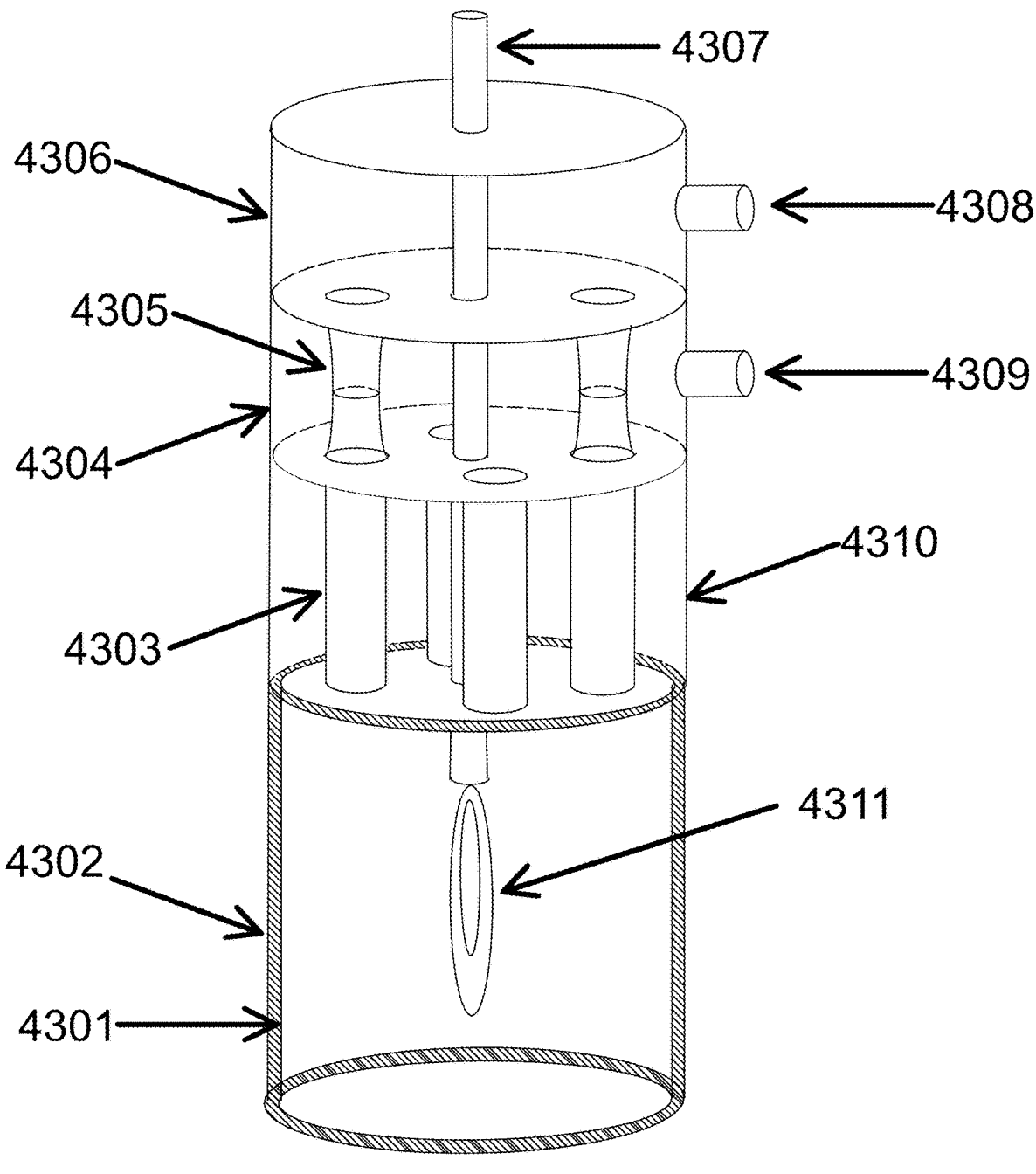
FIG. 43 shows an embodiment with emitting material incorporated in the combustion chamber wall.

Referring now to FIG. 43, in certain embodiments the emitting material (shown as hatching 4301) may be incorporated in the material of the combustion chamber wall (for example ytterbium dispersed in sapphire). In other embodiments, the emitter may be incorporated in a coating applied to the inner surface of the combustion chamber wall. In yet other embodiments, a second concentric transparent cylinder 4302 may surround the combustion chamber wall, with emitting material occupying the annular volume between the two cylinders.

Figure 44:
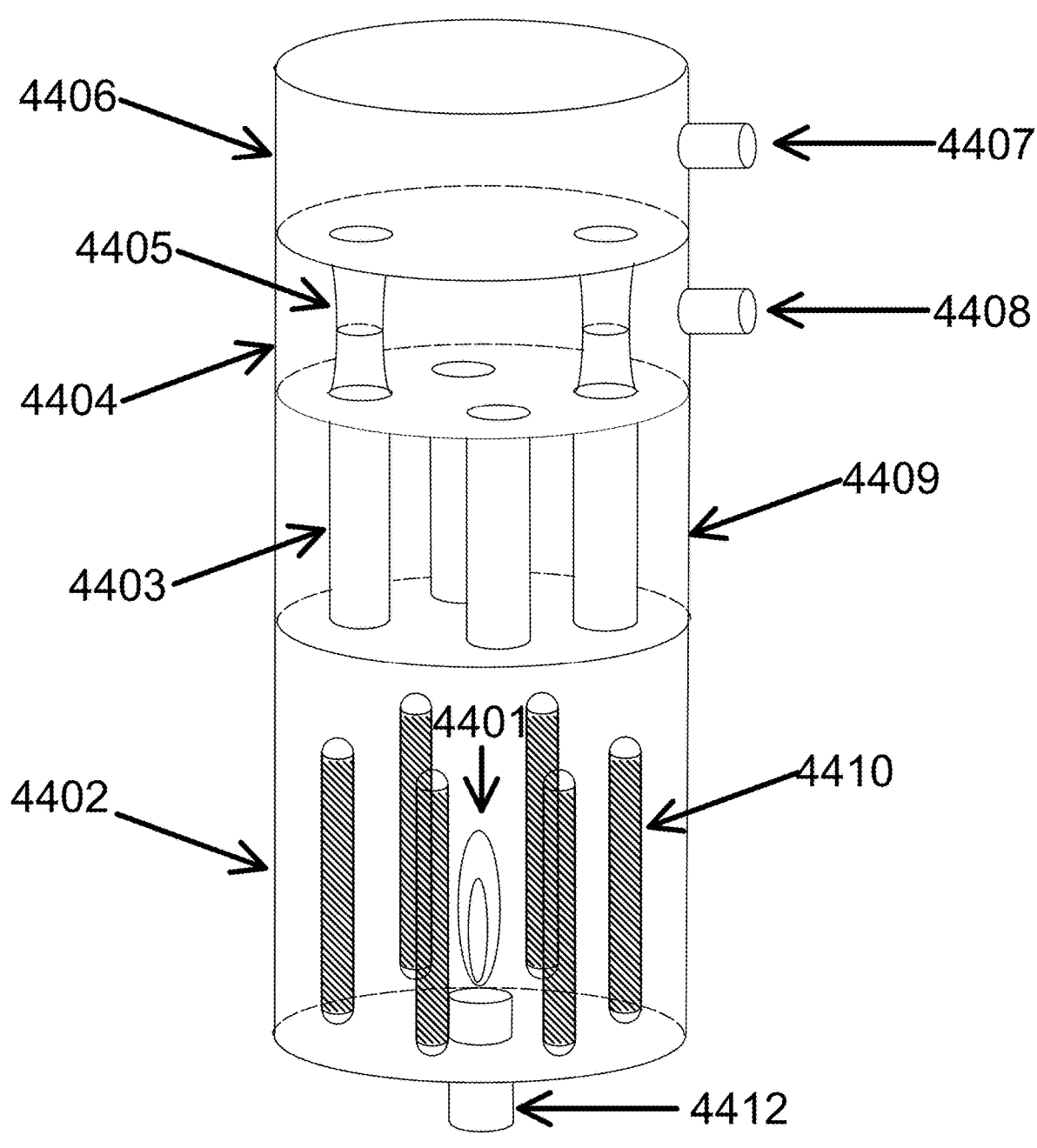
FIG. 44 shows an embodiment with emitting material encapsulated within structures 4410 inside the combustion chamber.

Referring now to FIG. 44, emitting material may be encapsulated within fixed structures 4410 inside the combustion chamber 4402 and proximate to the flame(s) 4401. In certain embodiments, these structures may be transparent tubes, beads, lattices, or other shapes. An example is sodium chloride powder encapsulated within a sapphire tube.

A sample calculation for dimensions of a cylindrical capsule containing 0.1 gram of NaCl emitting material is now described. The capsule material is sapphire and is 5 cm long.

In this example, the capsule will be heated to the adiabatic flame temperature of propane-air combustion, 1980° C.

The density of NaCl is 2.16 g/cc. So, 0.1 grams will occupy 0.046 cc. A sapphire tube 5 cm long with 2 mm inside diameter has a volume of 0.157 cc—sufficient to contain the desired quantity of NaCl.

The pressure created by NaCl vapor heated to 1980° C. is given by the ideal gas formula, PV=nRT. NaCl is 58.4 grams per mole. So, 0.1 grams is 0.0017 moles (the n in the ideal gas formula). The pressure exerted in the volume 0.157 cc is therefore 203 MPa.

The tensile strength of sapphire at high temperatures is 275 MPa. The hoop stress (that is, the radial stress) on the wall of the tube is given by stress=pressure×radius/thickness.

With a pressure of 203 MPa and a radius of 1 mm, the wall thickness is 0.74 mm. So, a 2 mm ID tube with 1 mm walls can withstand the internal pressure.

The above calculation assumes that the ends of tube are sealed in such a way that the capsule as a whole can tolerate this pressure. It also assumes that the NaCl does not dissociate into $Na^+$ and $Cl^-$ ions. If the NaCl were to dissociate, the internal pressure would increase, and thicker walls could be used.

A material that is hazardous or expensive could be suitable for use as an encapsulated emitter. One possible example of such a material is metallic sodium.

The use of emitting materials resident in the combustion chamber may offer the benefit of simplicity. Such embodiments may not require subsystems to introduce, capture, or recycle consumable emitting material. Heating the emitting material to temperatures high enough to stimulate intense characteristic radiation could expose materials in permanent structures such as 4201 or 4410 to demanding conditions.

Figure 45:
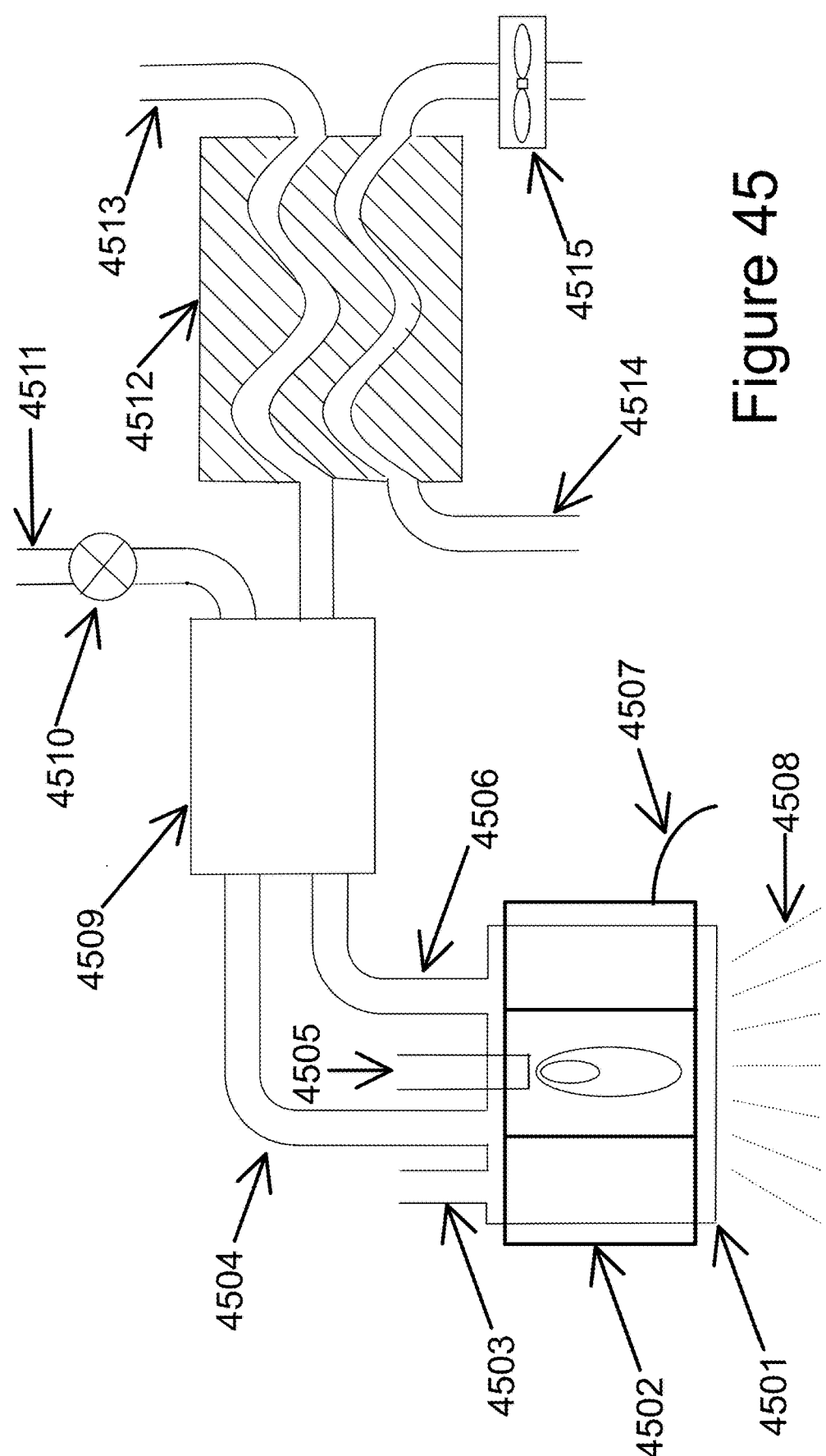
FIG. 45 shows a simplified view of a combined heat and power system according to an embodiment.

Referring now to FIG. 45, a combined heat and power (CHP) system incorporating a TPV generator 4501 according to an embodiment, is shown. Emitting material is introduced into the generator via 4503.

Fuel enters via conduit 4505. Photocell array 4502 supplies power to an external load via an electrical connection 4507.

Some fraction of the characteristic radiation exiting the TPV cell, may not be captured by the photocell array. Such uncaptured radiation 4508 can be used for illumination.

Oxidizer (for example, ambient air) enters the system via inlet 4511. In certain embodiments the oxidizer may be drawn in via pump or fan 4510.

This oxidizer passes through a heat exchanger 4509. Then, the oxidizer enters the combustion chamber via conduit 4504.

Exhaust exits the combustion chamber via conduit 4506. Exhaust enters the heat exchanger 4509.

This heat exchanger heats the incoming oxidizer via transfer of heat from the exhaust gasses. It may operate as a counterflow heat exchanger or via some other design principle (e.g., crossflow, parallel flow, shell-and-tube, plate, recuperator, others).

In the design shown, the exhaust gasses exiting the heat exchanger 4509 are still above 100 degrees C. Thus water entrained in the gasses may still be in the vapor state.

Flow then enters a second heat exchanger 4512. Ambient air or other fluid (for example, water in a hydronic system) is drawn or pumped into a plurality of channels within the second heat exchanger 4512 via a fan or pump 4515.

The exhaust gasses heat this fluid, which then can be used for space heating, process heat or other heating application.

In certain embodiments, a phase change occurs within the heat exchanger. Water vapor incorporated in the exhaust may condense into liquid and giving up heat.

Figure 50:
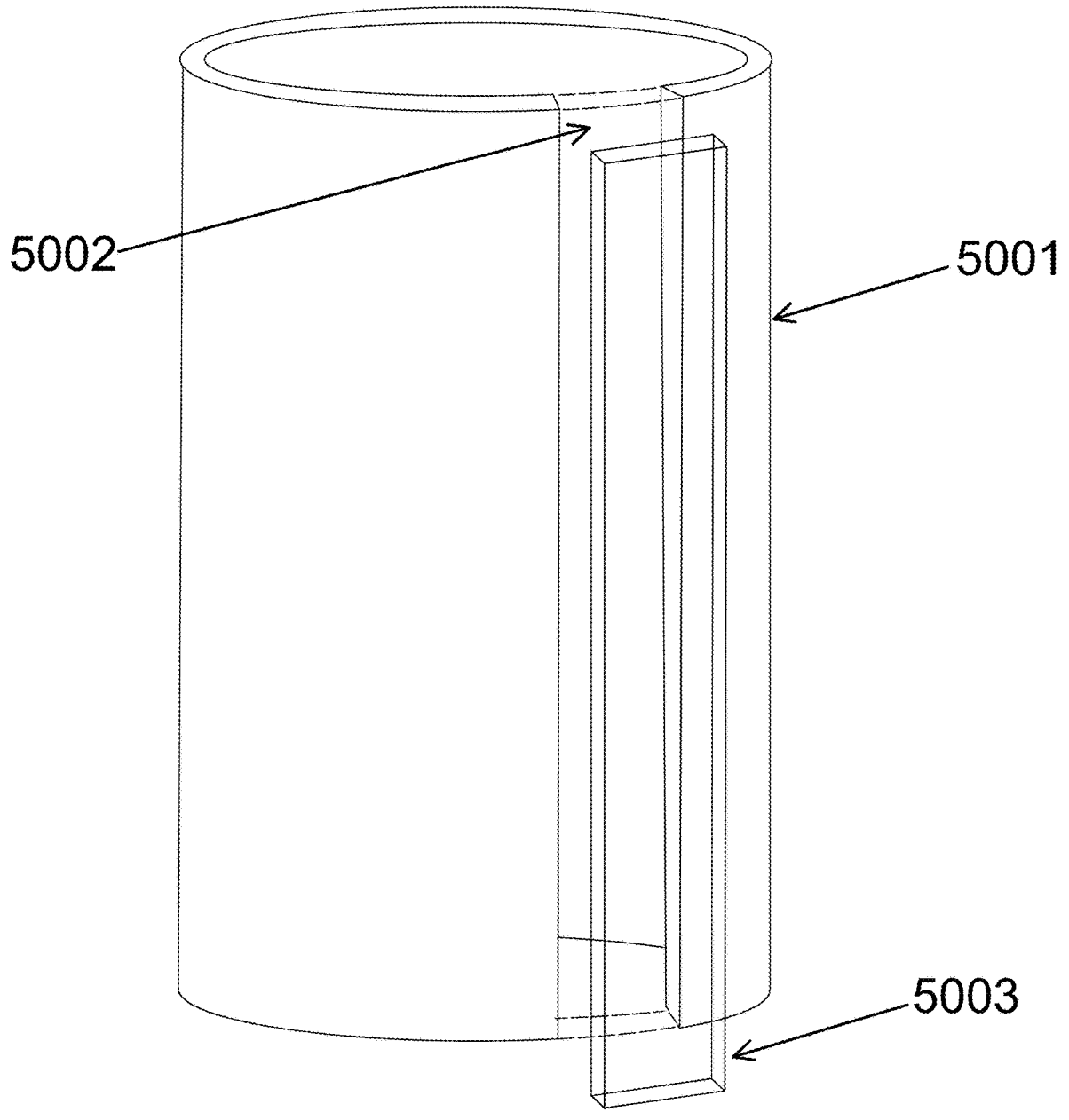
FIG. 50 shows a simplified view of a TPV generator according to an embodiment.

Referring now to FIG. 50, a simplified embodiment of a TPV generator is shown. A cylindrical combustion chamber 5001 is fabricated from an opaque refractory material (e.g., alumina or zirconia) with an interior surface that scatters or reflects incident radiation.

The combustion chamber comprises a wall 5002 parallel to the axis of the cylinder. The material of the wall (for example, sapphire) may have a thermal expansion coefficient similar to other walls of the combustion chamber.

An emitting material in the combustion chamber emits characteristic radiation when heated to combustion temperatures. The characteristic radiation escapes through the transparent wall.

The characteristic radiation is incident upon a photocell array 5003. The photocells in the array then generate electricity.

Light output from the combustion chamber is concentrated in the area of the transparent wall. Photovoltaic cells in the array tolerate high intensity light received.

A possible benefit of an arrangement such as that shown in FIG. 50, is that a relatively small number of photocells are used. This contrasts with approaches using a larger number of photovoltaic cells (such as FIG. 21), lowering system cost.

Figure 51:
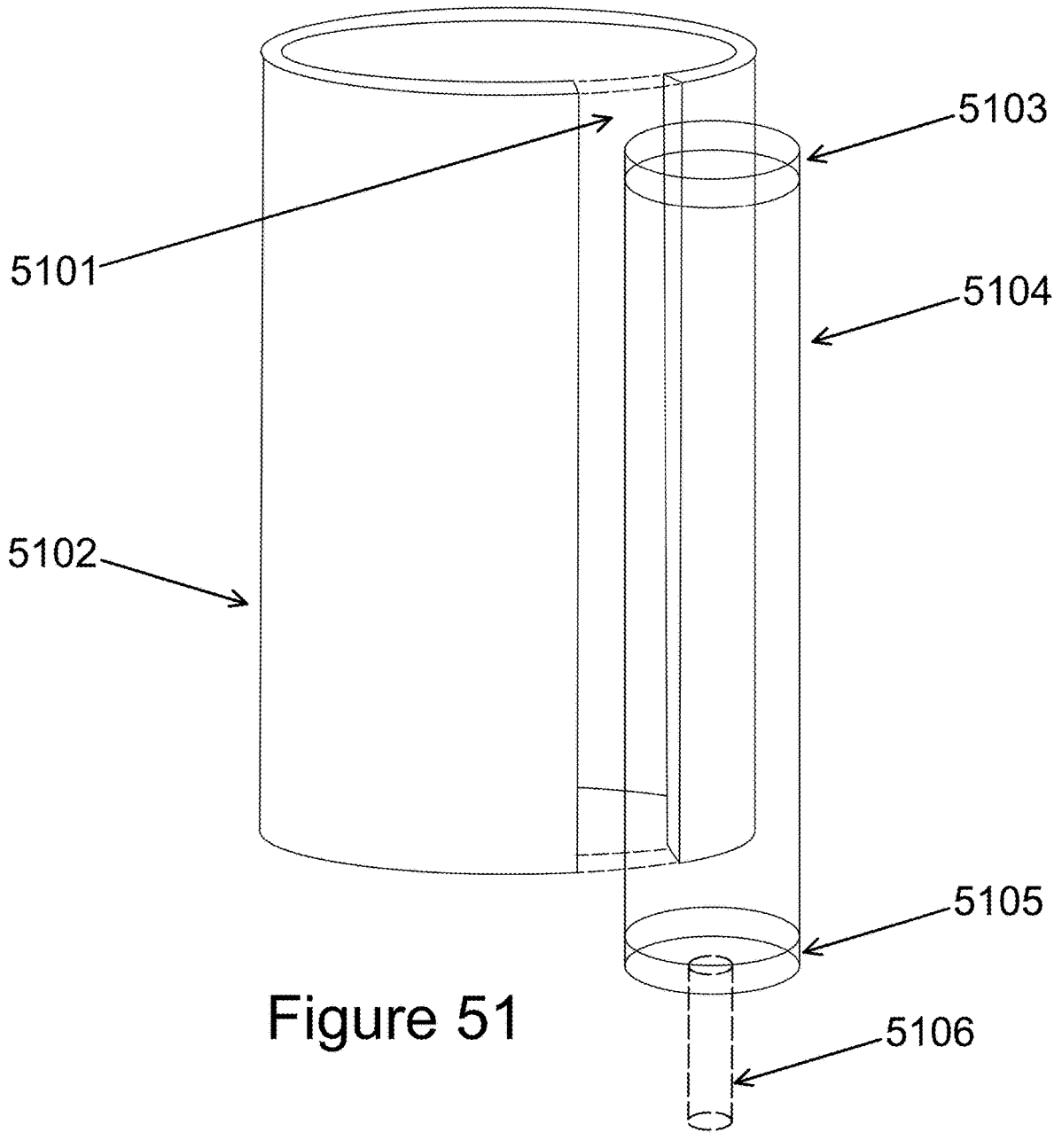
FIG. 51 shows an embodiment of a laser pumped by fuel combustion.

Referring now to FIG. 51, a laser pumped by fuel combustion is shown. Fuel is combusted in a cylindrical combustion chamber 5102 with a transparent wall along the axis of the cylinder 5101.

An emitting material present inside the chamber emits characteristic radiation when heated to combustion temperatures. The characteristic radiation exits the combustion chamber via the transparent wall.

The characteristic radiation falls upon an optical cavity 5104 containing a lasing medium. The wavelength of characteristic radiation interacts with the electronic structure of the lasing medium so that incoming light causes stimulated emission of radiation in the lasing medium.

This stimulated emission is reflected back and forth between two highly parallel mirrors. Mirror 5103 is fully reflective. Mirror 5105 is partially reflective.

Light is amplified within the optical cavity as additional emissions are stimulated. A portion of this amplified light emerges from one end of the cavity via the partially reflective mirror 5105 as coherent beam of monochromatic laser light 5106. The embodiment of FIG. 51 thus shows use of light from the combustion chamber to pump the laser.

Figure 52:
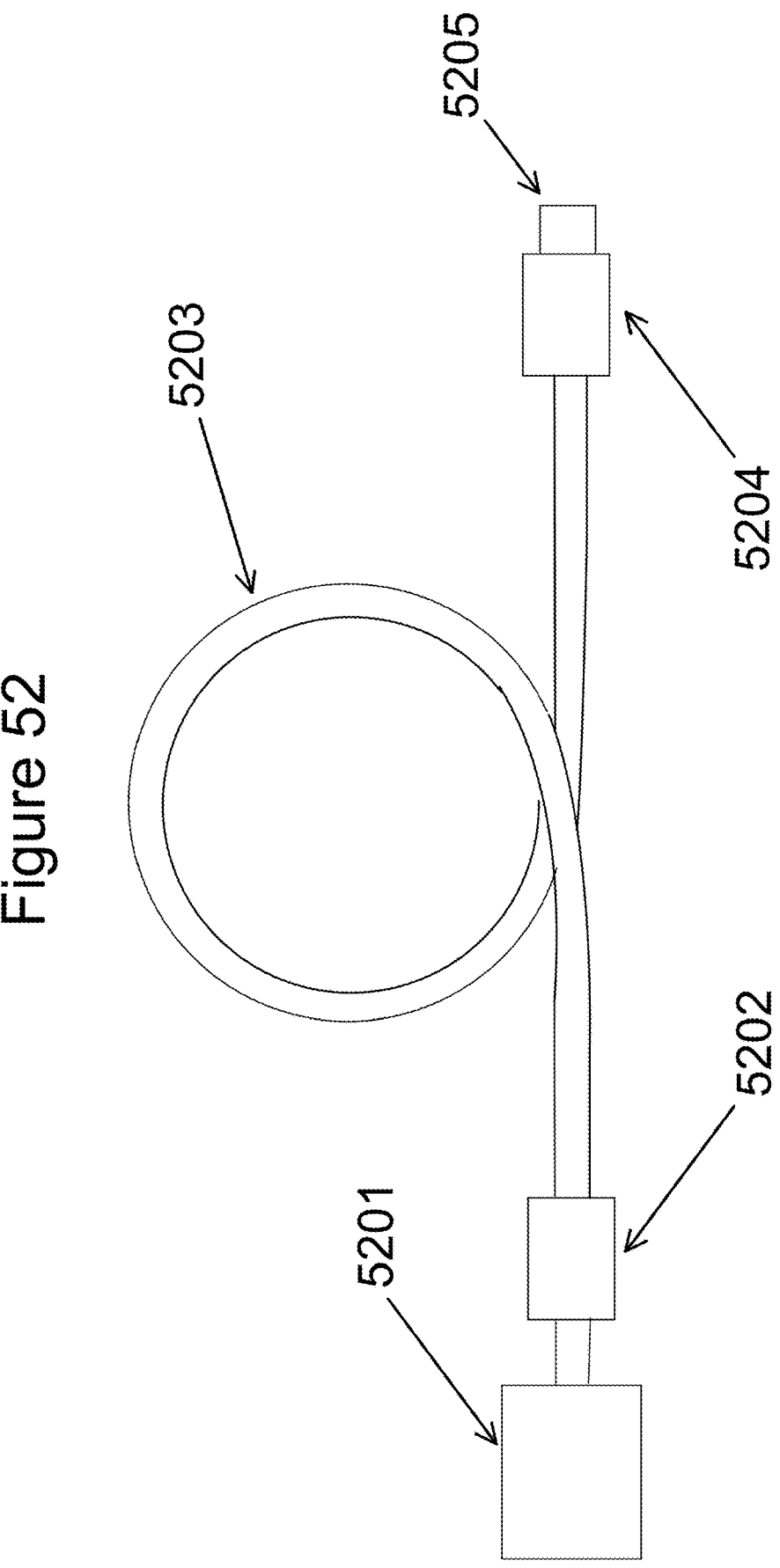
FIG. 52 shows a simplified fiber laser.

FIG. 52 shows a simplified fiber laser. Fiber lasers are one class of solid-state lasers in which the optical cavity is an optical fiber assembly.

A pumping light source 5201 (for example, a diode laser) introduces light into the fiber. Stimulated emissions within the gain fiber 5203 coherently amplify the signal as it reflects back and forth between two signal reflectors.

The reflector 5202 on one end of the cavity is a high reflector at signal wavelength. Reflector 5204 on the other end of the cavity, is a partial reflector (also called an output coupler). This allows coherent light to exit the cavity via optical system 5205.

In a fiber configuration, optical devices between the two reflectors are fiber-based devices. Fiber Bragg gratings (FBGs) may be used as the reflectors.

Figure 53:
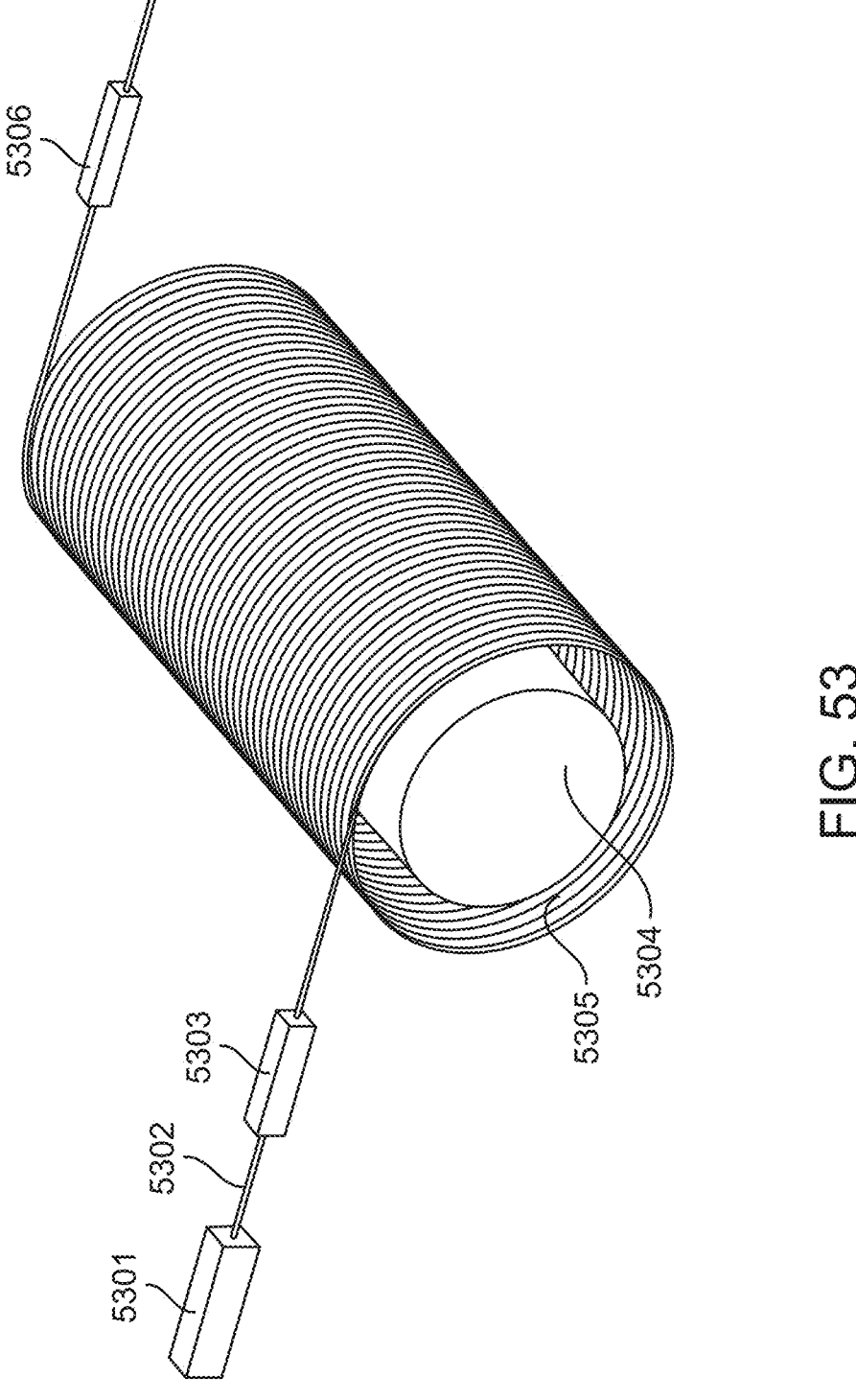
FIG. 53 shows an embodiment of a fiber laser pumped by combustion-generated characteristic radiation.

FIG. 53 shows a fiber laser pumped by combustion-generated characteristic radiation. In an embodiment, a mixture comprising fuel and oxidizer, is combusted within a cylindrical combustion chamber 5304 in the presence of emitting material. Combustion causes emitting material to emit characteristic radiation through the cylinder.

An optical gain fiber with a transparent, heat-resistant jacket 5305 is wrapped helically around the cylindrical combustion chamber. A high reflector 5303 and partial reflector 5306 are attached at the ends of the fiber.

In certain embodiments, a small semiconductor laser 5301 may act a seed pumping light source.

The characteristic light exiting the combustion cylinder is incident on the coils of the gain fiber. The gain fiber is doped with atoms emitting stimulated radiation when pumped by the wavelength of the incident radiation. In this embodiment, incident pumping radiation enters the fiber from the side (rather than the end or via splices).

This stimulated radiation is amplified in the gain fiber. The stimulated radiation emerges from the partial reflector as a continuous beam of coherent laser light.

Figure 54:
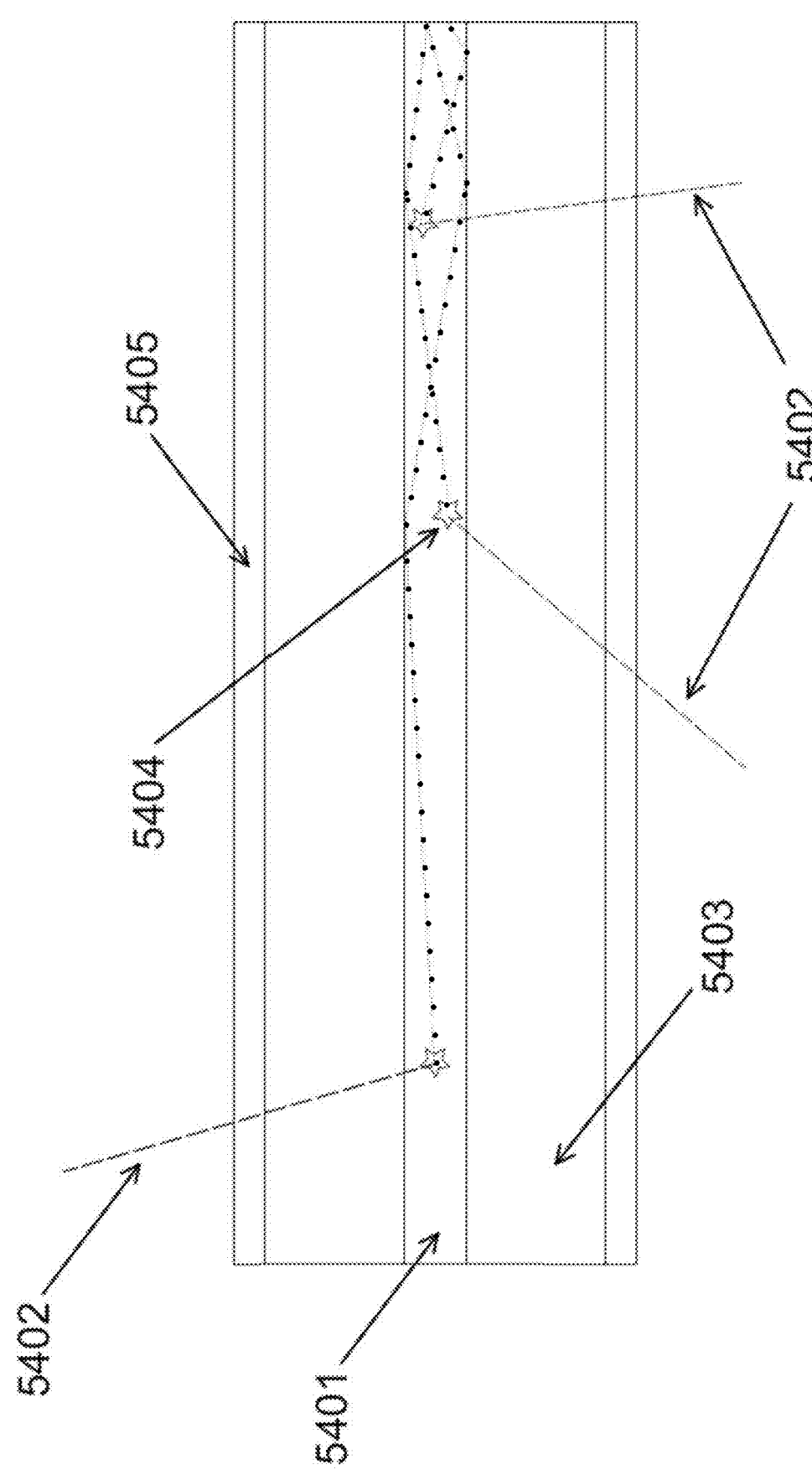
FIG. 54 is a longitudinal section showing details of the optical fiber of FIG. 53.

FIG. 54 is a longitudinal section showing details of the optical fiber of FIG. 53. In certain embodiments, the fiber is a double-clad design with a central core 5401 doped with atoms that emit stimulated radiation when pumped by the characteristic radiation incident from the combustion chamber.

That incident radiation exiting the combustion chamber (e.g., dashed lines 5402) passes through transparent, temperature resistant, low index of refraction outer cladding 5405. It enters the inner cladding 5403.

The inner cladding (fabricated, for example, from high purity silica) has a high index of refraction and a wide acceptance angle for entering light. Thus, some of the incident light may be captured and travels along within the cladding via total internal reflection.

Some of the incoming rays 5402 will be absorbed by the dopant atoms, stimulating emission of additional photons. Examples of absorption events are shown as stars 5406.

Figure 55:
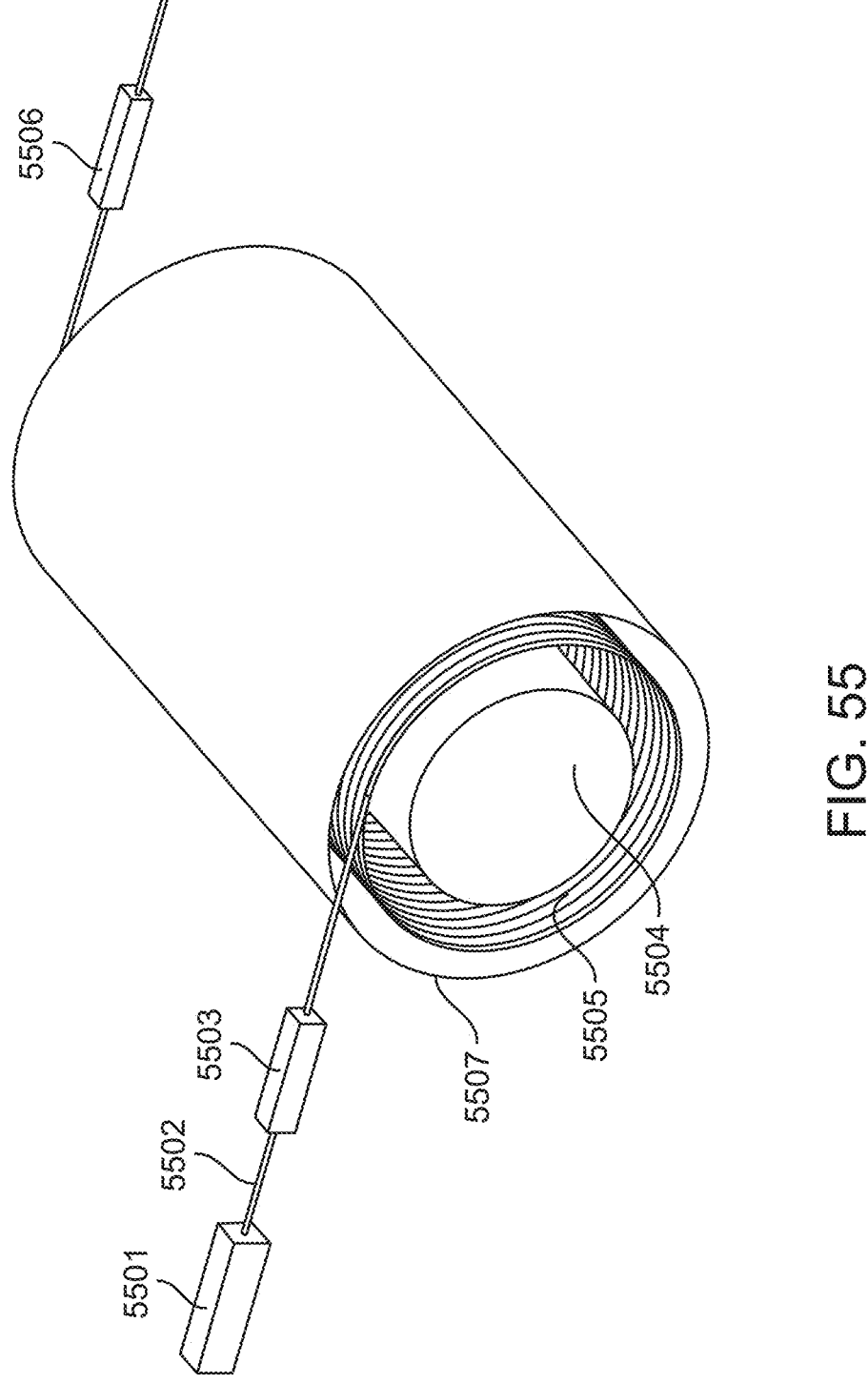
FIG. 55 shows an embodiment of a fiber laser pumped by combustion-generated characteristic radiation which is surrounded by a mirror to reflect uncaptured light back into the system.

Some light may not be absorbed and may pass through the fiber. Such unabsorbed light may be absorbed in a subsequent pass if reflected by a mirror, as illustrated in FIG. 55.

Other approaches to couple the characteristic radiation incident from the combustion chamber may be employed, such as those utilized in other side-pumped fiber lasers. For example, surface roughness of the fiber, texturing or subsurface scattering may lead to enhanced capture of incident rays.

The core has a yet higher index of refraction compared with the cladding. The core acts as a waveguide for this stimulated emission (dotted lines, for example 5404).

The stimulated emission radiation is amplified along the length of the fiber. Some portion is emitted as laser light by the output coupler.

As one possible example, the emitting material is sodium chloride, which emits near-monochromatic light at approximately 589 nm wavelength. The dopant is praseodymium, $Pr^{3+}$.

Stimulated emission of monochromatic light can, with a suitable cavity design, occur at one of several wavelength: 684 nm, 798 nm, 851 nm, or 1014 nm. The strongest signal may be from the 1014 nm resonance.

In certain embodiments, as shown in FIG. 55, a plurality of mirrors 5507 surround the apparatus. These mirrors reflect light not absorbed by the fiber, back into the system to improve efficiency.

Thus embodiments use characteristic radiation emitted from a combustion chamber to pump the laser. The design shown in FIG. 53 may offer the benefit that light capable of stimulating emission is incident along the full length of the gain fiber (rather than it being introduced at only a few discrete locations via pumping lasers).

The power source for the laser light generated by the apparatus, is the combustion of fuel (for example, propane, hydrogen, gasoline, or jet fuel) rather than electricity. This permits the design of high-power continuous lasers that are light and portable.

At least three different designs for photocell arrays capable of collecting characteristic radiation emitted from a cylindrical combustion chamber have been described.

1. An array of photocells surrounds a transparent combustion chamber;
2. A combination of photocells and mirrors surround a transparent combustion chamber;
3. A combustion chamber having some walls fabricated from a refractory material with a reflective inner surface, and at least one transparent wall with light exiting falling on a photocell array. (see FIG. 50).

The fiber laser pumped by characteristic radiation described above affords a fourth approach shown in FIG. 55. In an embodiment, a fiber laser is configured such that the output laser beam is incident on a plurality of specialized photocells (omitted for clarity) designed to absorb light with high power density. These photocells will then generate electricity.

Such a configuration can allow for the use of fewer solar cells than one that does not comprise lasing. Furthermore, the optical fiber can be lengthened to physically separate the photovoltaic cells from the combustion source (which may aid thermal management). Long fibers may also be useful in transmitting power over long distances without the use of electrical cables.

Photovoltaic cell band gap may be slightly below the energy of the laser photons, so that the laser photons are absorbed efficiently. That is, a relatively small amount of excess light energy remains after absorption, which then thermalizes in the photovoltaic cell.

For example, a gallium arsenide photocell has a band gap of approximately 1.42 eV. A praseodymium fiber laser pumped by sodium D-line light, as described above, can emit light with an energy of about 1.46 eV (corresponding to the 851 nm line).

Efficiency in such a system may depend in part upon the ratio of the energy of the characteristic radiation to the energy of the laser light. Therefore, system components (e.g., emitting material, fiber dopant, and/or photovoltaic cell material) be chosen so that these two energies are close together.

Figure 56:
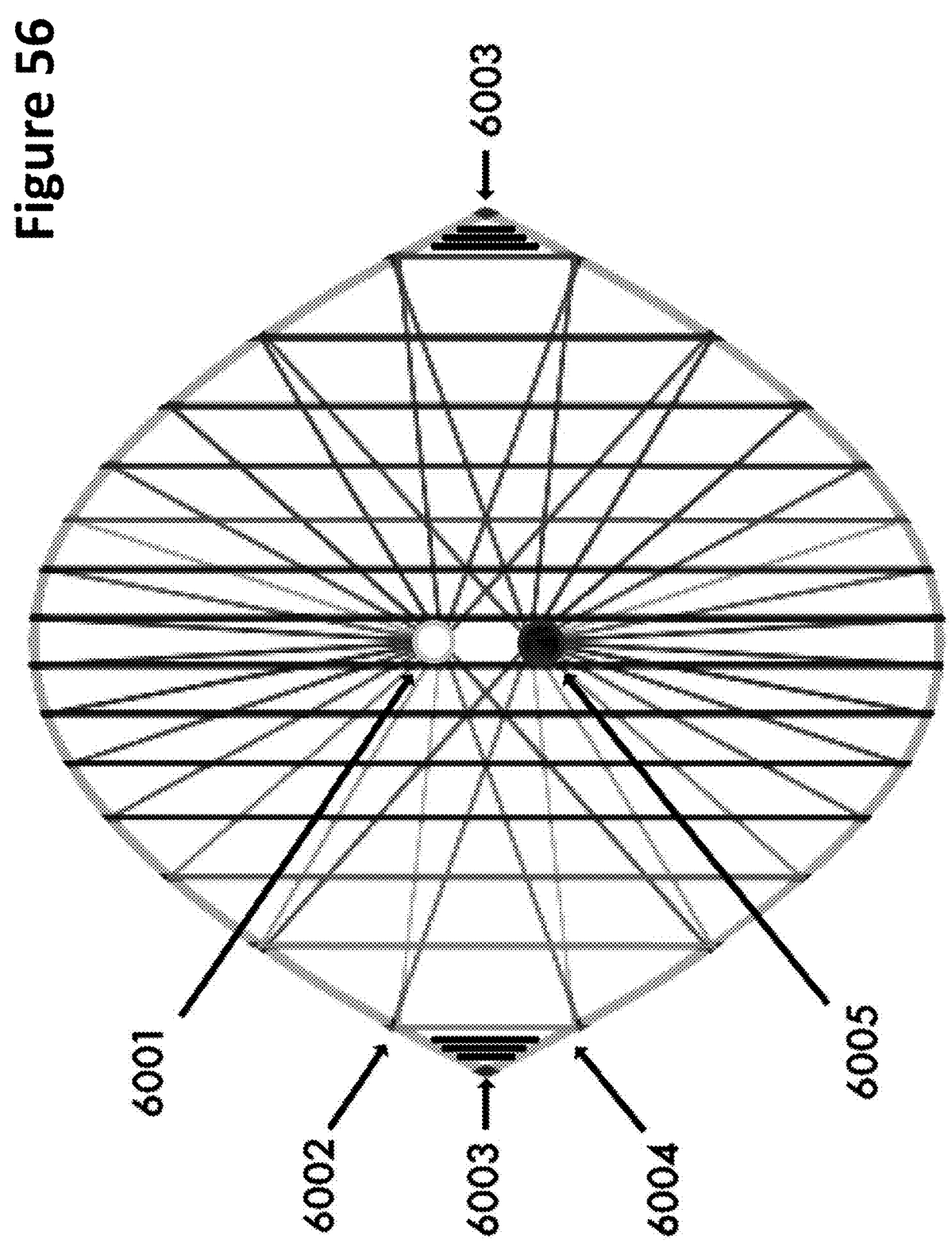
FIG. 56 shows a simplified cross section of a parabolic concentrator.

Referring now to FIG. 56, a concentrator may be used to intensify or balance light emitted from the combustion chamber, in order to achieve one or more of the following:

optimize power production,
reduce the area of photovoltaic cells, and/or
provide convenient cooling solutions.

FIG. 60 shows a simplified embodiment of a series-parabolic concentrator. The combustion chamber 6001 is placed at the focus of a parabolic trough 6002. Another parabolic trough 6004 is positioned opposite. A receiver 6005 is placed at the focus of this second parabolic trough.

The receiver is an assembly comprising photovoltaic cells. The assembly may also comprise one or more of: frequency-selective mirrors, cooling apparatus, and/or instrumentation—e.g., thermocouple(s).

As a possible benefit of this arrangement, a cylindrical receiver may comprise PV cells shedding heat to a cooling pipe that is filled with cooling fluid such as water. Ends of the troughs may be covered with mirrored caps.

Secondary receivers 6003 (which may be optimized to absorb characteristic radiation and/or infrared), may be embedded within the cavity. Optical, infrared, or bandpass mirrors or filters may also be positioned at positions 6003 so as to selectively absorb undesirable radiation (such as infra-red).

Rays from the combustion chamber 6001 are collimated by its parabolic trough 6002 and sent directly parallel to the receiver's parabolic trough 6004. This focuses the rays towards the receiver 6005.

Some rays (for example those emitted from the combustion chamber in the direction of the receiver's trough 6004) may follow a more complex path involving multiple reflections before ultimately being absorbed by the receiver. Such multi-reflection path(s) can be optimized by ensuring that the mirror geometry is ergodic, and/or by maximizing mirror reflectivity.

In certain embodiments, a TPV generator can be combined with another thermodynamic cycle. One possible example is the use of a TPV generator as a topping cycle for the Brayton cycle, which is characteristic of turbomachinery (e.g., turbofans, gas turbines, turbojets).

Turbomachines utilizing the Brayton cycle may extract less useful work because the heat of combustion is mixed down to a temperature below the maximum flame temperature before the heat is used to generate work.

In certain turbomachines, this happens in the combustion chamber, where cooler air is added so that the air and fuel are below the maximum flame temperature before combustion. In other designs, cool air may be mixed with the exhaust gasses before they are delivered to the expansion turbine. This may be done to accommodate material constraints of the expansion turbines and other components.

Embodiments of TPV generator(s) allow for work to be extracted from heat added at the highest practical temperatures. This may be a flame temperature approaching a maximum set by the thermochemical equilibria.

Such work extraction at high temperature is beneficial for thermodynamic efficiency. Additional compression provided to the TPV generator may improve power density, high altitude functionality, thrust, and/or efficiency.

When heat is used at a lower temperature than the maximum flame temperature, a TPV generator could be used to produce electricity from high temperature heat, and the low temperature heat can be delivered for the original purpose, or any others. The TPV generator will produce electricity, and its exhaust and unused heat can be delivered for any other purposes (for example, space or process heating or water heating). FIG. 45 shows a configuration of this kind.

Figure 57A:
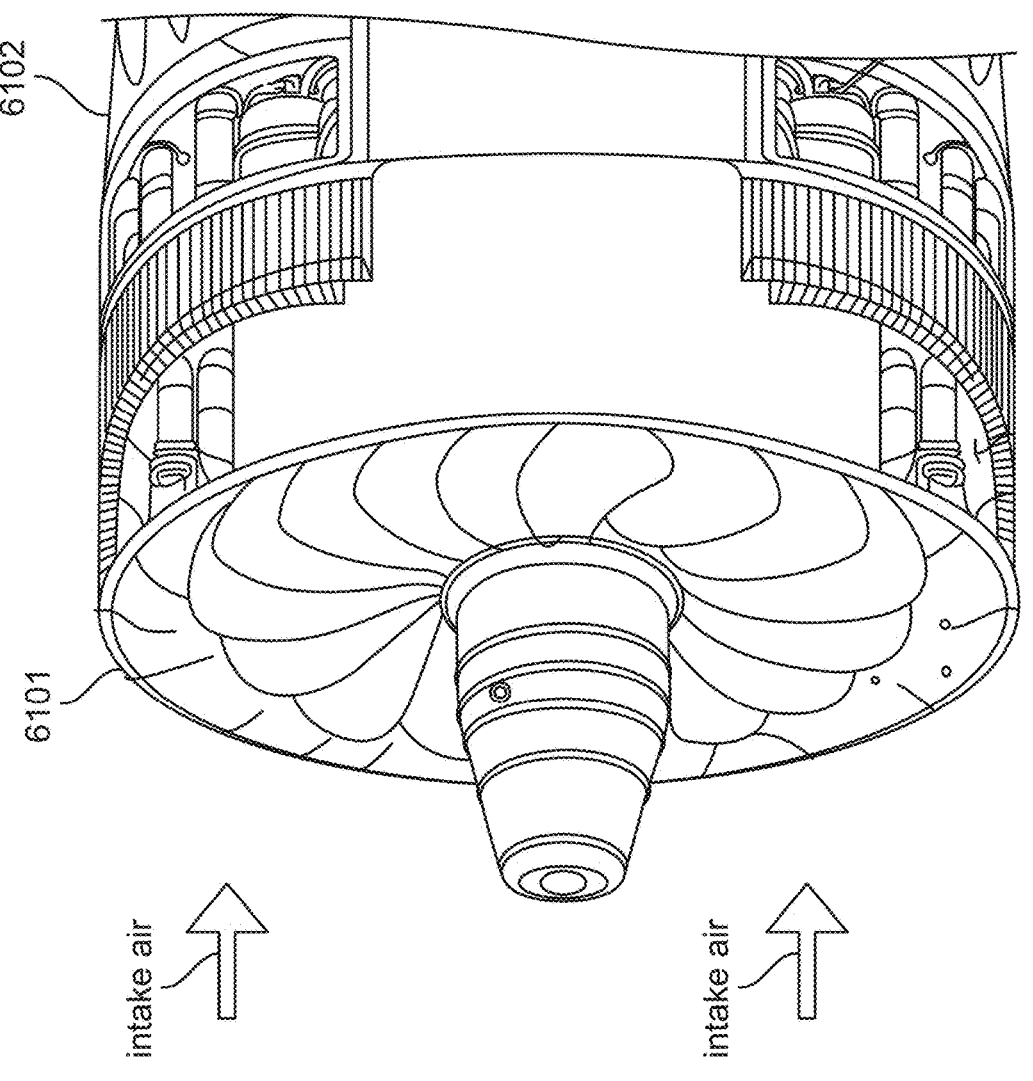
FIGS. 57A-C show cutaway views of a combined cycle turbine according to an embodiment.
Figure 57B:
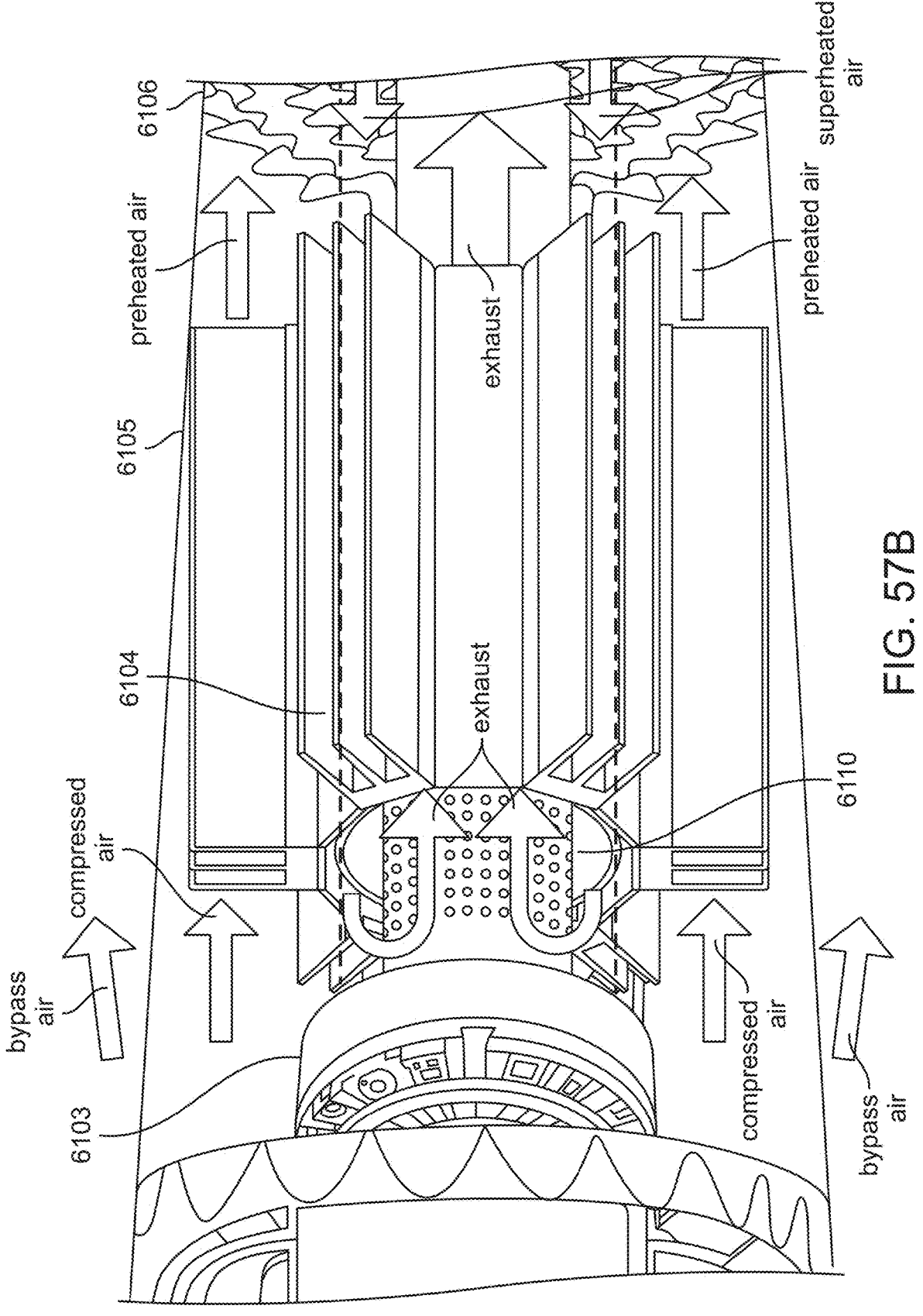
Figure 57C:
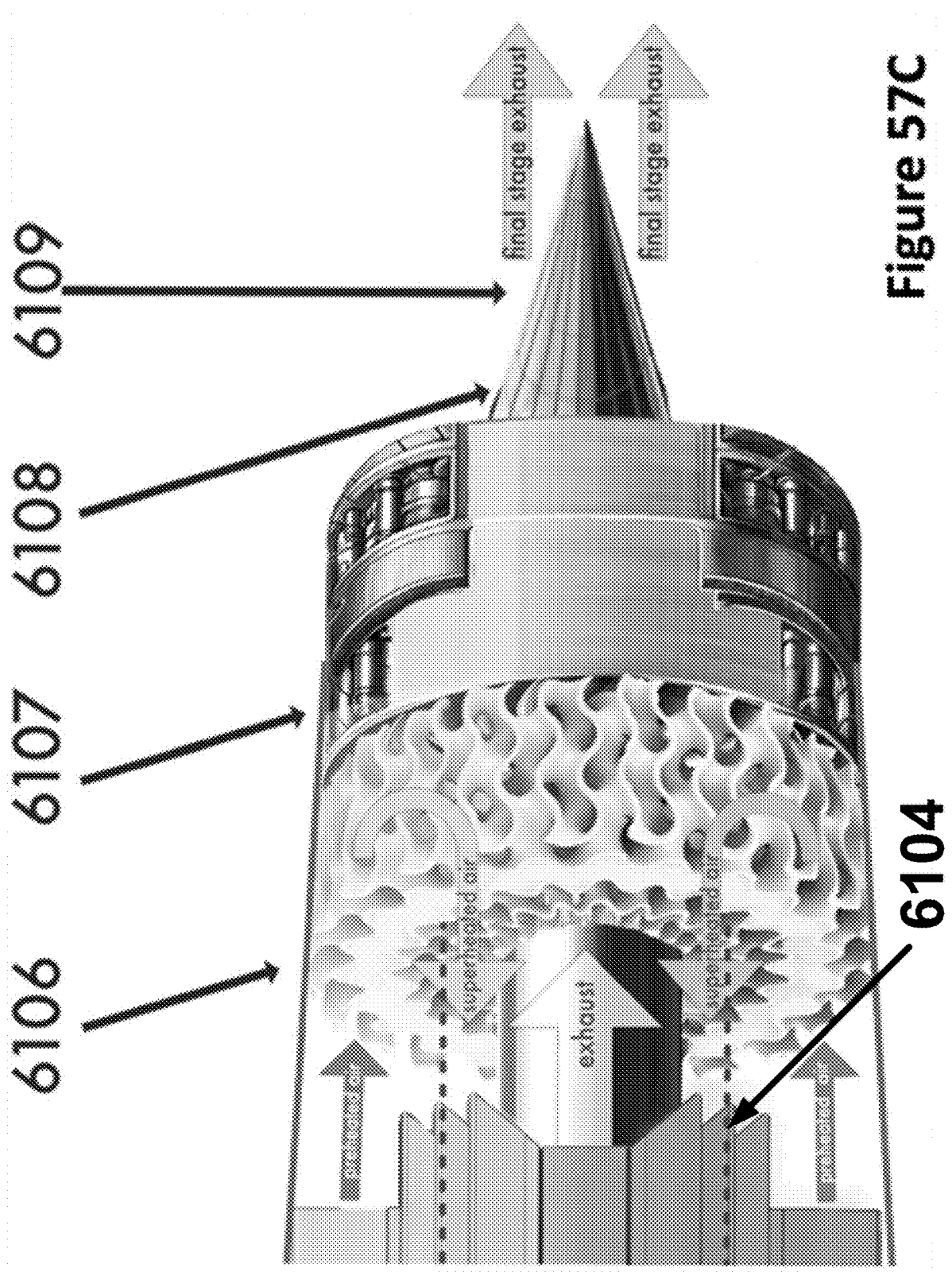

A possible integration of a TPV topping cycle into a combined cycle system configured as a turbofan, is shown in FIGS. 57A-C. Air is drawn into the fan/compressor 6101, which may be a fan followed by a multistage compressor.

After the fan, bypass air is directed through the bypass duct 6102, producing thrust. Additionally, after a plurality of stages of compression, compressed air may be controllably delivered through ducts. This may be as cooling or boundary layer control in various parts of the system, and/or as a bypass flow to be routed to a final expansion stage/afterburner 6108.

In certain embodiments, an electric motor generator 6103 is present. This motor generator may be used for converting electric power to shaft power and vice versa, and/or for starting and stopping the turbofan.

An annular combustion cavity 6104 with a transparent wall is surrounded by an assembly 6105 comprising photovoltaic cells. In certain embodiments, the assembly 6105 also comprises mirrors.

Cooling apparatus (for example, finned heat sinks, heat pipes, heat exchangers, cooling ducts, or others) may also be present in the assembly 6105. Cooling may occur through main air flows, bypass air flows, exterior air flows, or other fluid flows, conduction, convection or radiation, or some combination thereof.

Compressed cooling air is flowed from the fan/compressor through the nacelle past the assembly 6105. This cools the assembly and preheats the air.

In some embodiments, a recuperator 6106 is used to enhance efficiency in the TPV generator by preheating the air using exhaust heat. The air turns around in the recuperator, is preheated, and then delivered into the annular combustion cavity 6104.

In certain embodiments, the recuperator 6106 is a minimal surface manifold dividing up the volume between incoming air and reacted exhaust, with a double gyroid unit cell geometry.

Combustion proceeds in the cavity 6104, where fuel is injected. Characteristic radiation is emitted by emitting material present in the cavity.

Emitting material may be added to the fuel and/or the incoming air and/or may be: encapsulated in the cavity, incorporated in the material of the combustion chamber wall, or some combination of these. Characteristic radiation is optically communicated through the cavity's transparent wall, to the photovoltaic cells in assembly 6105.

The cavity 6104 surrounds an exhaust duct 6110, which has openings at the side opposite to the cavity inlet. The exhaust duct flows exhaust into the recuperator.

After the recuperator, in some embodiments there may be an expansion turbine stage 6107. This produces shaft work. The shaft may be embedded inside/surrounded by exhaust duct 6110.

After the expansion turbine, in particular embodiments may feature a final stage/afterburner 6108. The final stage expands and accelerates the pressurized gasses using, for example a de Laval nozzle or an aerospike.

This may be useful in an afterburning capacity. There fuel is added to consume oxygen from bypass air or air remaining in the turbine exhaust gases.

In some embodiments (and especially those featuring afterburning), additional PV cells 6109 may be used to recover additional electricity from a luminous, seeded flame of the afterburner. The electricity may be used to power motors or onboard high power systems.

EXAMPLE

Recent laboratory work in thermophotovoltaics has increased efficiencies from 30% to beyond 40%. Particular embodiments may seek to surpass these efficiencies and to enable energy conversion on demand from hydrogen or hydrocarbon fuel. Embodiments can provide very high power and energy densities and the potential for long duration energy storage when combined with technology for bulk hydrogen generation.

Apparatus and methods described in this example employ thermophotovoltaic (TPV) technology to efficiently convert the chemical energy contained in any of a variety of fuels into electricity with high efficiency and a minimum of mechanical parts.

Conventional electric generators first convert heat energy to mechanical energy (for example, via a reciprocating piston engine) and then use that mechanical energy to drive an electrical generator to produce electricity. Such conventional generators (for example, diesel generators) will typically convert about 35% of the chemical energy available in their hydrocarbon fuel into electricity. Thermophotovoltaic (TPV) generators offer an alternative technology in which the heat from the combustion of fuel is converted to light, which in turn is converted to electrical energy via photovoltaic (PV) cells. Examples of the present invention are intended to deliver efficiencies comparable or in excess of those of conventional generators.

Figure 1:
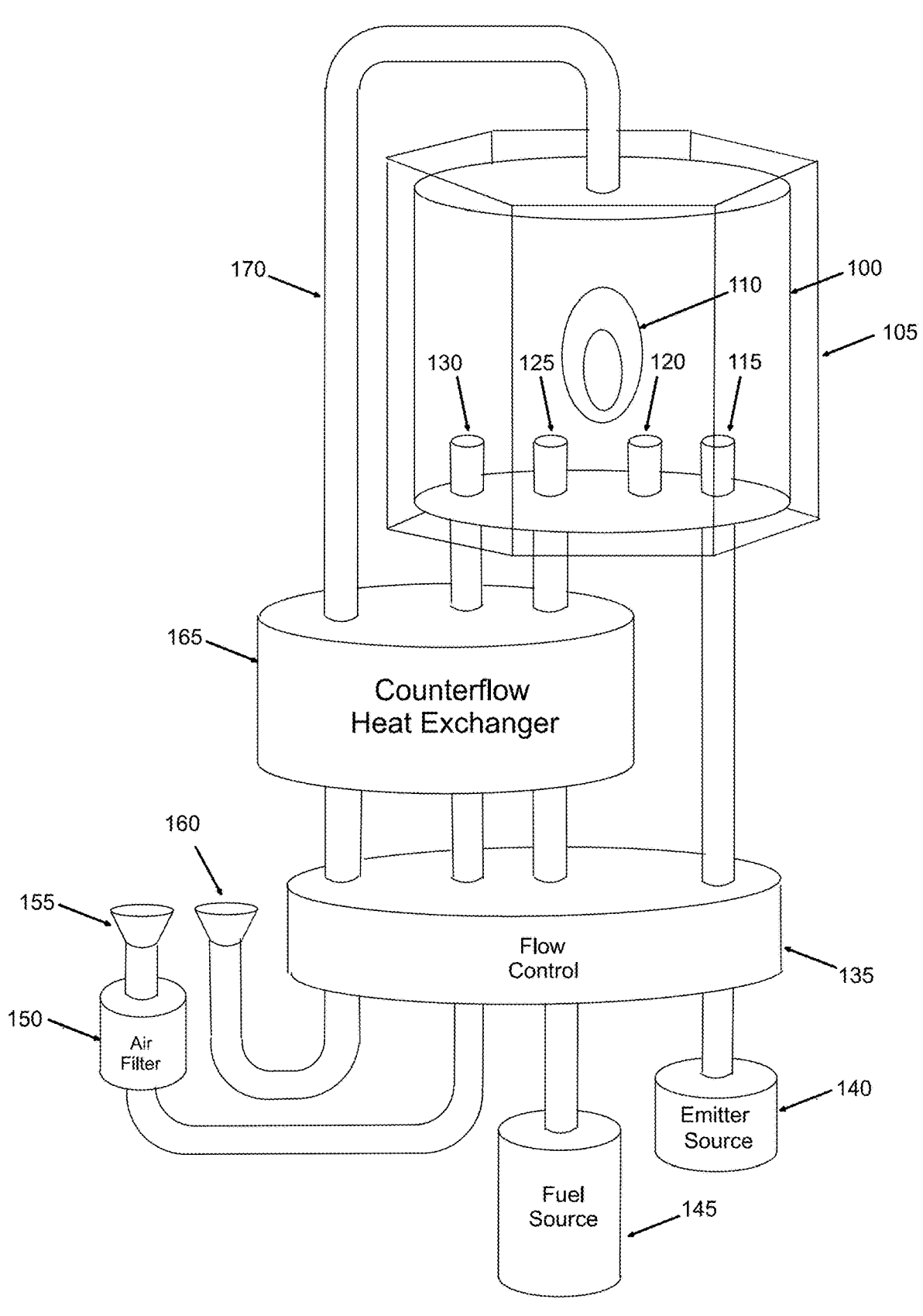
FIG. 1 shows a simplified schematic representation of an embodiment of the present invention that utilizes gaseous fuel.

In more detail, in FIG. 1 there is shown a combustion chamber which comprises a transparent enclosure 100, one or more fuel inlet nozzles 125, one or more inlets for an oxidizer (for example, air, as shown in the figure) 130, one or more inlets for an emitting material 115, and an ignition mechanism 120.

Two things occur in this combustion chamber. First, fuel is burned, creating a flame 110. Second, the heat of combustion heats a finely distributed emitting material, which is introduced into the combustion chamber via the inlet or inlets 115, resulting in the emission of near-monochromatic, or at least strongly peaked, light. An example of such an emitting material is sodium, which, when heated sufficiently, will emit bright yellow light around two closely spaced spectral lines of approximately 589 and 589.6 nanometers wavelength. At low sodium densities, the light is primarily just these two lines, and at high sodium densities, the vast majority of the light is around the 589-589.6 nm peak but spread out, with two strong absorption lines at the same 589 nm and 589.6 nm wavelengths.

The emitting material may be introduced in various ways. In some embodiments it may be dissolved (e.g. sodium chloride dissolved in water) and sprayed as fine droplets. In such a case 115 is a spray nozzle. In some embodiments an aerosol spray or mist of very fine particles is created ultrasonically.

Although FIG. 1 shows only one inlet nozzle each for fuel, oxidizer and the emitting element, in certain embodiments, one or more of these reactants may be introduced via multiple nozzles (for example, laminar flow nozzles) or via sapphire or ceramic (e.g. alumina) disks with laser-cut holes or slots. This is the case for the designs shown in FIGS. 2, 3, and 4 as well.

The combustion chamber is enclosed by a transparent material 100 and, in this embodiment, this enclosure is cylindrical and fabricated from sapphire tubing. Sapphire is chosen for its ability to tolerate high temperatures as well as for its transparency and strength. Another choice, quartz, might be suitable, but could be infiltrated by sodium over time.

Figure 5:
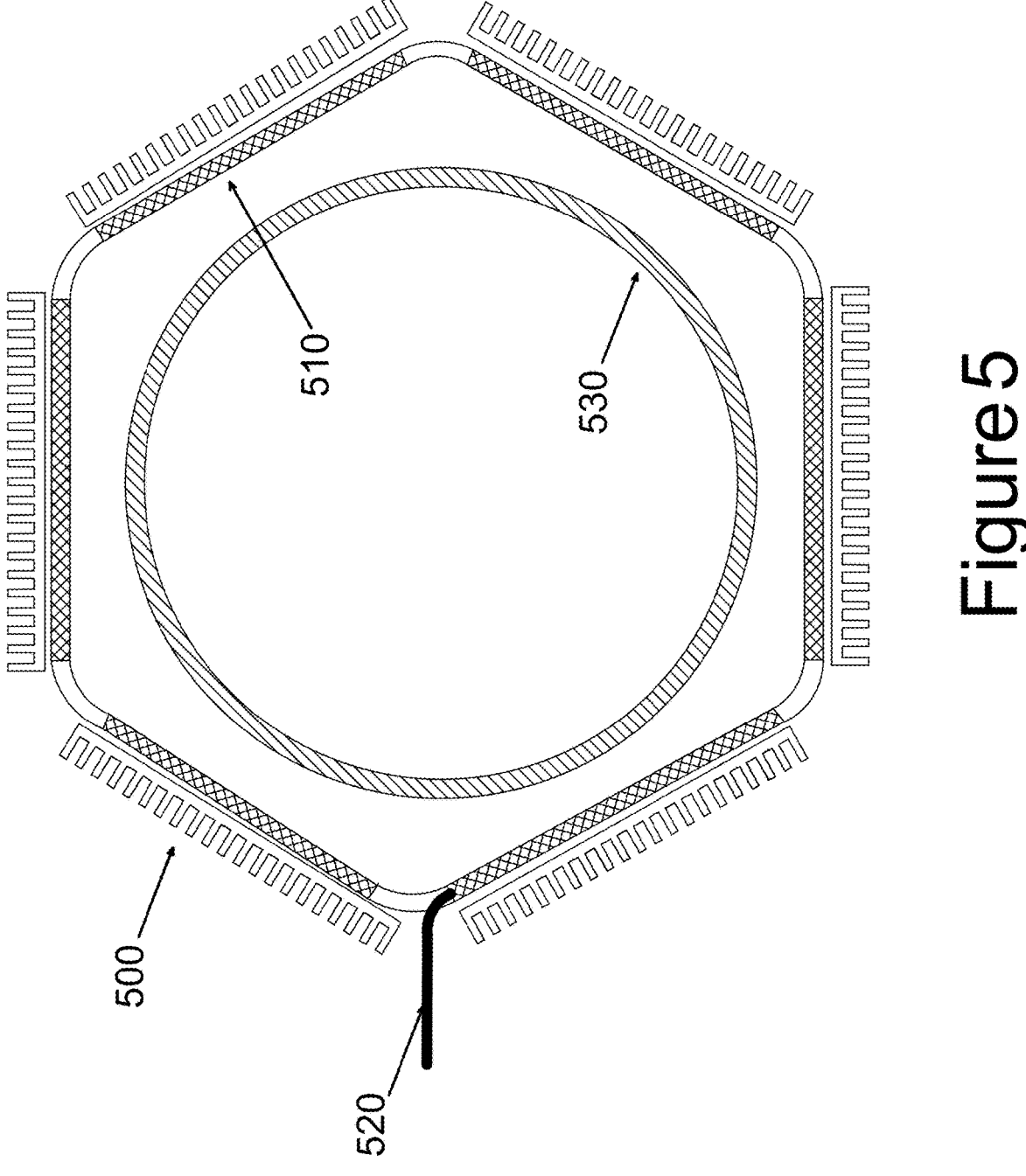
FIG. 5 shows a cross-sectional view of a sub-assembly of the embodiment of the present invention of FIG. 1 comprising the combustion chamber, the mirror/PV assemblies, and heat sinks.
Figure 6:
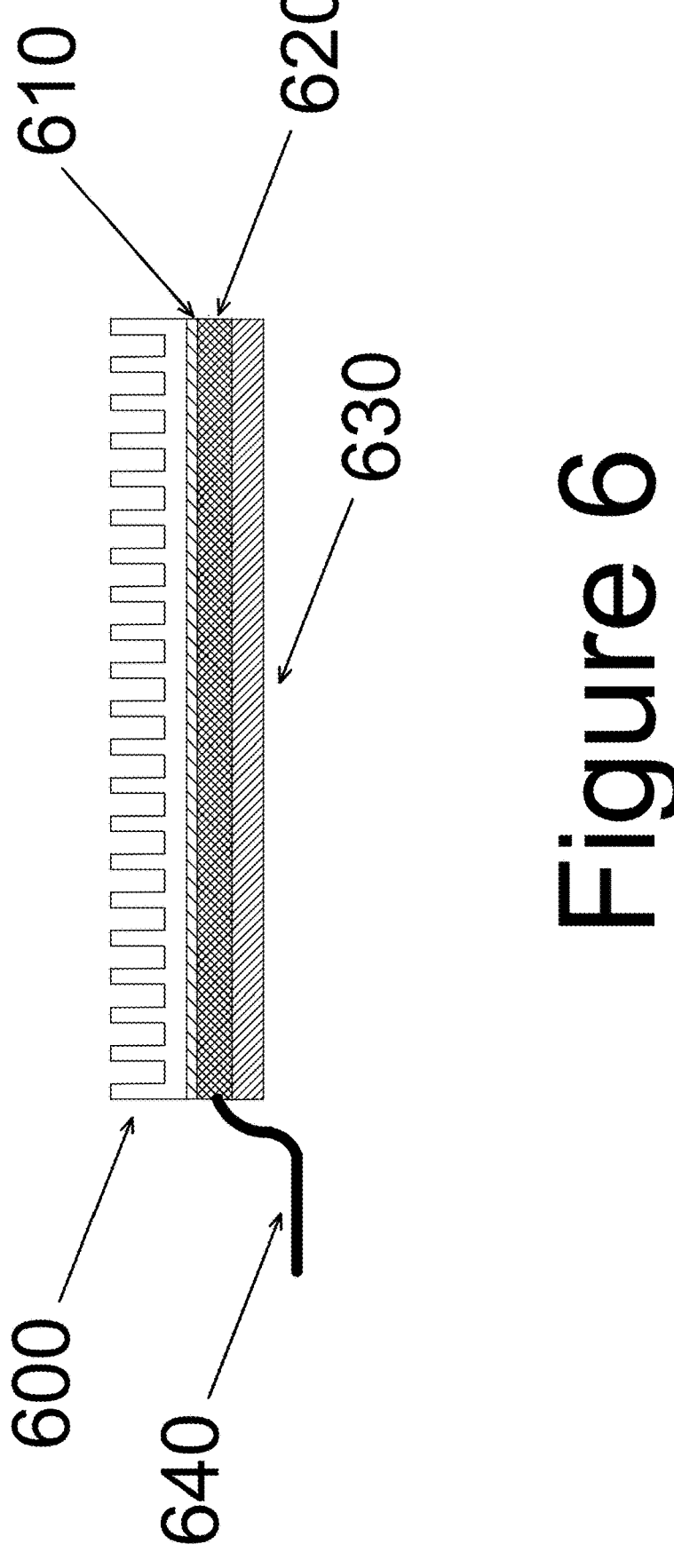
FIG. 6 shows a detail cross-sectional view of the mirror/PV assembly of the embodiment of FIG. 1.

A subassembly 105 surrounds the combustion chamber and is in optical communication with the light generated by combustion. This sub-assembly 105 incorporates wavelength-selective mirrors, PV cells and heat sinks. It is shown in schematic form in this figure (as well as in FIGS. 2, 3, and 4). More details of this sub-assembly are shown in FIGS. 5 and 6.

The fuel used in the apparatus shown in FIG. 1 may be any combustible gaseous fuel. This fuel is stored in a pressure vessel 145. Different embodiments of the present invention are designed to use one or more fuel types. Suitable fuels include hydrogen gas, natural gas, methane, butane, propane, and ammonia. Regardless of the fuel used, a high temperature inside the combustion chamber affords high output of near-monochromatic light and high conversion efficiency. The higher the flame temperature, the more emitter atoms and ions will be excited by the heat energy into a high-energy state, resulting in more intense emission of the characteristic wavelengths.

If the oxidizer used is air, it enters via an intake 155 and passes through an air filter assembly 150. In some embodiments this assembly also contains a fan both to draw the air in through the intake 150 and to help control the pressure in the combustion chamber during start-up and shut-down.

The flow rate of reactants is controlled by a flow controller 135. Flow control may be effected by needle valves, one each for the fuel, oxidizer, and emitting material streams. These valves may be controlled electronically in certain embodiments.

When the system is first started up, the fuel and oxidizer mixture is ignited by an ignition mechanism 120. In embodiments this mechanism is an electronic igniter or a laser ignition system. This igniter may, in different embodiments, be controlled either electronically or manually (for example, with a push-button).

The exhaust gasses created by the combustion process proceed through outlet 170 and pass through a counterflow heat exchanger 165. Fuel and air flow through the other side of the heat exchanger. Heat is transferred from the combustion products to the incoming reactants, preheating the fuel and oxidizer before they enter the combustion chamber. Note that the flow controller 135 is on the cool side of the heat exchanger 165 so as to reduce heat stress on the materials used.

In some embodiments, the flow control system 135 incorporates a fan to draw the exhaust gasses through the system. These gasses ultimately exit the system via exhaust port 160.

A fuel delivery system, inlet nozzles, an electronically controlled ignition mechanism, a draft fan, and a heat exchanger may be found in conventional high-efficiency furnaces. Novel elements can include its transparent combustion chamber, the emitting element(s), and/or the mirror/PV assembly surrounding the chamber.

The design details of the fuel delivery system depends on the fuel chosen. In general, the fuel delivery system may be similar to systems used in conventional furnaces and other combustors that operate with internal pressures near ambient. Note that, in the present example, the fuel and oxidizer may be delivered continuously (as is the case, for example, in a furnace) rather than intermittently (as, for example, in a reciprocating piston engine).

Figure 2:
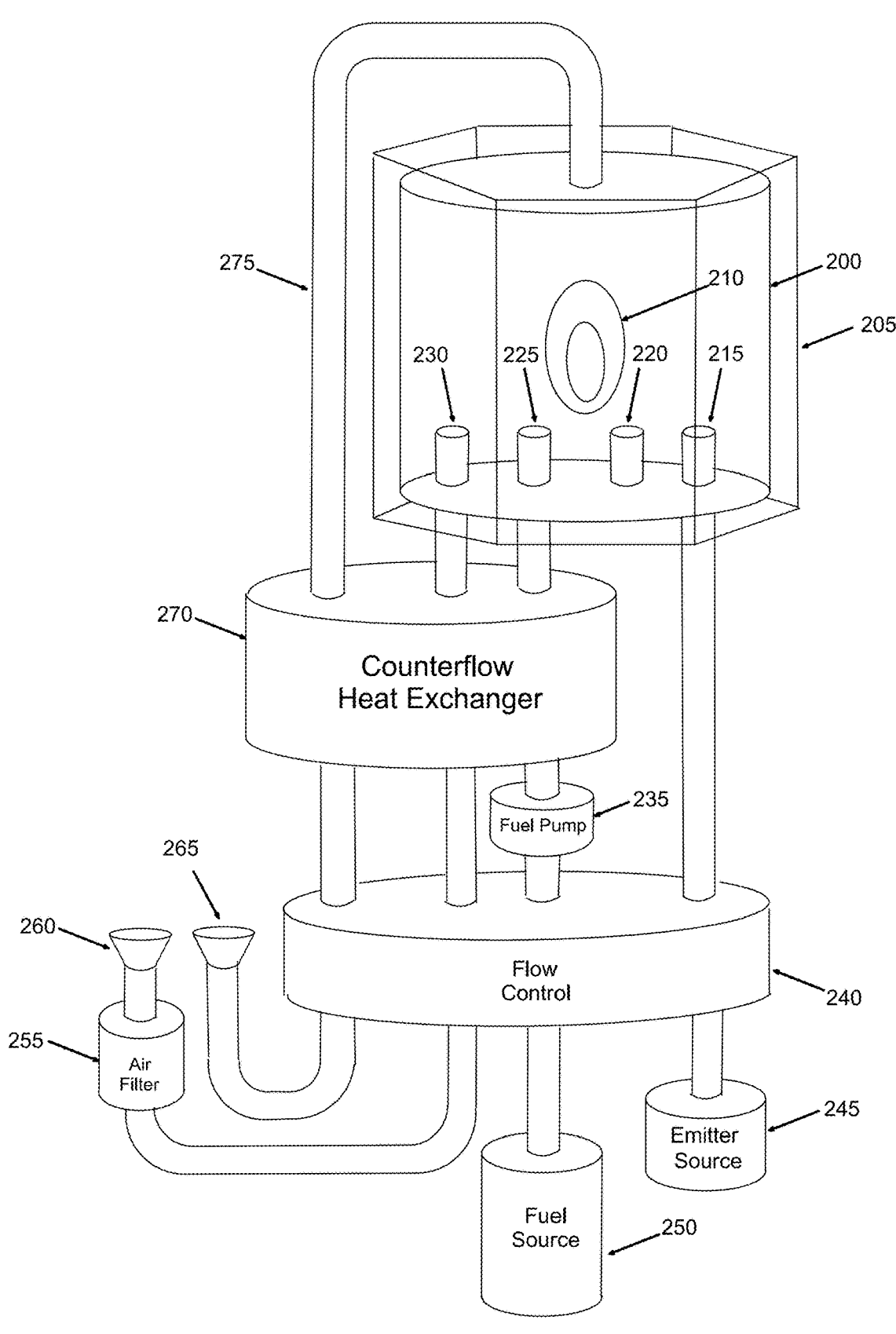
FIG. 2 shows a simplified schematic representation of an embodiment of the present invention that utilizes liquid fuel.

Referring now to FIG. 2, a design that utilizes liquid rather than gaseous fuel is shown. Liquid fuel (for example, diesel fuel or gasoline) is stored in vessel 250. This fuel is atomized to form an aerosol and is injected by means of a fuel pump 235 into the combustion chamber 200 via one or more nozzles 225. In certain embodiments, the fuel pump 235 is driven electrically. In other embodiments, not shown in the figure, the fuel pump is driven mechanically (for example, using power obtained from the flow of exhaust gasses).

An oxidizer is introduced into the combustion chamber 200 via one or more nozzles 230. In an embodiment, the oxidizer is air, which enters via an intake 260 and is filtered via an air filter 255. The emitting material is introduced into the combustion chamber via one or more nozzles 215.

The reactant mixture is ignited by the ignition mechanism 220. The design specifics of the injection system (for example, the number and design of the injection nozzles) and the ignition system 220 depend on the fuel used.

As in FIG. 1, the emitting material is heated by combustion so that it emits characteristic radiation (in one embodiment, sodium D-lines) which exits the combustion chamber and falls on the sub-assembly 205, which surrounds the combustion chamber and is in optical communication with the light generated by combustion. This subassembly 205 comprises wavelength-specific mirrors and PV cells and is shown in more detail in FIGS. 5 and 6.

Also as in FIG. 1, a flow control system 240 controls the flow of fuel, oxidizer, and the emitting material. In certain embodiments, the flow control system will incorporate a fan to push fresh air into the combustion chamber or to draw the exhaust gasses out from it.

Again as in FIG. 1, a counterflow heat exchanger 270 transfers heat from the exhaust gasses exiting the combustion chamber 200 via the conduit 275 so as to preheat the fuel and oxidizer.

Figure 3:
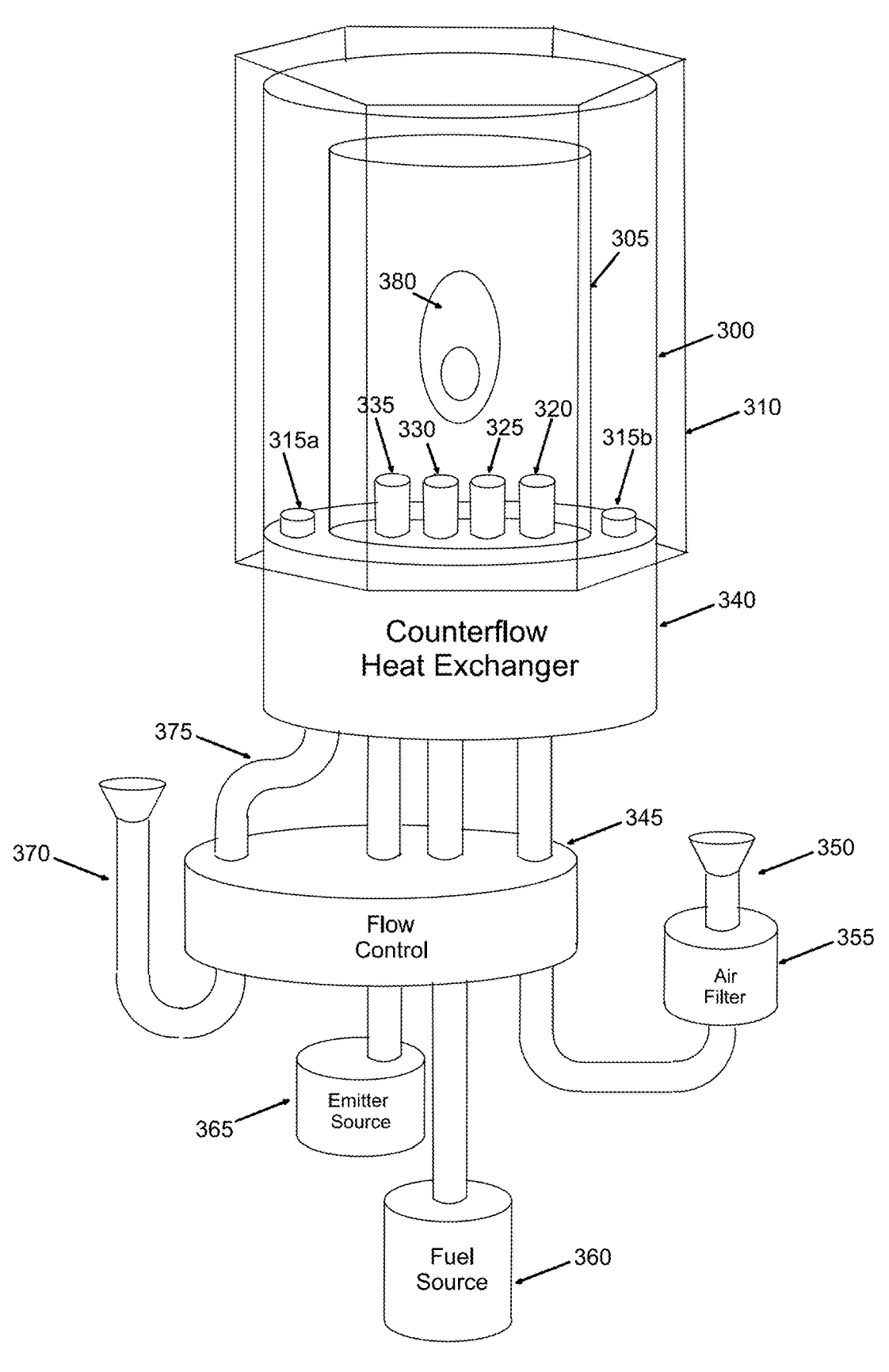
FIG. 3 shows a simplified schematic representation of an embodiment of the present invention in which the combustion chamber comprises two concentric transparent cylinders.

Referring now to FIG. 3, an embodiment of the present invention is shown with a combustion chamber comprising two concentric transparent cylinders 300 and 305. The inner cylinder 305 is both smaller in diameter than the outer cylinder 300 and shorter so that the two regions, inside the inner cylinder and outside it, are in physical communication with each other.

Gaseous fuel (for example, hydrogen gas, methane, natural gas, propane, or butane) is introduced into the inner cylinder via one or more nozzles 330. Oxidizer is introduced into the inner cylinder via one or more nozzles 320. In an embodiment, as shown in the figure, the oxidizer is air, which enters the system via intake 350 and then passes through air filter 355.

As in other embodiments, the emitting material is introduced via a mechanism 335 which mixes with the reactants. The emitting material is heated by the combusting fuel and emits characteristic radiation (in an embodiment, sodium D-lines).

The reactants are ignited via an ignition mechanism within the inner cylinder 325. As in other embodiments, the ignition system is operated either mechanically or electronically.

Combustion is initiated in the inner cylinder and the flame 380 flows out of the inner cylinder into the annular cylinder region between the inner and outer cylinders. The exhaust gasses then flow out of the combustion chamber via one or more outlets 315 (two such outlets, 315a and 315b, are shown in the figure).

The exhaust gasses pass from the combustion chamber outlet(s) through a counterflow heat exchanger 340. The heat from the exhaust gasses is transferred to the incoming fuel and oxidizer streams to preheat them prior to combustion.

Once the exhaust gasses have passed through the heat exchanger 340 they are discharged via outlet 370.

The design shown in FIG. 3 is typically more compact than the designs shown in FIG. 1 or FIG. 2 as the heat exchanger can be attached directly to the bottom of the combustion chamber and no external piping is required to direct the exhaust gasses into the heat exchanger.

In some embodiments, the heat exchanger 340 is fabricated from alumina using 3D printing techniques.

A flow control system 345 regulates the flow of fuel, oxidizer, and emitting material into the heat exchanger 340. In some embodiments the flow control system incorporates one or more fans to draw air into the combustion chamber and/or to draw the exhaust gasses out.

As in FIGS. 1 and 2, flow control is effected by needle valves, one each for the fuel, oxidizer, and the emitting material. In some embodiments these valves are operated manually (for example, with knobs); in other embodiments they are controlled electronically.

Figure 4:
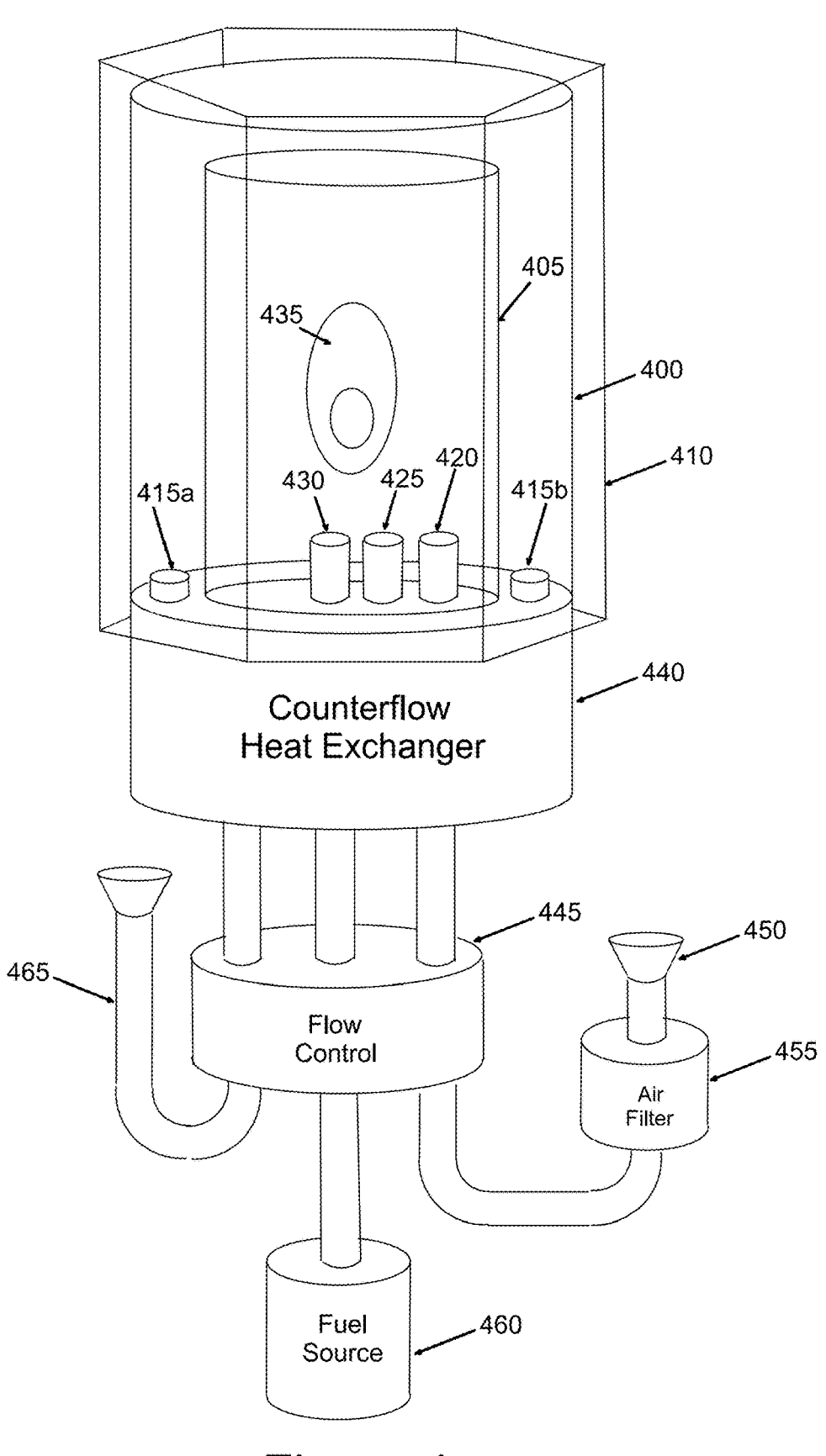
FIG. 4 shows a simplified schematic representation of an embodiment of the present invention in which the combustion chamber comprises two concentric transparent cylinders and the emitting material is embedded in the inner cylinder.

Referring now to FIG. 4, the design shown therein operates as the design shown in FIG. 3, with the following difference: The inner cylinder in the combustion chamber 405 has the emitting material embedded in it. As a result, no external source of emitting material (nor the mechanism to deliver that material) is required.

All embodiments shown in FIGS. 1, 2, 3, and 4 incorporate a heat exchanger. In certain embodiments, this heat exchanger utilizes a counterflow design. The heat exchanger may be designed so as to transfer as much heat as is practical and cost-effective to the incoming oxidizer. In certain embodiments, the heat exchanger is designed such that the incoming fuel is heated to a lesser degree than the incoming oxidizer. In certain embodiments, the fuel does not pass through a heat exchanger at all before entering the combustion chamber. In other embodiments, the oxidizer and the fuel pass through two separate heat exchangers. Compared with the volumes of fuel and oxidizer, only small quantities of emitting material are required. As a result, in some embodiments, the emitting material is not heated prior to entering the combustion chamber.

In FIGS. 1, 2, 3 and 4, all embodiments include a flow control system. In certain embodiments, the oxidizer and/or the emitting material are drawn through the flow control system naturally by the flow of fuel (for example, via the Venturi effect) and are not controlled independently.

Referring now to FIG. 5, the sub-assembly shown is hexagonal in cross section and surrounds the combustion chamber 530. Each hexagonal side consists of a PV/mirror assembly 510 and a heat sink/positive current collector 500. This assembly is shown in more detail in FIG. 6.

A negative current collector 520 collects the current generated by the PV cells. In the embodiment of the example one or more such current collectors are present for each of the six sides of the hexagonal assembly. Only one is shown in FIG. 5 for purposes of clarity.

In some embodiments an active cooling system (for example, a fan) is used to dissipate the heat collected by the heat sinks 500. Additional active cooling may be required in some embodiments to remove heat from the space between the combustion chamber and the hexagonal sub-assembly. In some embodiments, intake air is blown past the heat sinks immediately after the air filter, in others, the heat sinks have additional airflow. It may be important that the PV/mirror assemblies not get too hot or their efficiency and current output can be adversely affected. Note that, for purposes of visual clarity, the heat sinks are shown as separated from the PV/mirror assemblies. In fact, the heatsinks will generally be in direct contact with those assemblies.

Embodiments other than that shown in FIG. 5 may utilize geometries other than a hexagon for the PV/mirror sub-assembly. Any geometry with e.g. three or more sides (or a cylinder) may be used, provided that the sub-assembly surrounds the combustion chamber and its surfaces are in optical communication with the light generated by combustion.

Referring now to FIG. 6, a cross-section of one of the sides of the hexagonal sub-assembly from FIG. 5 is shown. The element nearest the combustion chamber is a wavelength-specific mirror 630. In some embodiments this mirror reflects infrared radiation back into the combustion chamber and allows visible light to pass through it. In other embodiments, the mirror 630 is a band-pass mirror that reflects wavelengths of light both shorter and longer than those of the desired characteristic radiation emitted by the emitting material (sodium D-lines in one embodiment).

The second layer is a photovoltaic (PV) cell 620 which has a band gap matched to the energy of the characteristic light emitted by the emitting element in the combustion chamber. In an embodiment, this energy is about 2.1 eV, the approximate energy of sodium D-line photons.

The next layer is a conventional mirror 610 which reflects any light that passes through the PV cell back through the PV cell, as well as any photoluminescence from electron/hole recombination. Any light not absorbed in this second pass will continue on and re-enter the combustion chamber (530 in FIG. 5), some of which will be scattered, some of which will be recycled thermally, and some of which will pass through and strike the wall.

In this particular example, each PV cell has a negative, front current collector (in a layer facing the combustion chamber) 640 that conveys the electricity generated by the cell to an inverter or other device that utilizes electricity.

The PV cells used in the sub-assembly shown in the example of FIGS. 5 and 6 are designed and fabricated to have a band gap matched to energy of the photons emitted by the emitting material. In an embodiment, the emitted photons are the sodium D-lines, which have an energy of about 2.1 eV. This is higher than the energy absorbed by conventional silicon PV cells (which have a band gap of about 1.1 eV). If silicon PV cells were used, the difference in energy between the band gap and the photon energy would be wasted and would ultimately be dissipated as heat. That heat would reduce the PV cell efficiency, so that the efficiency loss would be two-fold.

The outermost layer, most distant from the combustion chamber, is a heat sink 600. In some embodiments, this heat sink is cooled by an active cooling mechanism (e.g. a fan), not shown in the figure. This heat sink can also be used as an integrated positive current collector, or a separated layer (not shown) is used as a positive current collector.

It is emphasized that the above approaches may be utilized alone, or in various combinations in order to effect energy conversion to electricity.

Clause 1A. An apparatus for generating electricity via thermophotovoltaic (TPV) energy conversion, the apparatus comprising:

a transparent chamber capable of containing combustion (the "combustion chamber");

a material or combination of materials that, when heated sufficiently, will emit one or more wavelengths of near-monochromatic visible light (the "emitting material");

a system to introduce fuel, oxidizer, and the emitting material (the "reactants") into the combustion chamber and to evacuate the combustion products from the combustion chamber;

an ignition system to initiate combustion a flow control system to regulate combustion a plurality of photovoltaic cells ("PV cells") outside the chamber and in optical communication with the light emitted as a result of combustion a plurality of mirrors with selective spectral response located between the exterior wall of the combustion chamber and the PV cells and in optical communication with the light emitted during combustion; and a heat exchanger that receives the evacuated combustion products and transfers heat obtained from those products to the incoming reactants.

Clause 2A. The apparatus of Clause 1A, wherein the transparent chamber is fabricated from sapphire tubing Clause 3A. The apparatus of any of Clauses 1A or 2A, wherein the emitting material is atomic or ionic sodium, or a mixture thereof Clause 4A. The apparatus of any of Clauses 1A, 2A, or 3A wherein the emitting material remains permanently in the combustion chamber in a sealed transparent capsule or is incorporated in the transparent tube material interior to or enclosing the chamber Clause 5A. The apparatus of any of Clauses 1A, 2A, 3A, or 4A wherein the photovoltaic cells have their band gap tuned to the wavelength of light emitted by the light-emitting material Clause 6A. The apparatus of any of Clauses 1A, 2A, 3A, 4A, or 5A wherein the photovoltaic cells have a band gap of approximately 2.1 electron volts (eV)

Clause 7A. The apparatus of any of Clauses 1A, 2A, 3A, 4A, 5A, or 6A wherein the heat exchanger is a counterflow design with one channel carrying the combustion products and a plurality of additional channels carrying the oxidizer and the fuel in the opposing direction to the combustion products.

Clause 8A. The apparatus of any of Clauses 1A, 2A, 3A, 4A, 5A, 6A, or 7A wherein the heat exchanger is fabricated from alumina via 3D printing methods.

Clause 9A. The apparatus of any of Clauses 1A, 2A, 3A, 4A, 5A, 6A, 7A, or 8A wherein the fuel combusted is a hydrocarbon or mixture of hydrocarbons, such as methane gas, natural gas, butane, propane, a mixture of higher-molecular weight hydrocarbons (for example, gasoline), diesel, or biofuel.

Clause 10A. The apparatus of any of Clauses 1A, 2A, 3A, 4A, 5A, 6A, 7A, or 8A wherein the fuel combusted is hydrogen gas.

Clause 11A. The apparatus of any of Clauses 1A, 2A, 3A, 4A, 5A, 6A, 7A, 8A, or 9A wherein the oxidizer is air.

Clause 12A. The apparatus of any of Clauses 1A, 2A, 3A, 4A, 5A, 6A, 7A, 8A, 9A, 10A, or 11A wherein the oxidizer is oxygen gas.

Clause 13A. The apparatus of any of Clauses 1A, 2A, 3A, 4A, 5A, 6A, 7A, 8A, 9A, 10A, 11A, or 12A wherein the emitting material is a sodium-containing salt dissolved in a liquid Clause 14A. The apparatus of any of Clauses 1A, 2A, 3A, 4A, 5A, 6A, 7A, 8A, 9A, 10A, 11A, or 12A wherein the emitting material is solid salt in finely divided form.

Clause 15A. The apparatus of any of Clauses 1A, 2A, 3A, 4A, 5A, 6A, 7A, 8A, 9A, 10A, 11A, 12A, 13A, or 14A wherein the mirror with selective spectral response reflects infrared and visible light with wavelength greater than approximately 600 nanometers and allows shorter wavelengths to pass through.

Clause 16A. The apparatus of any of Clauses 1A, 2A, 3A, 4A, 5A, 6A, 7A, 8A, 9A, 10A, 11A, 12A, 13A, 14A, or 15A wherein the mirror with selective spectral response allows a band of wavelengths centered around 589 nanometers to pass through and reflects other wavelengths.

Clause 17A. The apparatus of any of Clauses 1A, 2A, 3A, 4A, 5A, 6A, 7A, 8A, 9A, 10A, 11A, 12A, 13A, 14A, 15A, or 16A wherein the plurality of PV cells have mirrors on the side opposite to that of the incident light so as to reflect light not absorbed by the PV cells back through the PV cells and thence into the combustion chamber.

Clause 18A. The apparatus of any of Clauses 1A, 2A, 3A, 4A, 5A, 6A, 7A, 8A, 9A, 10A, 11A, 12A, 13A, 14A, 15A, 16A, or 17A wherein the combustion chamber consists of two concentrically arranged transparent cylinders, with the inner cylinder being shorter than the outer cylinder, and fabricated such that the reactants and emitting material enter the chamber via the inner cylinder and the reaction products and emitting material leave the chamber via the annular space between the cylinders.

Clause 19A. The apparatus of any of Clauses 1A, 2A, 3A, 4A, 5A, 6A, 7A, 8A, 9A, 10A, 11A, 12A, 13A, 14A, 15A, 16A, 17A, or 18A wherein the selective mirrors and the PV cells form a polygonal arrangement outside of the combustion chamber Clause 20A. The apparatus of any of Clauses 1A, 2A, 3A, 4A, 5A, 6A, 7A, 8A, 9A, 10A, 11A, 12A, 13A, 14A, 15A, 16A, 17A, 18A, or 19A wherein active, passive or a combination of active and passive cooling is used to cool the PV cells and selective mirrors.

Clause 1B. An apparatus comprising:

a combustion chamber comprising a transparent wall;

an emitting material comprising an alkali metal, within the combustion chamber;

an oxidizer in fluid communication with the combustion chamber; and a photovoltaic cell outside of the combustion chamber and in optical communication with characteristic radiation transmitted from the emitting material through the transparent wall.

Clause 2B. An apparatus as in Clause 1B wherein the alkali metal comprises sodium.

Clause 3B. An apparatus as in Clause 1B wherein the alkali metal comprises lithium.

Clause 4B. An apparatus as in any of Clauses 1B, 2B, or 3B further comprising a mirror to reflect light back to the combustion chamber.

Clause 5B. An apparatus as in Clause 4B wherein the mirror has a selective spectral response and is located between the combustion chamber and the photovoltaic cell.

Clause 6B. An apparatus as in any of Clauses 4B or 5B further comprising another mirror on a side of the photovoltaic cell opposite to the combustion chamber.

Clause 7B. An apparatus as in any of Clauses 1B, 2B, 3B, 4B, 5B, or 6B wherein the emitting material comprises a gas.

Clause 8B. An apparatus as in any of Clauses 1B, 2B, 3B, 4B, 5B, 6B, or 7B wherein the emitting material comprises a liquid.

Clause 9B. An apparatus as in Clause 8B wherein the liquid is drawn into the combustion chamber by capillary action.

Clause 10B. An apparatus as in any of Clauses 8B or 9B wherein the liquid comprises a droplet.

Clause 11B. An apparatus as in any of Clauses 8B, 9B, or 10B wherein the emitting material is an alkali metal-containing salt dissolved in the liquid.

Clause 12B. An apparatus as in any of Clauses 1B, 2B, 3B, 4B, 5B, 6B, 7B, 8B, 9B, 10B, or 11B wherein the emitting material comprises a plasma.

Clause 13B. An apparatus as in any of Clauses 1B, 2B, 3B, 4B, 5B, 6B, 7B, 8B, 9B, 10B, 11B, or 12B wherein the emitting material remains within the combustion chamber.

Clause 14B. An apparatus as in Clause 13B wherein the emitting material is within a capsule.

Clause 15B. An apparatus as in any of Clauses 13B or 14B wherein the emitting material is incorporated into the combustion chamber.

Clause 16B. An apparatus as in any of Clauses 1B, 2B, 3B, 4B, 5B, 6B, 7B, 8B, 9B, 10B, 11B, 12B, 13B, 14B, or 15B further comprising:

another photovoltaic cell at a same location as the photovoltaic cell relative to an axis of the combustion chamber, wherein the photovoltaic cell is in series connection with the other photovoltaic cell.

Clause 17B. An apparatus as in any of Clauses 1B, 2B, 3B, 4B, 5B, 6B, 7B, 8B, 9B, 10B, 11B, 12B, 13B, 14B, 15B, or 16B wherein the photovoltaic cell comprises (Al)InGaP.

Clause 18B. An apparatus as in any of Clauses 1B, 2B, 3B, 4B, 5B, 6B, 7B, 8B, 9B, 10B, 11B, 12B, 13B, 14B, 15B, 16B, or 17B wherein the photovoltaic cell comprises gallium arsenide.

Clause 19B. An apparatus as in any of Clauses 1B, 2B, 3B, 4B, 5B, 6B, 7B, 8B, 9B, 10B, 11B, 12B, 13B, 14B, 15B, 16B, 17B, or 18B wherein the photovoltaic cell comprises silicon carbide.

Clause 20B. An apparatus as in any of Clauses 1B, 2B, 3B, 4B, 5B, 6B, 7B, 8B, 9B, 10B, 11B, 12B, 13B, 14B, 15B, 16B, 17B, 18B, or 19B wherein the transparent wall comprises tubing.

Clause 21B. An apparatus as in any of Clauses 1B, 2B, 3B, 4B, 5B, 6B, 7B, 8B, 9B, 10B, 11B, 12B, 13B, 14B, 15B, 16B, 17B, 18B, 19B, or 20B wherein the transparent wall comprises sapphire, polycrystalline alumina, quartz, and/or spinel.

Clause 22B. An apparatus as in any of Clauses 1B, 2B, 3B, 4B, 5B, 6B, 7B, 8B, 9B, 10B, 11B, 12B, 13B, 14B, 15B, 16B, 17B, 18B, 19B, 20B, or 21B wherein the emitting material circulates within the combustion chamber.

Clause 23B. An apparatus as in any of Clauses 1B, 2B, 3B, 4B, 5B, 6B, 7B, 8B, 9B, 10B, 11B, 12B, 13B, 14B, 15B, 16B, 17B, 18B, 19B, 20B, 21B, or 22B further comprising a regenerator.

Clause 24B. An apparatus as in any of Clauses 1B, 2B, 3B, 4B, 5B, 6B, 7B, 8B, 9B, 10B, 11B, 12B, 13B, 14B, 15B, 16B, 17B, 18B, 19B, 20B, 21B, 22B, or 23B further comprising a wicking structure.

Clause 25B. An apparatus as in any of Clauses 1B, 2B, 3B, 4B, 5B, 6B, 7B, 8B, 9B, 10B, 11B, 12B, 13B, 14B, 15B, 16B, 17B, 18B, 19B, 20B, 21B, 22B, 23B, or 24B further comprising a heat sink.

Clause 26B. An apparatus as in any of Clauses 1B, 2B, 3B, 4B, 5B, 6B, 7B, 8B, 9B, 10B, 11B, 12B, 13B, 14B, 15B, 16B, 17B, 18B, 19B, 20B, 21B, 22B, 23B, 24B, or 25B further comprising a heat exchanger in fluid communication with the combustion chamber and configured to receive the oxidizer.

Clause 27B. An apparatus as in Clause 26B wherein the heat exchanger is configured to heat the oxidizer to at least 1500° C.

Clause 28B. An apparatus as in Clause 26B wherein the heat exchanger is configured to heat the oxidizer to at least 1400° C.

Clause 29B. An apparatus as in Clause 26B wherein the heat exchanger is configured to heat the oxidizer to at least 1300° C.

Clause 30B. An apparatus as in Clause 26B wherein the heat exchanger is configured to heat the oxidizer to at least 1200° C.

Clause 31B. An apparatus as in any of Clauses 26B, 27B, 28B, 29B, or 30B wherein the heat exchanger is a counterflow heat exchanger.

Clause 1C. A method comprising:

performing combustion of an oxidizer and a fuel in the presence of an emitting material within a combustion chamber comprising a transparent wall;

communicating a characteristic radiation through the transparent wall to a photovoltaic cell; and the photovoltaic cell generating electricity from the characteristic radiation.

Clause 2C. A method as in Clause 1C further comprising reflecting light back to the combustion chamber.

Clause 3C. A method as in any of Clauses 1C or 2C further comprising heating the oxidizer incoming to the combustion chamber, with heat of combustion.

Clause 4C. A method as in any of Clauses 1C, 2C, or 3C wherein the emitting material comprises an alkali metal, an alkali earth metal, a rare earth, or a transition metal.

Clause 1D. A method comprising: performing combustion of an oxidizer and a fuel in the presence of an emitting material within a combustion chamber comprising a transparent wall; and communicating a characteristic radiation through the transparent wall to a lasing medium within a laser.

Clause 1E. A method comprising: using a thermophotovoltaic generator as a topping cycle for the Brayton cycle of turbomachinery.

What is claimed is:

1. An apparatus comprising:

a combustion chamber comprising a transparent wall;

an emitting material comprising an alkali metal, within the combustion chamber;

an oxidizer in fluid communication with the combustion chamber;

a heat exchanger in fluid communication with the combustion chamber and configured to receive the oxidizer;

a lasing material outside of the combustion chamber and contained within a cavity, the lasing material in optical communication with radiation transmitted from the emitting material through the transparent wall, the lasing material configured to stimulate monochromatic light in response to the radiation, wherein exhaust gases of the combustion chamber are in fluid communication with the heat exchanger, and wherein a portion of the emitting material remains within the combustion chamber using a wicking structure comprising the heat exchanger.

2. An apparatus as in claim 1 wherein the cavity is defined between a fully reflective reflector and a partially reflective reflector.

3. An apparatus as in claim 2 wherein the monochromatic light is configured to be emitted through the partially reflective reflector.

4. An apparatus as in claim 2 further comprising a pumping light source in optical communication with the cavity through the fully reflective reflector.

5. An apparatus as in claim 2 wherein the partially reflective reflector comprises a Fiber Bragg grating (FBR).

6. An apparatus as in claim 1 wherein the cavity comprises part of a solid-state laser.

7. An apparatus as in claim 6 wherein the cavity is an optical fiber assembly, and the solid-state laser is a fiber laser.

8. An apparatus as in claim 7 wherein the fiber is wrapped around the combustion chamber.

9. An apparatus as in claim 7 further comprising a pumping light source in optical communication with the optical fiber assembly.

10. An apparatus as in claim 1 wherein the alkali metal comprises sodium.

11. An apparatus as in claim 1 wherein the emitting material comprises a gas.

12. An apparatus as in claim 1 wherein the emitting material comprises a liquid.

13. An apparatus as in claim 12 wherein the liquid comprises a droplet.

14. An apparatus as in claim 1 further comprising a photovoltaic cell configured to receive the monochromatic light.

15. An apparatus as in claim 1 wherein the heat exchanger is configured to heat the oxidizer to at least 1200° C.

16. An apparatus as in claim 1 wherein the heat exchanger is configured to heat the oxidizer to at least 1500° C.

17. An apparatus as in claim 1 wherein the heat exchanger is a counterflow heat exchanger.

18. An apparatus as in claim 1 wherein the transparent wall comprises sapphire.

19. An apparatus as in claim 1 wherein the combustion chamber is further in fluid communication with a fuel.

20. An apparatus as in claim 19 wherein the combustion chamber receives the fuel with the oxidizer.

* * * * *